(12) United States Patent
Chakravarthy et al.

(10) Patent No.: US 10,569,876 B2
(45) Date of Patent: Feb. 25, 2020

(54) AUTONOMOUSLY GUIDING VEHICLES THROUGH ORIFICES

(71) Applicant: Wichita State University, Wichita, KS (US)

(72) Inventors: Animesh Chakravarthy, Wichita, KS (US); Debasish Ghose, Karnataka (IN)

(73) Assignee: Wichita State University, Wichita, KS (US)

( * ) Notice: Subject to any disclaimer, the term of this patent is extended or adjusted under 35 U.S.C. 154(b) by 151 days.

(21) Appl. No.: 15/925,312

(22) Filed: Mar. 19, 2018

(65) Prior Publication Data

US 2018/0290747 A1    Oct. 11, 2018

Related U.S. Application Data

(60) Provisional application No. 62/483,598, filed on Apr. 10, 2017.

(51) Int. Cl.
| | | |
|---|---|---|
| *B64C 39/02* | (2006.01) | |
| *G05D 1/10* | (2006.01) | |
| *G05D 1/00* | (2006.01) | |
| *G05D 1/08* | (2006.01) | |
| *G08G 5/04* | (2006.01) | |
| *G05D 1/04* | (2006.01) | |

(52) U.S. Cl.
CPC .......... *B64C 39/024* (2013.01); *G05D 1/0011* (2013.01); *G05D 1/0088* (2013.01); *G05D 1/042* (2013.01); *G05D 1/0808* (2013.01); *G05D 1/101* (2013.01); *G08G 5/045* (2013.01); *B64C 2201/141* (2013.01); *B64C 2201/146* (2013.01)

(58) Field of Classification Search
CPC ............ B64C 39/024; B64C 2201/141; B64C 2201/146; G05D 1/0011; G05D 1/0088; G05D 1/042; G05D 1/0808; G05D 1/101; G08G 5/045
See application file for complete search history.

(56) References Cited

U.S. PATENT DOCUMENTS

| | | | | |
|---|---|---|---|---|
| 2016/0364989 | A1* | 12/2016 | Speasl | G08G 5/0034 |
| 2017/0187993 | A1* | 6/2017 | Martch | B64C 39/024 |
| 2018/0204470 | A1* | 7/2018 | Rezvani | G08G 5/0069 |

* cited by examiner

*Primary Examiner* — Aaron L Troost
(74) *Attorney, Agent, or Firm* — Stinson LLP

(57) ABSTRACT

This document generally describes a safe-passage guidance strategy developed in a relative velocity framework to enable a generic aerial robot execute a precision three-dimensional maneuver through a narrow orifice in a wall. The relative sizes of the robot and the orifice can be such that the orifice is only slightly larger than the robot. The orifice can be approximated as an elliptical shape, and analytical nonlinear guidance laws incorporating state-based switching can be derived. Guidance laws can be used to maneuver the robot through both fixed and moving orifices as well as in scenarios when the orifice is closing with time.

25 Claims, 36 Drawing Sheets

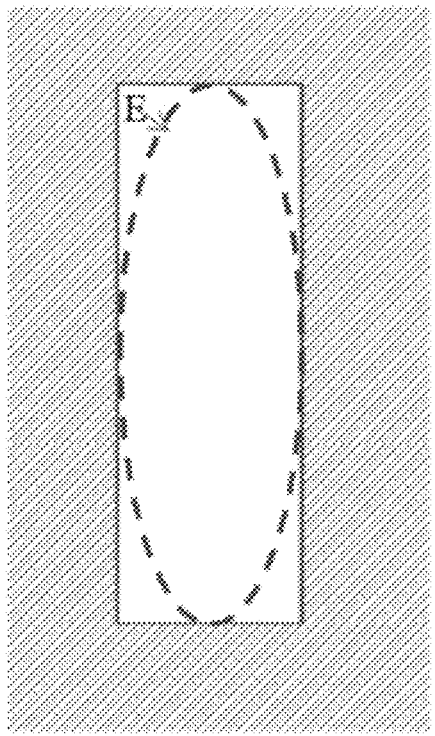
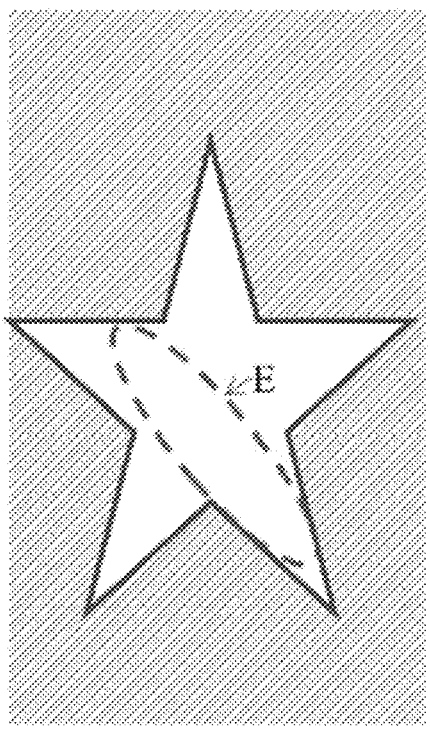
FIG. 5A　　　　　　　FIG. 5B
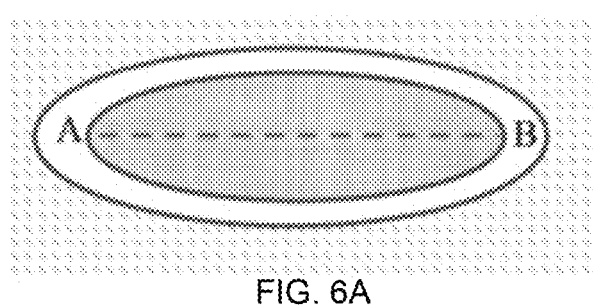
FIG. 6A
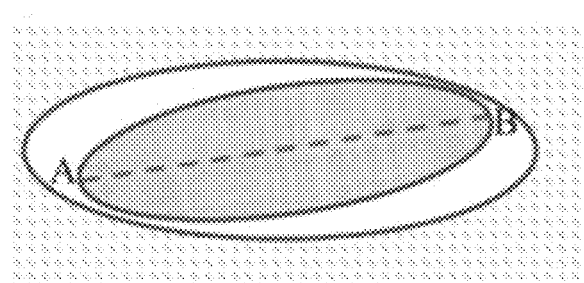
FIG. 6B
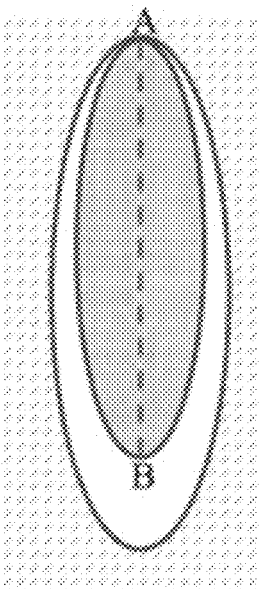
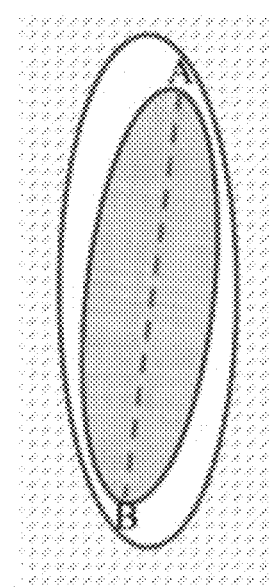
FIG. 6C　　　　　FIG. 6D

AUTONOMOUSLY GUIDING VEHICLES THROUGH ORIFICES

CROSS-REFERENCE TO RELATED APPLICATIONS

This application claims the benefit of U.S. Provisional Application Ser. No. 62/483,598, filed Apr. 10, 2017. The disclosure of the prior application is considered part of (and is incorporated by reference in) the disclosure of this application.

GOVERNMENT GRANTS

The material described in this application was developed based on Grants IIS-1351677 and CNS-1446557 from the National Science Foundation.

TECHNICAL FIELD

This specification generally describes techniques for controlling a robotic vehicle to execute a precise three-dimensional (3-D) maneuver through an opening.

BACKGROUND

A flying robot often encounters scenarios requiring it to fly through a window on a wall or a narrow orifice, while ensuring that it does not collide with the surrounding edges. This is particularly difficult when the relative sizes of the robot and the window/orifice are such that the window/orifice is just barely large enough for the robot to fly through. In such scenarios, the maneuver through the orifice needs to be one of high precision, and the shapes of the robot and the orifice play an important role.

The problem of an autonomous robot going through an orifice, although of great practical importance, has received somewhat limited attention in the literature. In one approach, the authors address the problem of flying a quadrotor through a window by defining a goal point in the window, treating that goal point as a terminal condition to be achieved by the quadrotor and then numerically integrating the dynamic equations of the quadrotor backward in time to determine a reference trajectory for the quadrotor in a high dimensional space. A controller that ensures that the quadrotor tracks this reference trajectory is then designed. With this approach, every time the goal point/window moves or is subjected to a disturbance, the differential equations governing the quadrotor dynamics have to be numerically integrated afresh to compute an updated reference trajectory. Another approach involves the formulation of an optimization problem that incorporates the physical dimensions of the opening as constraints and then determines optimal trajectories for the quadrotor through this opening. Experimental results of the quadrotor flying through a hoop are presented. As the window moves, the constraints change, and the optimization problem needs to be solved afresh. Researchers have also developed a Linear Quadratic Gaussian (LQG)-obstacle technique and used this technique to demonstrate simulations of a quadrotor flying through a window. A related problem is that of a snake robot going through an elevated passage in a wall. However, all these documents rely on numerically generating the robot trajectory through the passage. This is where the current document differs from the existing literature.

SUMMARY

This specification describes techniques for controlling a robotic vehicle to execute a precise three-dimensional (3-D) maneuver through an opening. This specification explains that the robotic vehicle can be controlled through an opening by applying a control feedback loop consisting of identifying the vehicle's velocity vector and orientation relative to the opening; determining, through the application of analytical guidance laws described herein, an acceleration vector that will direct the vehicle through the opening based on the relative velocity vector of the vehicle and the orientation of the vehicle; and controlling the vehicle through the opening according to the calculated acceleration vector.

In some implementations, a method of autonomously controlling a vehicle through an opening includes identifying, by a local controller onboard the vehicle, the opening and its position relative to the vehicle and repeatedly applying, by the local controller onboard the vehicle, a control feedback loop defining a guidance law to guide the vehicle through the opening, the control feedback loop iteratively evaluating and adjusting movement of the vehicle relative to the opening until the vehicle has passed through the opening. Each iteration of the control feedback loop can include identifying, using one or more local sensors onboard the vehicle, (i) a relative velocity vector of the vehicle with regard to the opening and (ii) an orientation for the vehicle; determining, by the local controller, an acceleration vector that will direct the vehicle through the opening based on the relative velocity vector of the vehicle and the orientation of the vehicle, and controlling, by the local controller, one or more kinematic devices that are part of the vehicle according to the determined acceleration for the vehicle.

Such implementations can optionally include one or more of the following features. The local controller can be programmed to guide the vehicle along a predetermined path so that the vehicle passes through the opening. The acceleration vector can be determined so that the magnitude of the velocity vector of the vehicle is kept constant while the vehicle travels along the predetermined path. At least a portion of the predetermined path can have a curvature. The acceleration vector can be determined using one or more of the following equations: $a_{AB} = -K\hat{y}_A/g_A$; $\hat{V}_{AB} = \cos\alpha \cos\beta\hat{i} + \cos\alpha \sin\beta\hat{j} + \sin\alpha\hat{k}$; and $\hat{a}_{AB} = \cos\gamma \cos\delta\hat{i} + \cos\gamma \sin\delta\hat{j} + \sin\gamma\hat{k}$, where $a_{AB}$ defines the acceleration vector, and $\hat{V}_{AB}$ and $\hat{a}_{AB}$ define unit vectors of the acceleration vector. The vehicle can be an autonomous aerial vehicle. The autonomous aerial vehicle can be controlled in three-dimensional space through the opening. The one or more kinematic devices can include one or more of the following: elevator control device, aileron control device, rudder control device, and rotor thrust control device. The opening can change position during application of the control feedback loop. Each iteration of the control feedback loop can further include identifying, by the controller, the current position of the opening relative to the vehicle, wherein the relative velocity vector and the acceleration vector are determined based, at least in part, on the current position of the opening. The opening can change size during application of the control feedback loop. Each iteration of the control feedback loop can further include identifying, by the controller, the current size of the opening relative to the vehicle, wherein the relative velocity vector and the acceleration vector are determined based, at least in part, on the current size of the opening.

In some implementations, a vehicle that is capable of autonomously moving through an opening includes one or more onboard environment sensors that provide environmental information related to the current environment of the vehicle, an onboard vehicle state sensor that provides information indicating a velocity vector of the vehicle and an orientation for the vehicle, one or more onboard kinematic devices that control the movement of the vehicle, and an onboard controller that is programmed to repeatedly apply a control feedback loop to guide the vehicle through an opening having a relative position provided by the one or more onboard environment sensors. The control feedback loop can iteratively evaluate and adjust movement of the vehicle relative to the opening until the vehicle has passed through the opening. Each iteration of the control feedback loop can include identifying, using the one or more state sensors onboard the vehicle, (i) a relative velocity vector of the vehicle with regard to the opening and (ii) an orientation for the vehicle; determining, by the local controller, an acceleration vector that will direct the vehicle through the opening based on the relative velocity vector of the vehicle and the orientation of the vehicle, and controlling, by the local controller, the one or more kinematic devices that are part of the vehicle according to the determined acceleration for the vehicle.

Such implementations can optionally include one or more of the following features. The local controller can be programmed to guide the vehicle along a predetermined path so that the vehicle passes through the opening. The acceleration vector can be determined so that the magnitude of the velocity vector of the vehicle is kept constant while the vehicle travels along the predetermined path. At least a portion of the predetermined path can have a curvature. The controller can be programmed to determine the acceleration vector using one or more of the following equations: $a_{AB} = -K\hat{y}_A/g_A$; $\hat{V}_{AB} = \cos\alpha\cos\beta\hat{i} + \cos\alpha\sin\beta\hat{j} + \sin\alpha\hat{k}$; and $\hat{\alpha}_{AB} = \cos\gamma\cos\delta\hat{i} + \cos\gamma\sin\delta\hat{j} + \sin\gamma\hat{k}$, where $a_{AB}$ defines the acceleration vector, and $\hat{V}_{AB}$ and $\hat{\alpha}_{AB}$ define unit vectors of the acceleration vector. The vehicle can be an autonomous aerial vehicle. The controller can be programmed to control the vehicle in three-dimensional space through the opening. The one or more kinematic devices can include one or more of the following: elevator control device, aileron control device, rudder control device, and rotor thrust control device. The controller can be programmed to guide the vehicle through an opening that changes position during application of the control feedback loop. Tach iteration of the control feedback loop can further include identifying, by the controller, the current position of the opening relative to the vehicle, wherein the relative velocity vector and the acceleration vector are determined based, at least in part, on the current position of the opening. The controller can be programmed to guide the vehicle through an opening that changes size during application of the control feedback loop. Each iteration of the control feedback loop can further include identifying, by the controller, the current position of the opening relative to the vehicle, wherein the relative velocity vector and the acceleration vector are determined based, at least in part, on the current size of the opening.

In some implementations, a system for directing a vehicle through an opening includes one or more environment sensors that provide environmental information related to the current environment of the vehicle, a vehicle state sensor that provides information indicating a velocity vector of the vehicle and an orientation for the vehicle, one or more onboard kinematic devices that control the movement of the vehicle, and a controller that is programmed to repeatedly apply a control feedback loop to guide the vehicle through an opening having a relative position provided by the one or more environment sensors. The control feedback loop can iteratively evaluate and adjust movement of the vehicle relative to the opening until the vehicle has passed through the opening. Each iteration of the control feedback loop can include identifying, using the one or more state sensors, (i) a relative velocity vector of the vehicle with regard to the opening and (ii) an orientation for the vehicle; determining, by the controller, an acceleration vector that will direct the vehicle through the opening based on the relative velocity vector of the vehicle and the orientation of the vehicle, and controlling, by the controller, the one or more kinematic devices that are part of the vehicle according to the determined acceleration for the vehicle.

Such implementations can optionally include one or more of the following features. One of the one or more environment sensors can be remote from the vehicle. The controller can be remote from the vehicle. The controller can be local to the vehicle, and can be programmed to receive signals from a controller that is remote from the vehicle. The local controller can be programmed to switch between: controlling the one or more kinematic devices that are part of the vehicle according to the local controller's determined acceleration for the vehicle based on the application of the control feedback loop, and controlling the one or more kinematic devices that are part of the vehicle according to the signals received from the controller that is remote from the vehicle. The controller can be programmed to guide the vehicle along a predetermined path so that the vehicle passes through the opening. The acceleration vector can be determined so that the magnitude of the velocity vector of the vehicle is kept constant while the vehicle travels along the predetermined path. At least a portion of the predetermined path can have a curvature. The controller can be programmed to determine the acceleration vector using the following equations: $a_{AB} = -K\hat{y}_A/g_A$; $\hat{V}_{AB} = \cos\alpha\cos\beta\hat{i} + \cos\alpha\sin\beta\hat{j} + \sin\alpha\hat{k}$; and $\hat{\alpha}_{AB} = \cos\gamma\cos\delta\hat{i} + \cos\gamma\sin\delta\hat{j} + \sin\gamma\hat{k}$, where $a_{AB}$ defines the acceleration vector, and $\hat{V}_{AB}$ and $\hat{\alpha}_{AB}$ define unit vectors of the acceleration vector. The controller can be programmed to guide the vehicle through an opening that changes position during application of the control feedback loop. Each iteration of the control feedback loop can further include identifying, by the controller, the current position of the opening relative to the vehicle, wherein the relative velocity vector and the acceleration vector are determined based, at least in part, on the current position of the opening. The controller can be programmed to guide the vehicle through an opening that changes size during application of the control feedback loop. Each iteration of the control feedback loop can further include identifying, by the controller, the current position of the opening relative to the vehicle, wherein the relative velocity vector and the acceleration vector are determined based, at least in part, on the current size of the opening.

Certain implementations can provide one or more of the following advantages. First, the techniques described in this specification can be employed to enable a robot with ideal (double-integrator) dynamics to execute a precise three-dimensional (3-D) maneuver through an elliptical orifice in a wall. The guidance law incorporates continuous feedback from the window opening by use of appropriately defined relative velocity components, and because of this, even when the window moves and/or changes in size, no numerical integration is required. Numerical integration of differential equations can be time-consuming on aerial and underwater platforms that have limited computational resources. The fact that the designed guidance law is analytical in nature makes it easier to implement within the limited computational resources available onboard a robotic vehicle. The guidance law can be used to guide the robot through elliptical orifices that may be fixed, moving, and/or closing. Because the guidance law is developed using a general kinematics framework, it is applicable for use in a broad class of vehicles, which include quadrotors, fixed-wing micro air vehicles, and underwater robotic vehicles. A further advantage is that the guidance law does not require the vehicle to be brought to rest (or even have its speed changed) at any stage during the maneuver. This is a particularly important trait for fixed-wing micro air vehicles, which cannot hover and, in fact, always need to operate above a minimum speed. It is also an important trait for quadrotors because the lack of any requirement to bring the vehicle to rest enables shorter maneuver times through the orifice.

Additional and/or alternative advantages are also possible, as described below.

BRIEF DESCRIPTION OF THE ATTACHMENTS

Figure 3A:
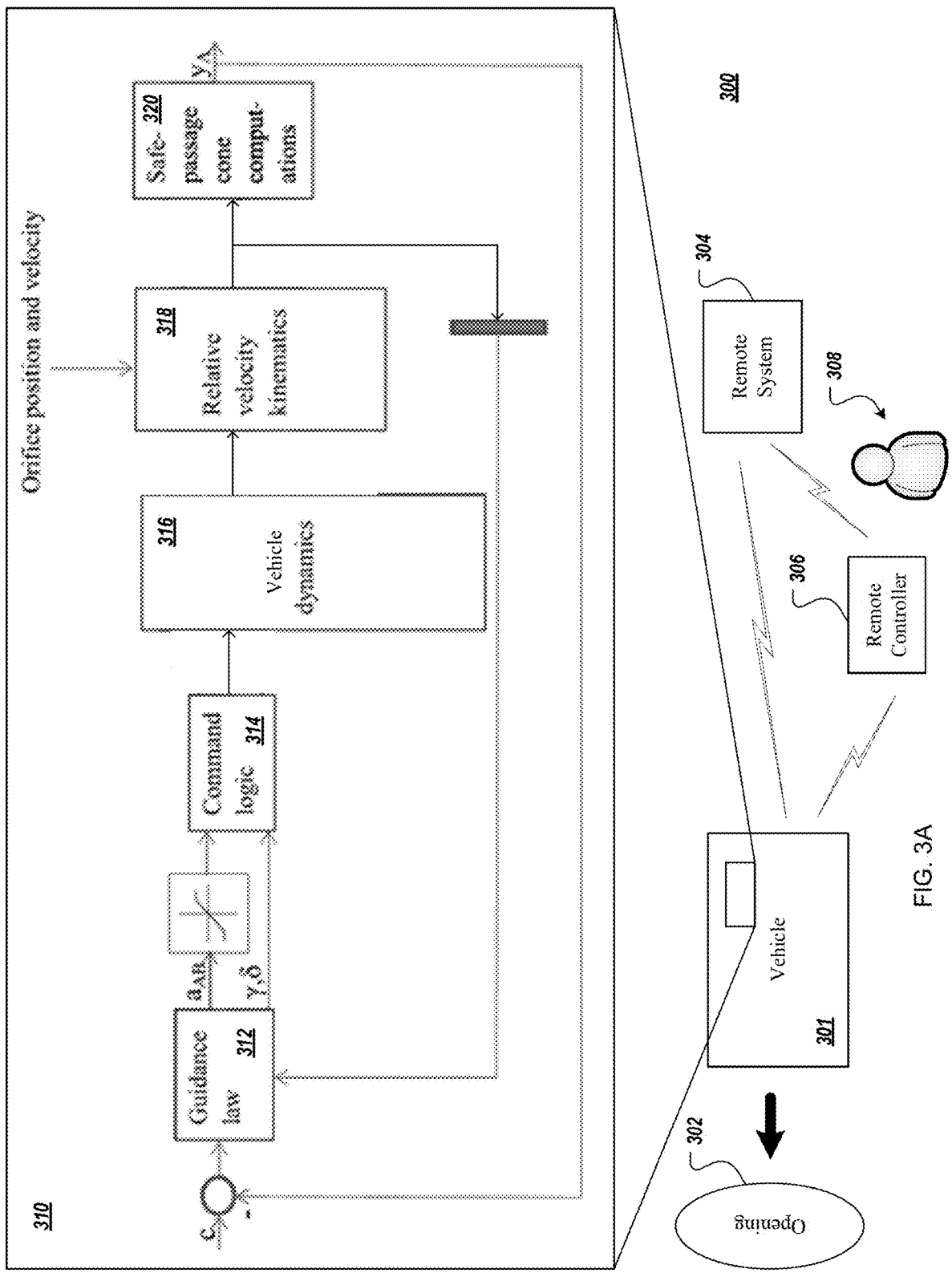
Figure 3B:
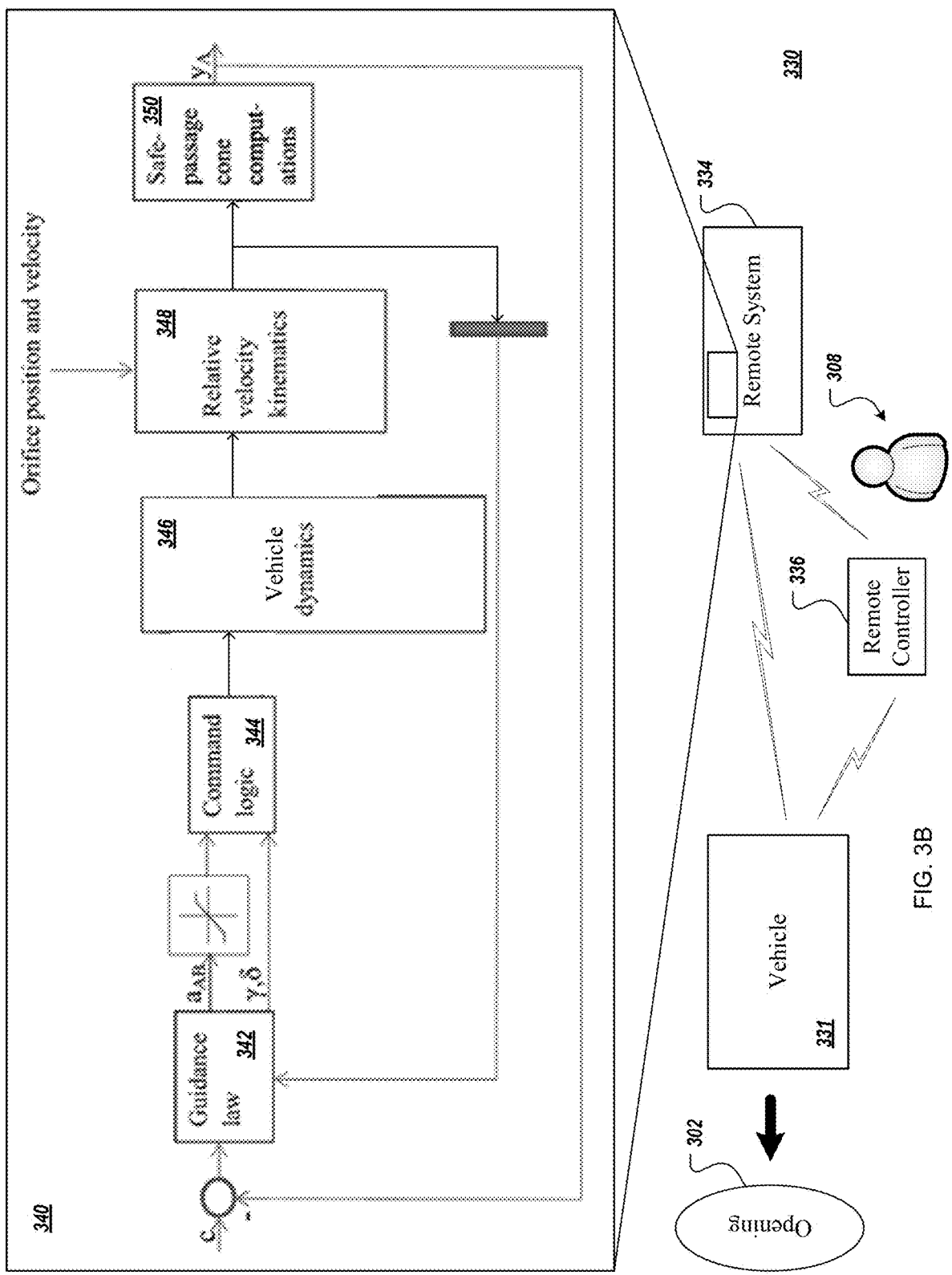
Figure 3C:
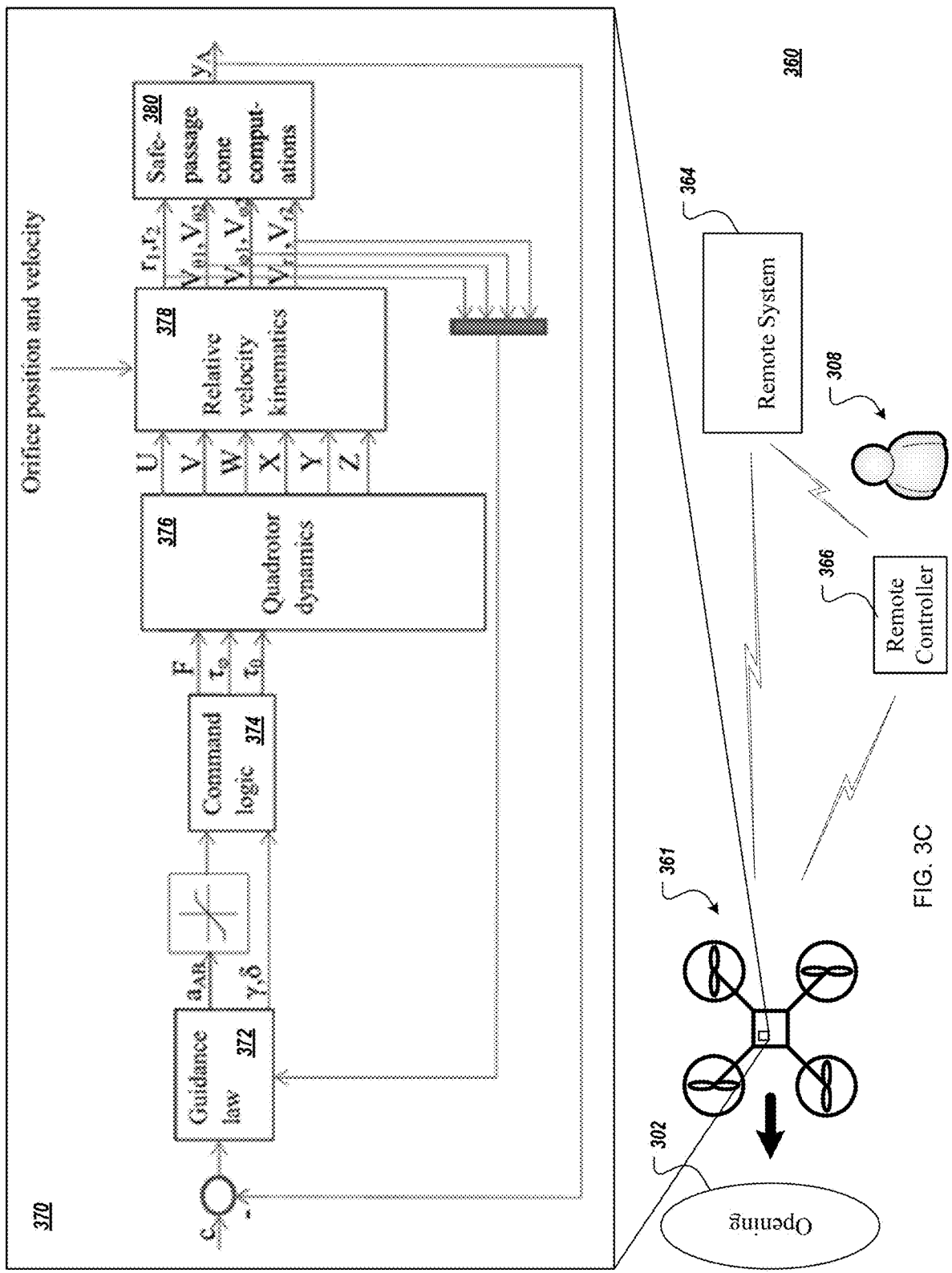

FIGS. 3A-C depict example systems for guiding example vehicles through the opening.

Figure 4:
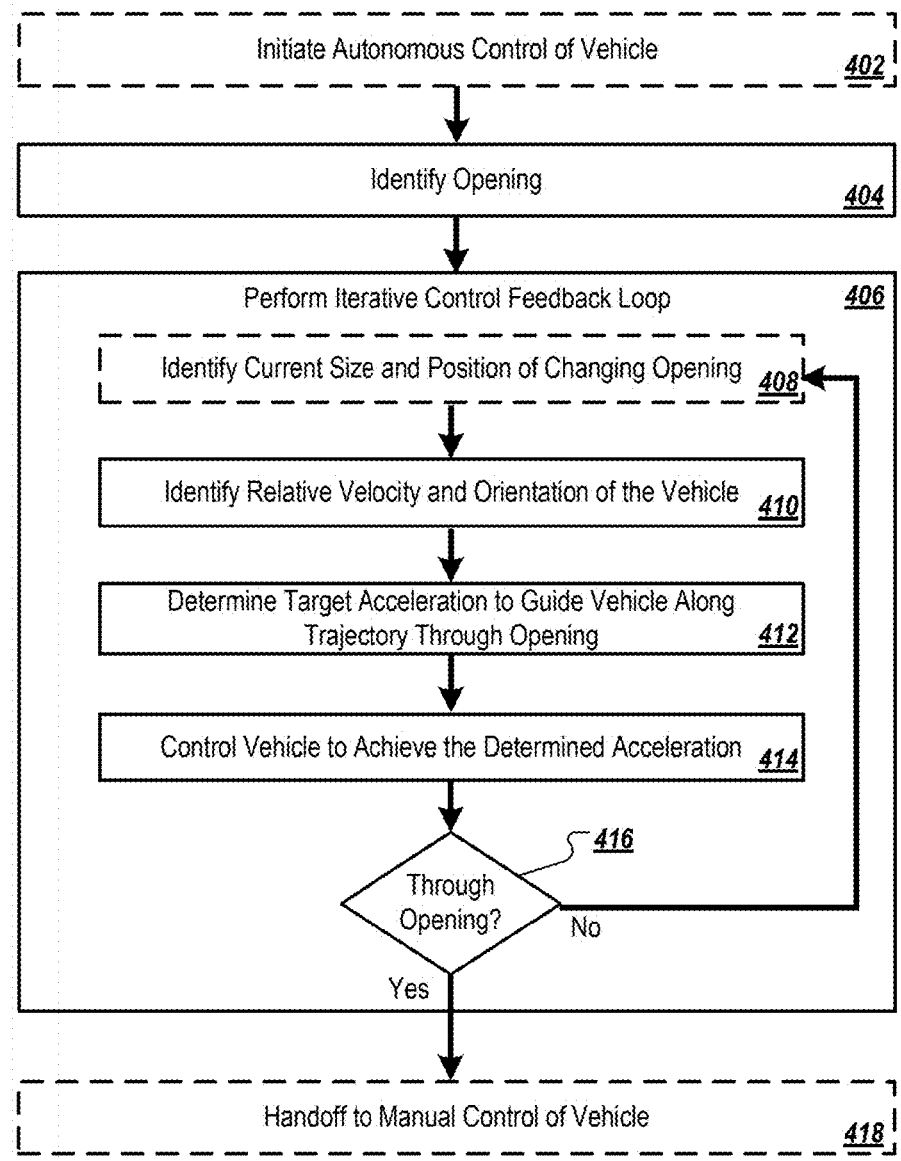

FIG. 4 is a flowchart of an example technique for autonomously guiding a vehicle through an opening.

FIGS. 5A-B depict example representations of fitting ellipses to a variety of differently shaped openings.

FIGS. 6A-D depict examples of a vehicle represented by an ellipse being guided through an elliptical orifice.

Figure 7:
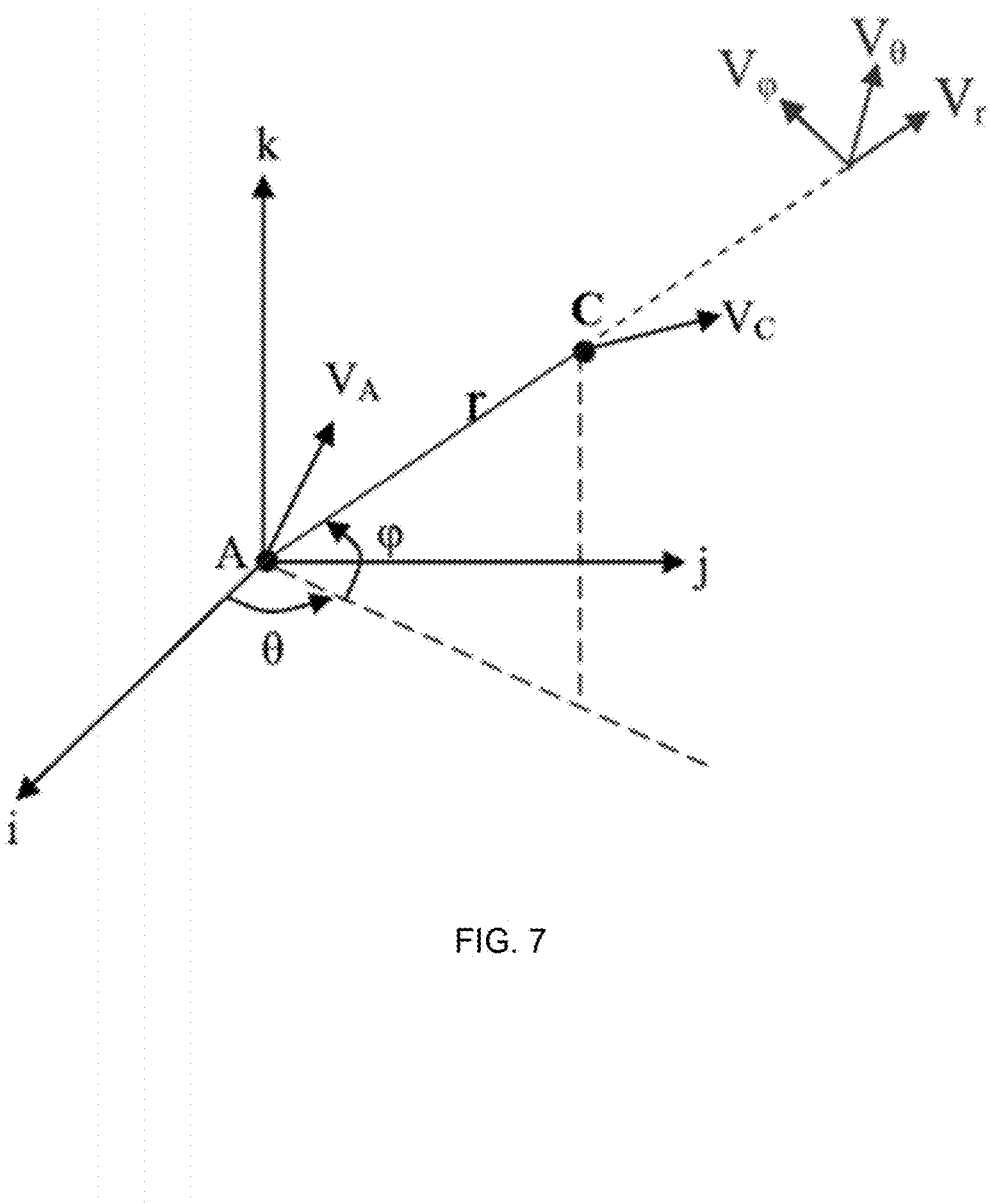

FIG. 7 depicts the geometry of two point objects moving in 3D space.

Figure 8:
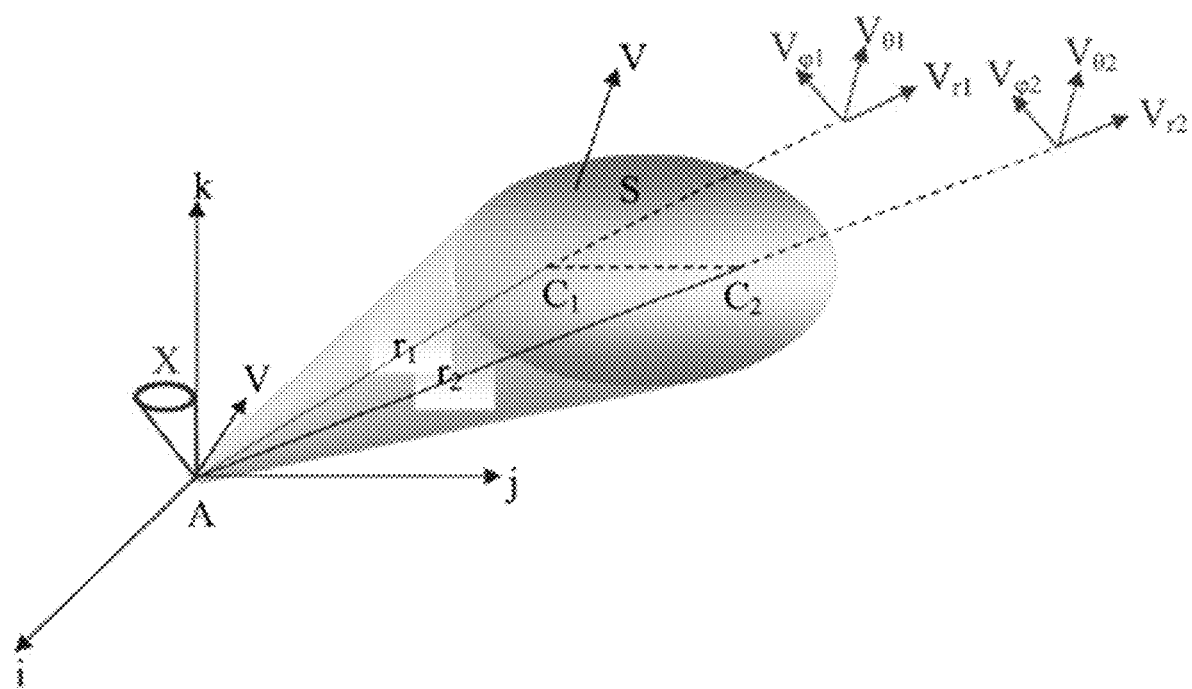

FIG. 8 shows an example of a safe-passage geometry between a point and a spheroid.

Figure 9:
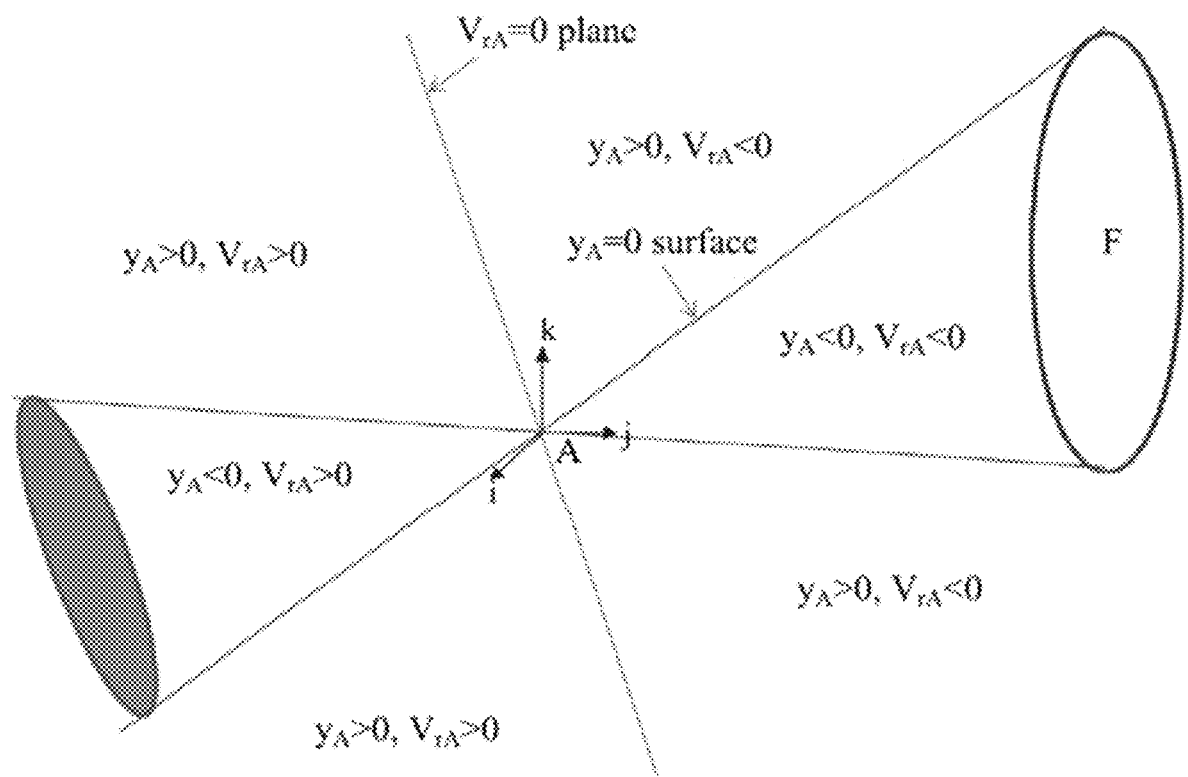

FIG. 9 shows a partitioning of the 3-D physical space into several regions based on the signs of $y_A$ and $V_{rA}$.

Figure 10:
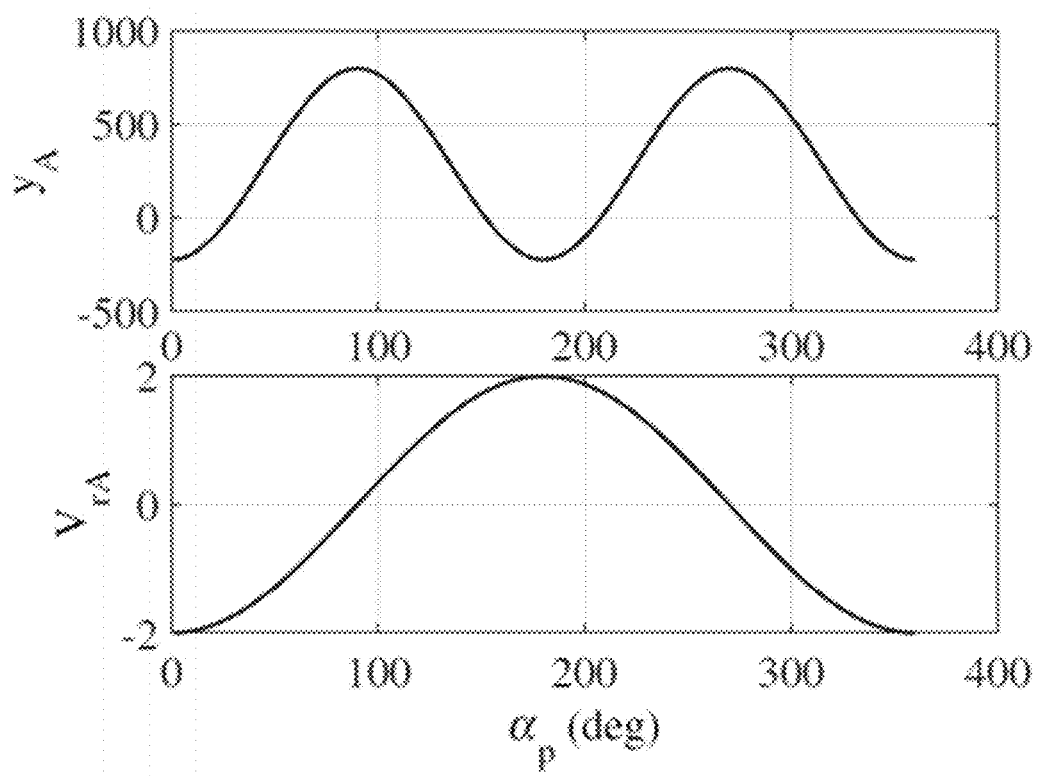

FIG. 10 includes graphs showing representations of a typical plot of $y_A$ as a function of $\alpha_p$ and of typical plot of $V_{rA}$ as a function of $\alpha_p$.

FIGS. 11A-D, 12A-D, 13A-D, and 14A-D show geometries illustrating different scenarios of the relative velocity vector V being located on a planar section of the safe-passage cone XAX'.

FIGS. 15A-H show example appropriate qualitative trajectories of $y_A(t)$ to guide a vehicle through an opening.

Figure 16:
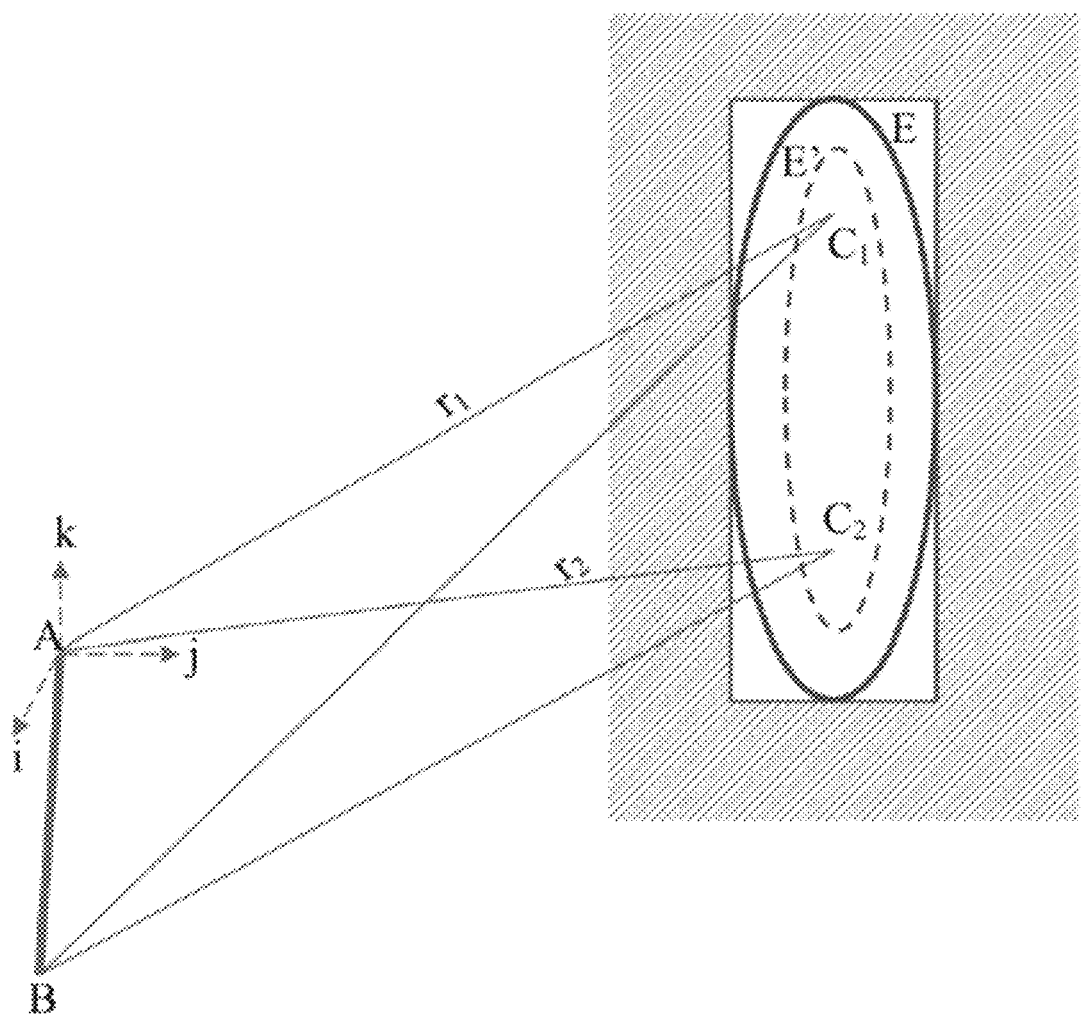

FIG. 16 shows an example engagement geometry between a rod AB representing an imaginary line drawn on the front of the vehicle.

Figure 17:
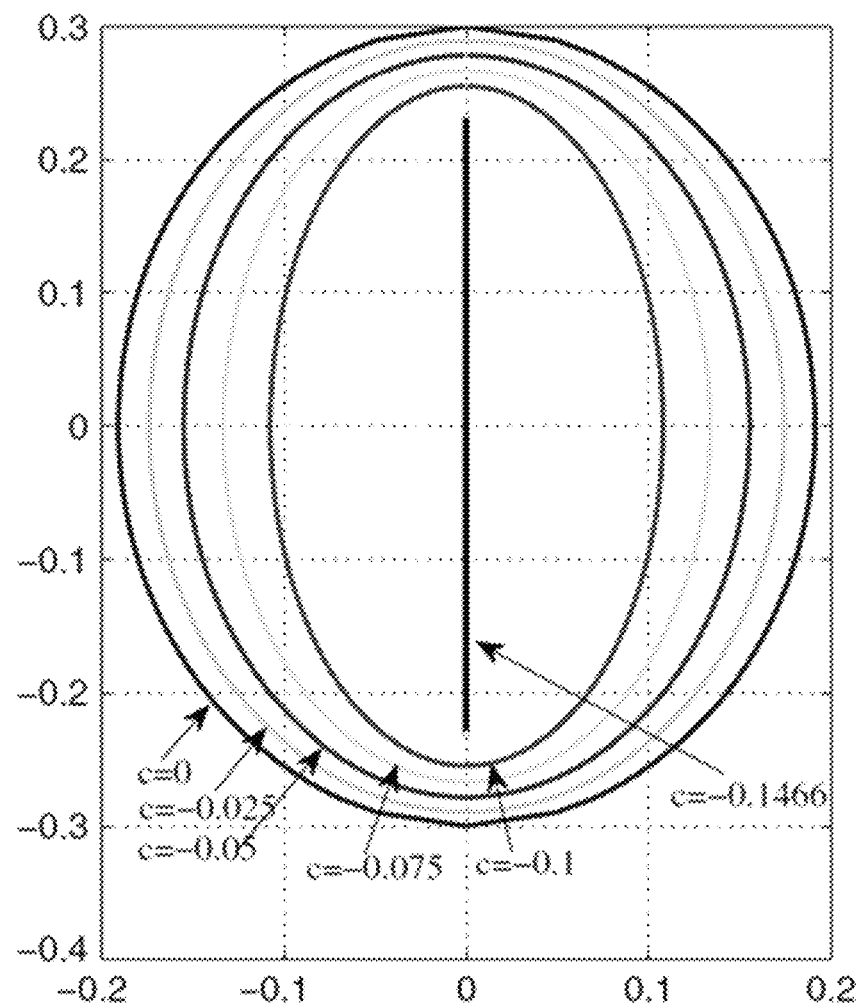

FIG. 17 depicts constant values of c that correspond to ellipses E' (spheroids S') confocal with original ellipse E (spheroid S).

Figure 18:
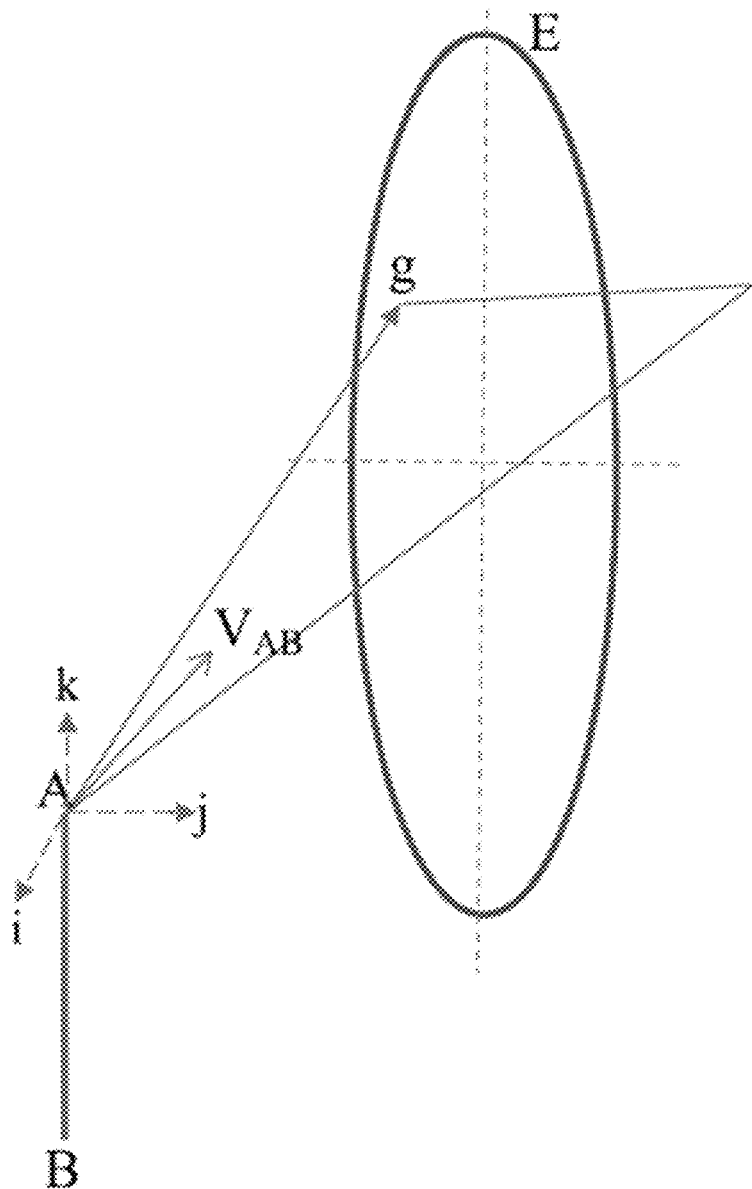

FIG. 18 is an illustration of a guidance plane determination.

Figure 19C:
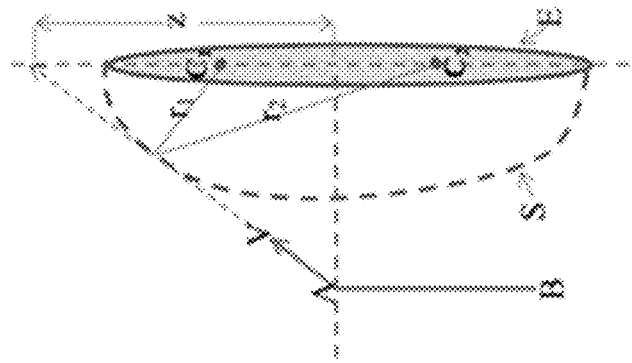
Figure 19B:
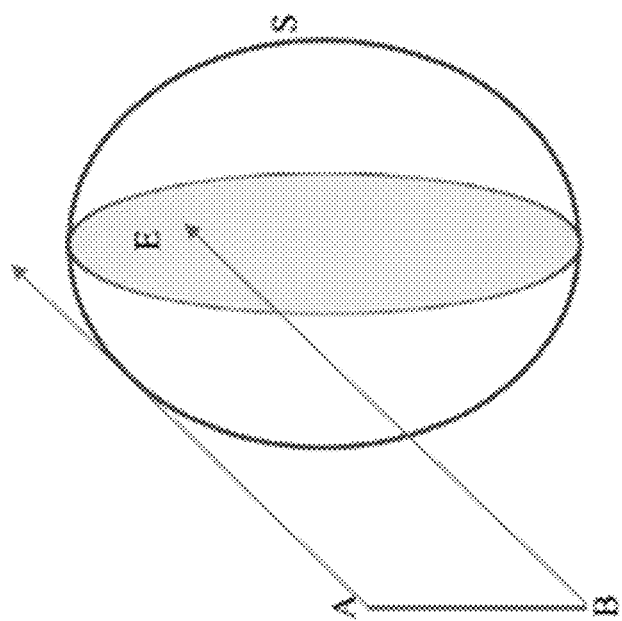
Figure 19A:
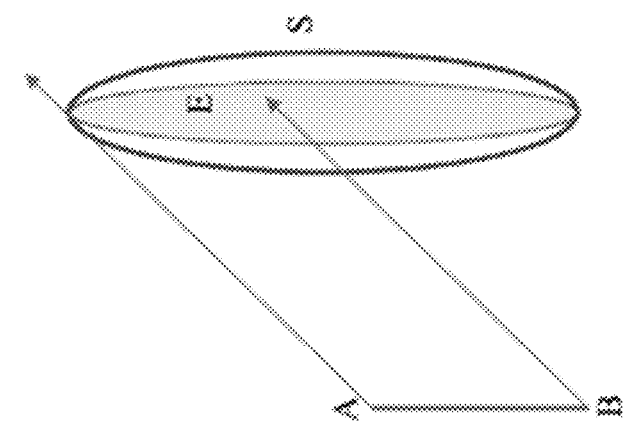

FIGS. 19A-C depict representation of ellipse with differing eccentricity and their corresponding spheroids.

FIGS. 20A-D depict state responses associated with point B on AB.

Figure 21:
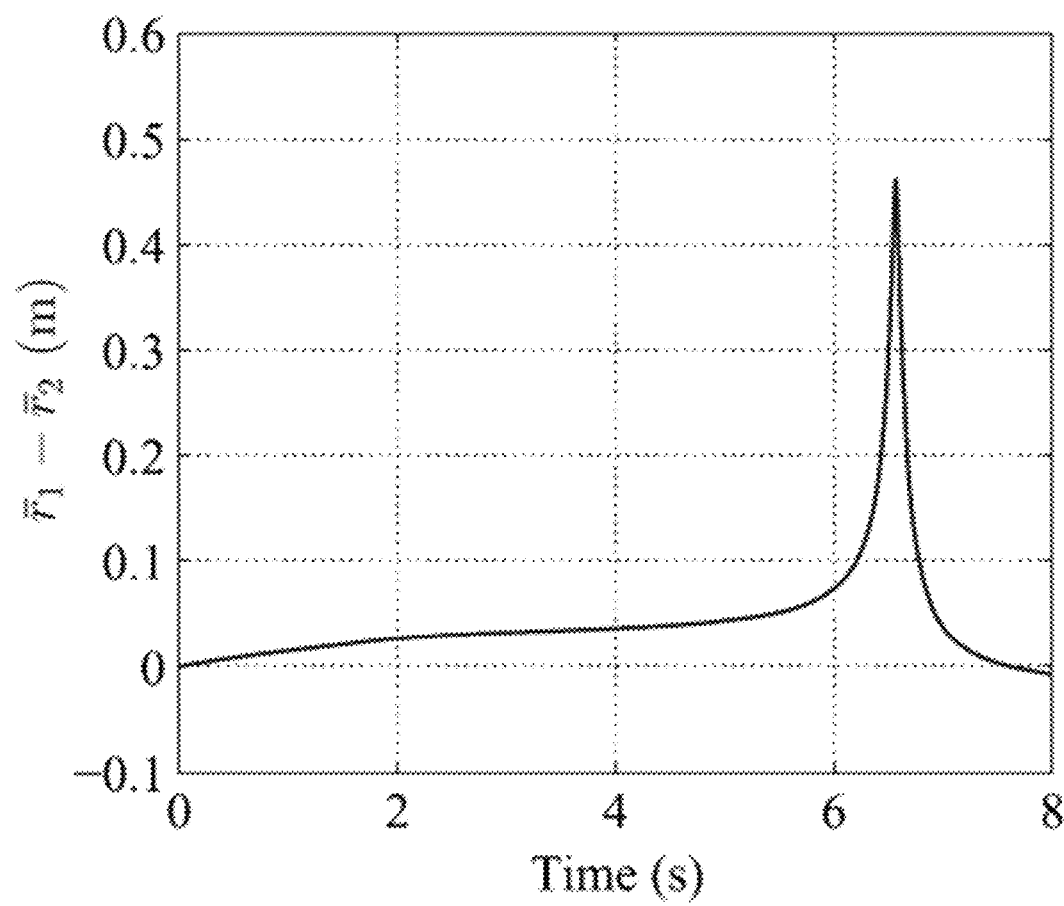

FIG. 21 depicts the difference of distances of point B to the two foci.

Figure 22:
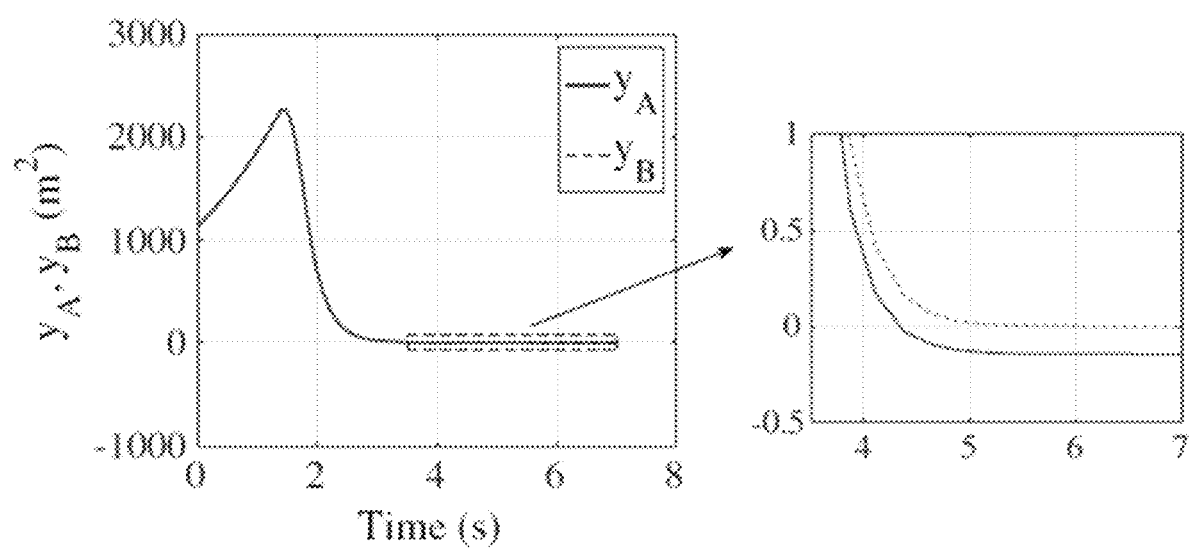

FIG. 22 shows the values of the output quantity $\hat{y}=y_B$, along with $y_A$.

FIGS. 23A-D depicts representations of example acceleration magnitude $a_{AB}$ of AB, speed of AB, azimuth angle β of velocity vector of AB, and elevation angle α of velocity vector AB.

Figure 24:
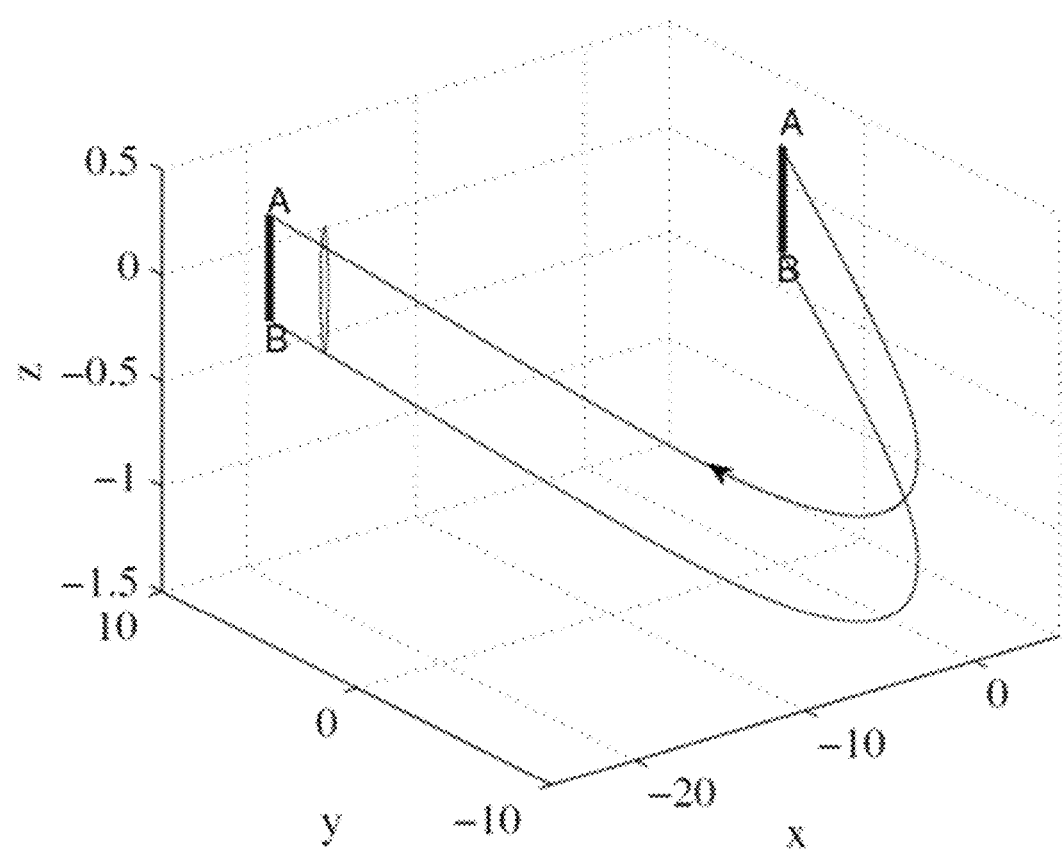

FIG. 24 shows the trajectory of AB in (x, y, z) space as AB passes through elliptical orifice E.

Figure 25C:
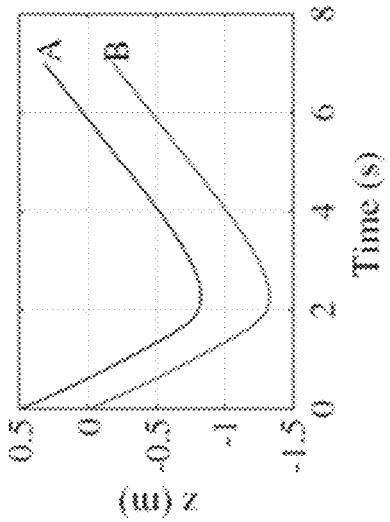
Figure 25B:
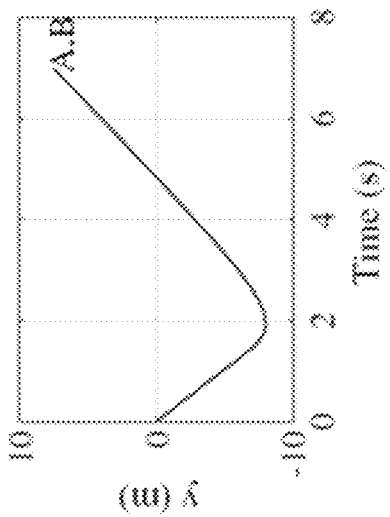
Figure 25A:
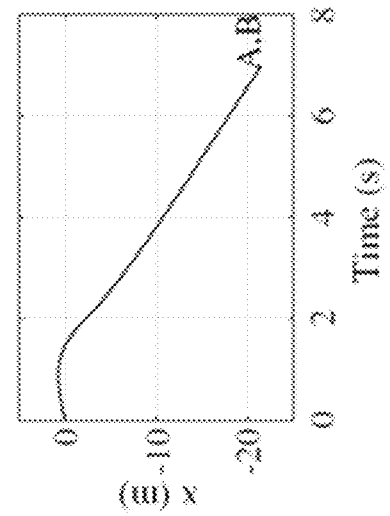

FIGS. 25A-C show the time histories of the trajectory along the x, y, and z axes.

Figure 26A:
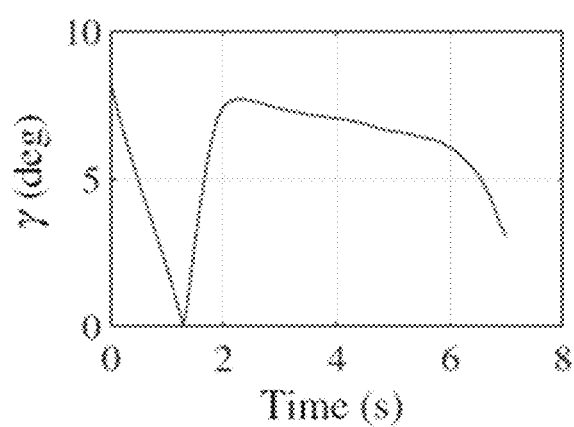
Figure 26B:
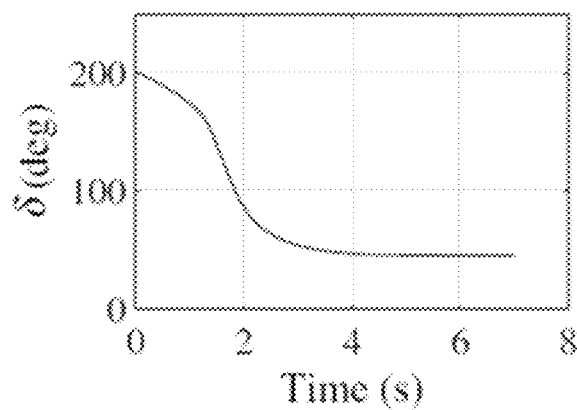

FIGS. 26A-B shows the time histories of the elevation and azimuth angles γ and δ, respectively, which define the direction of the acceleration vector $a_{AB}$.

Figure 27:
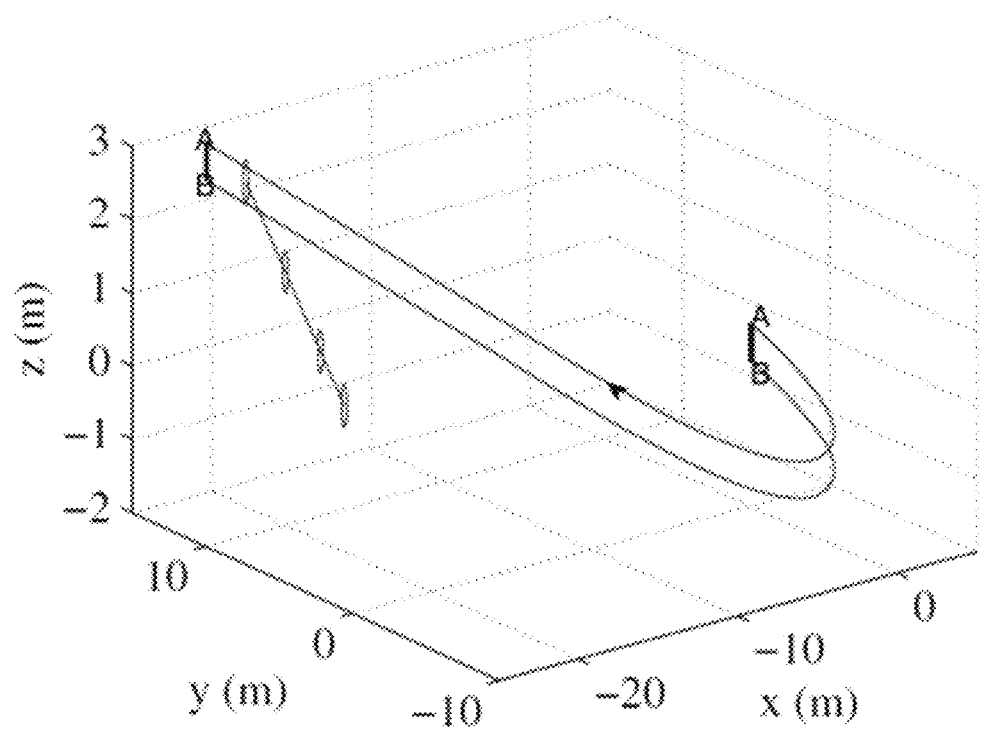

FIG. 27 shows example trajectories of AB and E in (x, y, z) space.

Figure 28:
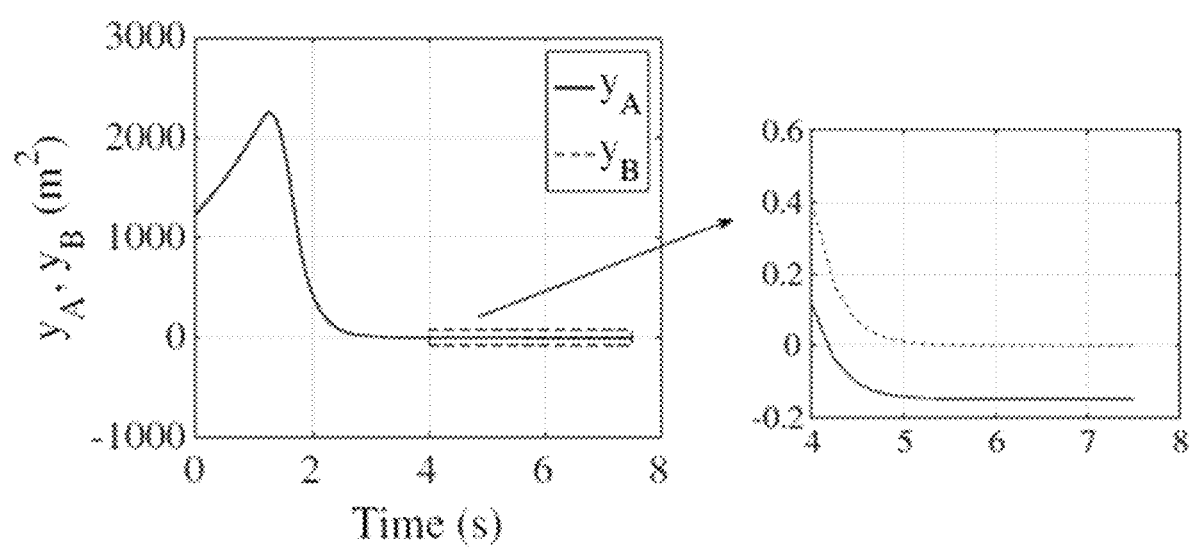

FIG. 28 shows the values of the output quantity $\hat{y}_B$, along with $y_A$.

FIGS. 29A-D show the acceleration magnitude, the speed, the time history of β, and the time history of α.

Figure 30A:
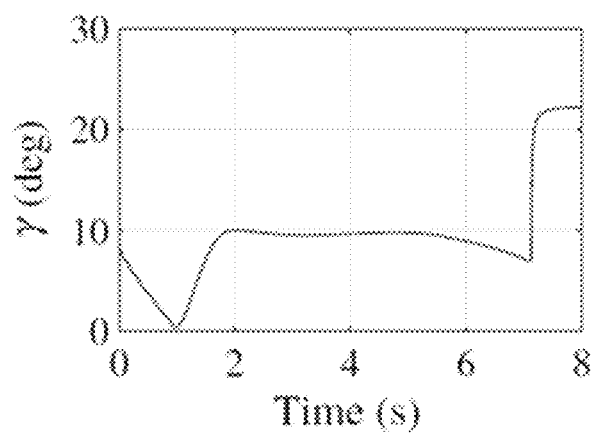
Figure 30B:
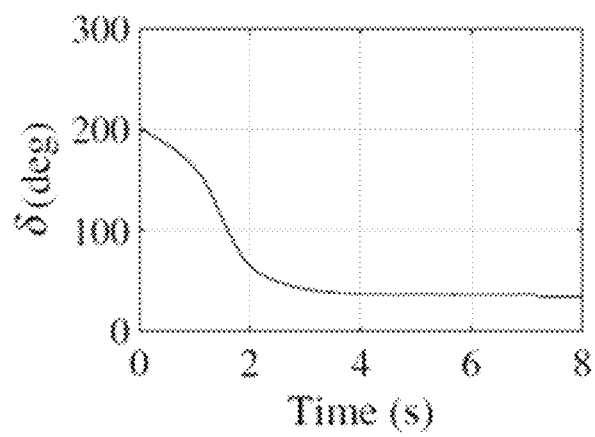

FIGS. 30A-B shows the time histories of γ and δ, respectively.

Figure 31:
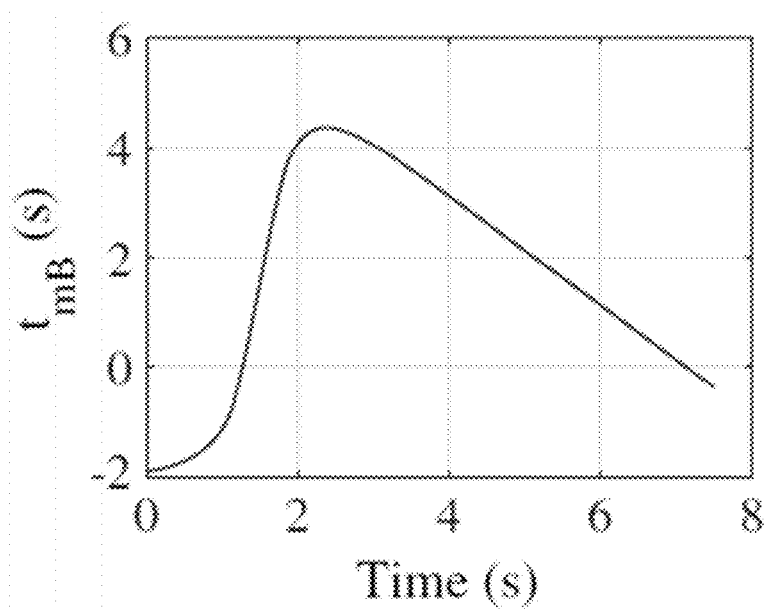

FIG. 31 depicts miss time of point B to the ellipse E.

Figure 32A:
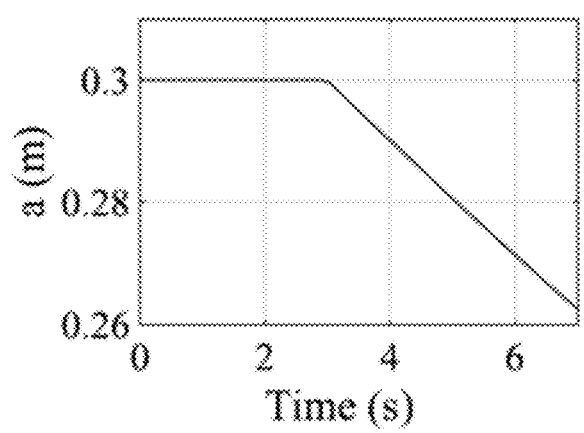
Figure 32B:
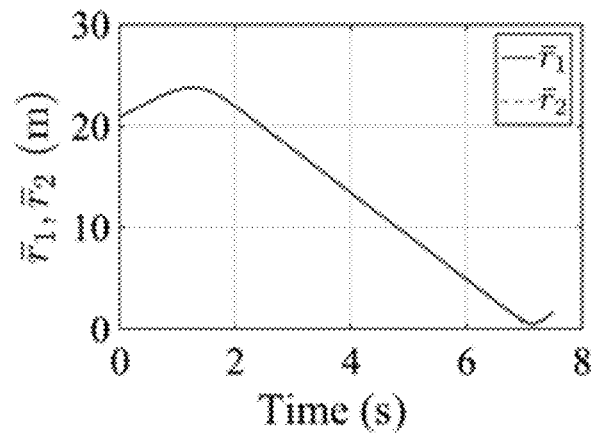

FIGS. 32A-B show representations of time history of the semimajor axis of an ellipse and the distance of B to the two foci.

Figure 33:
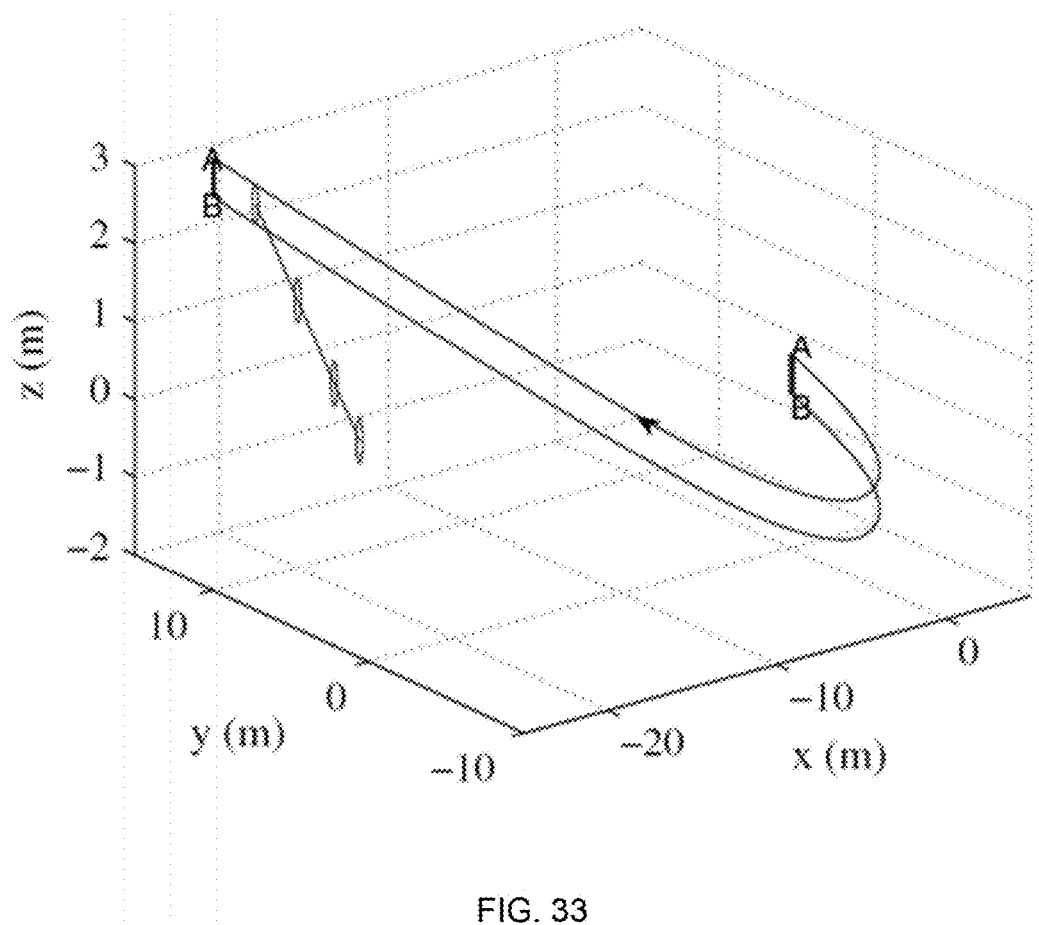

FIG. 33 depicts an example 3D trajectory of AB as it passes through an example moving and closing ellipse E.

Figures 34A, 34B, 34C:
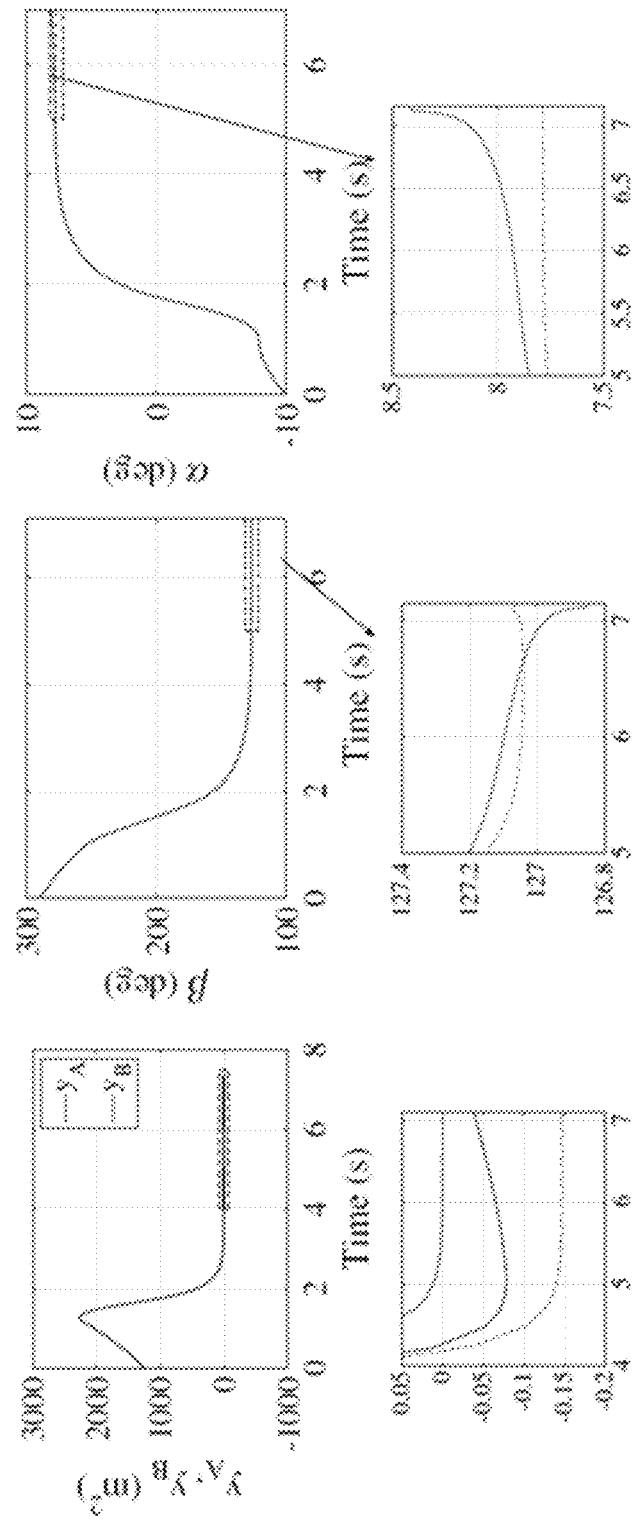

FIGS. 34A-C depict example representations of output responses, azimuth angle, and elevation angle.

Figure 35A:
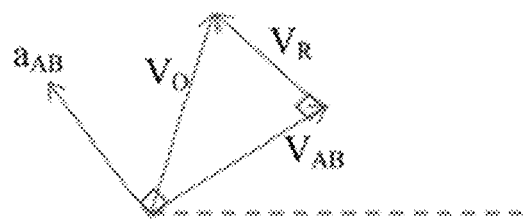
Figure 35B:
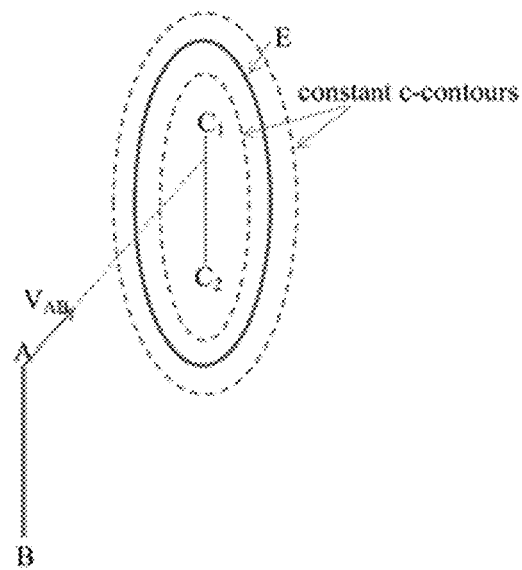

FIGS. 35A-B are illustrations of singular cases.

Like reference numbers and designations in the various drawings indicate like elements.

DETAILED DESCRIPTION

This specification describes techniques, systems, devices, and apparatus for autonomously controlling a robotic vehicle to execute a precise three-dimensional (3-D) maneuver through an opening. Specifically, the robotic vehicle can be controlled through an opening by applying a control feedback loop consisting of identifying the vehicle's velocity vector and orientation relative to the opening; determining, through the application of analytical guidance laws described herein, an acceleration vector that will direct the vehicle through the opening based on the relative velocity vector of the vehicle and the orientation of the vehicle; and controlling the vehicle through the opening according to the calculated acceleration vector.

Figure 1:
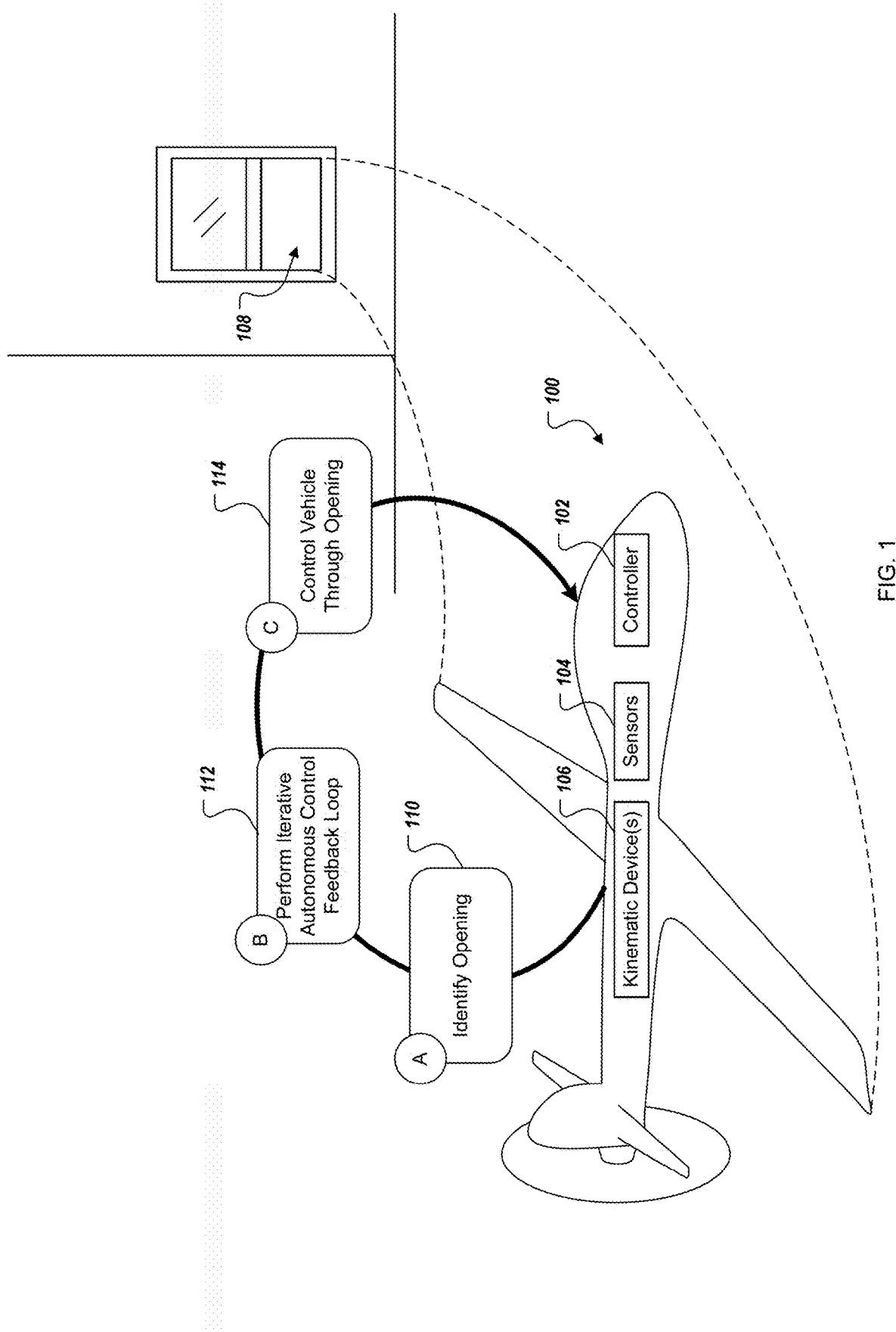
FIG. 1 depicts an example vehicle being autonomously guided through an example opening.

FIG. 1 depicts an example vehicle 100 being autonomously guided through an example opening 108. The example vehicle 100 that is depicted is a fixed-wing aircraft, such as an unmanned fixed-wing aircraft that can operate autonomously (without substantial human operator direct) and/or semi-autonomously (capable of operating with human operator control during some periods of time and under autonomous control during other periods of time). The fixed-wing aircraft is one example type of the vehicle 100, which can be other types of autonomous and/or semi-autonomous vehicles as well, such as quadrotors, other air-based vehicles, land-based vehicles (e.g., cars, bipedal robots), water-based vehicles (e.g., submersible robots, boats), and/or vehicles operating in a vacuum (e.g., spacecraft, satellites). The opening 108 can be any type of void, whether partially or fully defined by a contiguous border, through which the vehicle 100 is able to physically pass through, given the appropriate guidance, as this document describes. For example, the opening 108 can be a window or door in a building, a space between two buildings (e.g., slit bounded on two sides), a hole in a wall, and/or other types of openings. The opening can have arbitrary shapes, such as those formed by a shattered glass pane, or a ragged hole punched in a wall or a ship's hull by some explosive device. The opening 108 can be, for example, sufficiently small in relation to the size of the vehicle 100 that a human operator would have difficult guiding the vehicle 100 through the opening 108 while maintaining at least a minimum speed (e.g., minimum speed to maintain flight) without colliding with one or more sides of the opening. The techniques described throughout this document provide a guidance law (e.g., Eqs. 30 and 44-45, as described below) for autonomously guiding the vehicle 100 through the opening while avoiding collisions with the perimeter of the opening 108.

The example vehicle 100 includes a controller 102 that can use information from sensors 104 to control the kinematic devices 106 on the vehicle 100 according to the guidance law to successfully guide the vehicle 100 through the opening 108. The controller 102 can be any of a variety of appropriate controller device, such as a combination of one or more processors, microcontrollers, application specific integrated circuits (ASICs), and/or other controller device that is programmed to implement the guidance law. The sensors 106 can provide information about the surrounding environment and the vehicle's state within the surrounding environment, such as orientation, azimuth, velocity, acceleration, relative positioning and orientation with regard to the opening 108, and/or other information. The kinematic devices 106 are devices that control the movement of the vehicle 100 through a medium, which for the example fixed-wing aircraft is air (other examples are land, water, and a vacuum (outer space)). For example, the kinematic devices 106 can include propellers, flaps, ailerons, spoilers, slats, rudders, elevators, and/or other kinematic devices.

The controller 102 can guide the vehicle 100 through the opening 108 by identifying the opening 108 (step A, 110). For example, the sensors 104 can automatically identify the opening 108 and/or the opening can be identified/tagged by a human operator or other device in communication with the vehicle 100. The controller 102 can iteratively perform an autonomous control feedback loop to continually determine an instantaneous acceleration that should be achieved by the vehicle 100 to maintain a trajectory through the opening 108, given the current velocity and orientation relative to the opening 108 (step B, 112). The controller 102 can control operation of the kinematic devices 106 to achieve the determined acceleration (step C, 114), so that the iterative performance of steps B and C successfully guides the vehicle 100 through the opening 108.

Although the controller 102 and the steps A-C are depicted as being local with the vehicle 100, some or all of these features can be shifted to a remote device or system that has a communication connection (e.g., wireless channel) with sufficiently low latency so that control signals can be determined by the remote device/system and conveyed to control the vehicle 100 in real time. In such instances, the vehicle 100 and its controller 102 can be programmed to control the kinematic devices 106 according to control signals from a remote device/system that is implementing the guidance law based, at least in part, on information conveyed from the sensors 104 and/or other sensors providing information regarding the vehicle 100.

Although the vehicle 100 is described as possibly being an unmanned vehicle, it can also be a manned vehicle. For example, the vehicle 100 can be an aircraft manned by an onboard pilot who can toggle operation of the vehicle 100 into an autonomous mode of control in which the controller 102 guides the vehicle through an opening 108.

Figure 2:
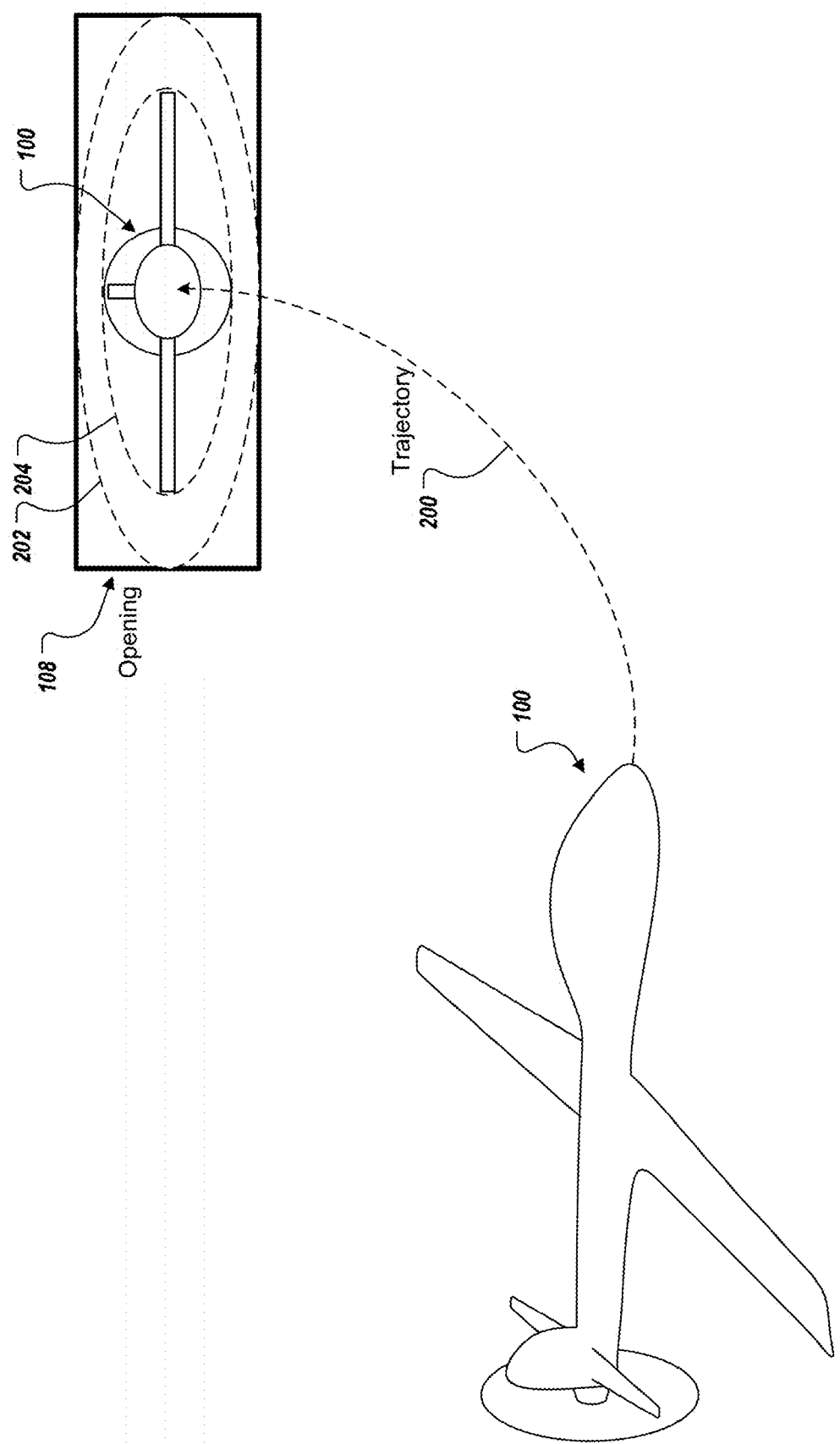
FIG. 2 depicts example representations of the opening and the vehicle as ellipses that can be used to determine a trajectory to guide the vehicle through the opening.

FIG. 2 depicts example representations of the opening 108 and the vehicle 100 as ellipses that can be used to determine a trajectory 200 to guide the vehicle 100 through the opening 108. For example, the opening 108 is represented by an ellipse 202, that is the largest ellipse that will fit the opening 108. Similarly, the vehicle 100 is represented by an ellipse 204 that is the smallest ellipse that bounds the entire perimeter of the vehicle 100. Identifying the ellipses 202 and 204, identifying position and orientation of ellipse 204 so that it will fit within the ellipse 202, and determining a trajectory for the vehicle to achieve the positioning of the ellipse 204 within the ellipse 202 are described below in greater detail.

FIGS. 3A-C depict example systems 300, 330, and 360 for guiding example vehicles 301, 331, and 361 through the opening 302. The vehicles 310, 331, and 361 can be similar to the vehicle 100 described above with regard to FIGS. 1-2.

FIG. 3A depicts example system 300 that includes a vehicle 301 (e.g., fixed-wing vehicle, quadrotor, multi-rotor vehicle such as a hexacopter, land-based vehicle, water-based vehicle, space-based vehicle) that includes a local controller 310 onboard the vehicle 301 to guide the vehicle 301 through the opening 302. The system 300 can also include a remote system 304 and/or a remote controller 306 operated by a user 308. One or both of the remote system 304 and the remote controller 306 can control, at least in part, operation of the vehicle 301 via wireless (or in some instances, wired) communication with the vehicle 301. The remote system 304 and/or the remote controller 306 can activate an autonomous mode of operation on the vehicle 301, effectively handing off guidance of the vehicle 301 to the controller 310 to autonomously control the vehicle 301 through the opening 302.

The controller 310 includes a guidance law 312 that is integrated with the controller 310 to determine an acceleration (magnitude and direction) for the vehicle based, at least in part, on the dynamics of the vehicle 301 (e.g., fixed-wing micro air vehicles, quadrotors, underwater robotic fish, and others). For example, the guidance law 312 can be applied to generate acceleration $a_{AB}$ (acceleration for a rod AB corresponding to the end points of the ellipse representing the vehicle 301) along with the angles γ and δ. Depending on the specific type of vehicle, the acceleration generated by the guidance law can be converted into equivalent control commands for controlling the vehicle 301 within the medium it is travelling through/on (e.g., air, water, land, vacuum). For example, the commanded acceleration $a_{AB}$ can be resolved into its three mutually perpendicular components $a_x$, $a_y$, and $a_z$.

A command logic 314 can be implemented as part of the controller 310 to convert the acceleration $a_{AB}$ and its component parts along with the angles γ and δ into vehicle-specific commands for controlling the vehicle 301, such as force and orientation requirements to achieve the desired acceleration. These requirements are then converted into control requirement commands by vehicle-specific dynamics 316 for the kinematic features that are part of the vehicle 301. For example, the vehicle-specific dynamics 316 can be used to generate force and torque commands for each rotor on a quadrotor, and/or other multi-rotor vehicle such as a hexacopter, and can be used to generate elevator, aileron, and rudder control surface deflection commands for a fixed-wing micro air vehicle. Other vehicle-specific dynamics 316 and control requirement commands are also possible, depending on the type of the vehicle 301. These control requirement commands can be used by the controller 310 to control the kinematic devices on the vehicle 301 in order to achieve the determined acceleration in order to autonomously guide the vehicle 301 through the opening.

The control requirement commands can be combined with orifice (opening) information, including position and/or velocity information for the orifice, using relative velocity kinematics 318 to determine the orientation, velocity, and position of the vehicle 301 relative to the opening. These orientation, velocity, and position information can then be used to update the safe passage cone computations 320 given the current control commands and relative positioning, orientation, and velocity between the vehicle 301 and the orifice. As depicted in FIG. 3A, the controller 310 uses a closed-feedback loop to repeatedly and iteratively determine control commands for the kinematic devices on the vehicle 301 until the vehicle passes through the opening 301. In some instances, after passing through the opening 302, the vehicle 301 can handoff control back to the remote controller 306 and/or the remote system 304. In other instances, the maneuver through the opening 302 may be one of multiple autonomous control sequences performed by the vehicle 301, so control of the vehicle 301 can remain with the controller 310 after passing through the opening 302.

The controller 310 can take into account kinematic constraints, such as vehicle and acceleration limits. For example, the acceleration generated by the guidance law 314 can be applied normal to the velocity vector of the vehicle 301. This means that the guidance law 314 does not require the vehicle 301 to increase or decrease its current speed, and therefore the guidance law 314 will not make the vehicle 301 hit its (translational) speed limits. If the magnitude of the commanded acceleration becomes higher than the vehicle 301 can handle, then the magnitude of the gain K in the guidance law 314 can be appropriately lowered. If the acceleration limit is ever reached, then this simply has the effect of reducing the rate of rotation of the velocity vector and would potentially play a role only when the initial condition is such that the vehicle 301 is too close to the ellipse. In such a case, the developed guidance law 314 can still be used to take the vehicle 301 a short distance away from the ellipse and then turn its velocity vector around toward the ellipse.

Referring to FIG. 3B, the example system 330 includes the same components as the system 300, but in this example the controller 340 (similar to the controller 310) is remote from the vehicle 331, such as being located on the remote system 334 and/or on the remote controller 336. The controller 340 includes the guidance laws 342, control logic 344, vehicle-specific dynamics 346, relative velocity kinematics 348, and safe-passage cone computations 350 similar to the guidance law 312, control logic 314, vehicle-specific dynamics 316, relative velocity kinematics 318, and safe-passage cone computations 320 described for the local controller 310. In such an implementation, to effectively guide the vehicle 331 through the opening 302, the remote controller 336 and/or the remote system 334 may need a communication connection (e.g., wireless communication channel) with the vehicle 331 that has sufficiently low latency so that control commands provided to the vehicle 331 are able to be executed in real time and with minimal delay. For example, the remote controller 336 and/or the remote system 334 may need to be located in or around the vicinity of the vehicle 331. In such an implementation, the remote controller 336 and/or the remote system 334 may toggle between manual and autonomous control of the vehicle 331, for example, using the controller 340.

Referring to FIG. 3C, the example system 360 depicts an example of the system 300 for a specific type of vehicle, which in this example is a quadrotor vehicle 361 to be guided through the opening 302. Other vehicle-specific implementations of the system 300 can also be provided for other types of vehicles, such as fixed-wing micro air vehicles, quadrotors, underwater robotic fish, and others.

Like the system 300, the system 360 includes a remote controller 366 and a remote system 364 that can, in some instances, remotely control operation of the quadrotor 361 and can handoff control to the local controller 370 (similar to the controller 310) to autonomously guide the quadrotor 361 through the opening 302. The controller 370 includes a guidance law 372 (similar to the guidance law 312) to generate acceleration (magnitude and direction) for the quadrotor 361 that can be converted into equivalent control surface commands. For example, in the case of the quadrotor 361, the commanded acceleration $a_{AB}$, in conjunction with the angles $\gamma$ and $\delta$, can be resolved into its three mutually perpendicular components $a_x$, $a_y$, and $a_z$. The command logic 374 (similar to the command logic 314) can transform the normal component of the commanded acceleration $a_z$ into a normal force requirement F on the quadrotor 361, using the following relation:

$$F = \max\left(\frac{m(g - a_z)}{\cos\phi_q \cos\theta_q} \cdot 0\right)$$

where $\varphi_q$ and $\theta_q$ represent the bank and pitch angles, respectively, of the quadrotor 361. The forward and lateral components of the commanded acceleration $a_x$ and $a_y$ can additionally be transformed into commanded values of bank angle $\varphi_c$ and pitch angle $\theta_c$, using the following relations:

$$\phi_c = \tan^{-1}\left(\frac{a_y \cos\theta_q}{g - a_z}\right)$$

$$\theta_c = \tan^{-1}\left(\frac{a_x}{a_z - g}\right)$$

These are then converted by quadrotor-specific dynamics 372 into torque requirements about the roll and pitch axes, denoted by $\tau_\varphi$ and $\tau_\theta$, respectively, using the relations $\tau_\varphi = K_q(\varphi_c - \varphi_q) - K_{qd}P$, $\tau_\theta = K_q(\theta_c - \theta_q) - K_{qd}Q$, where P and Q represent the roll and pitch rates of the quadrotor 361, and K, $K_{qd}$ represent gains. The quadrotor-specific dynamics 372 takes these quantities together with F, $\tau_\varphi$, $\tau_\theta$ and converts them into individual force and torque requirements on each of the four rotors, which are used to control operation of the rotors on the quadrotor 361 to guide it through the opening 302. The controller 370 additionally includes relative velocity kinematics 378 (similar to relative velocity kinematics 318) and safe-passage cone computations 380 (similar to safe-passage cone computations 320).

FIG. 4 is a flowchart of an example technique 400 for autonomously guiding a vehicle through an opening. The example technique 400 can be performed by any of a variety of vehicles, such as the vehicle 100, the vehicle 301, the vehicle 331, the vehicle 361, and/or other types of vehicles capable of autonomous and/or semi-autonomous control.

In some instances, autonomous control of a vehicle can be initiated (402). For example, the remote controller 306 and/or the remote system 304 can initiate local autonomous control by the vehicle 301 through the opening 302. The opening can be identified (404) and an iterative control feedback loop (406) can be performed to guide the vehicle through the opening. In some instances, the current size and position of a changing opening (408) can be determined as part of each iteration. Each iteration can additionally include identifying a relative velocity and orientation of the vehicle relative to the opening (410), determining a target acceleration to guide the vehicle along a trajectory through the opening (412), and to control the vehicle to achieve the determined acceleration (414). For example, the controller 310, 330, and 370 can each repeatedly perform the iterative steps 408-414 to guide the vehicles 301, 331, and 361, respectively, through the opening 302. If the vehicle is not yet through the opening (416), then the steps 408-414 can be repeated until the vehicle passes through the opening, after which, in some instances, control of the vehicle can be handed off to another device, controller, and/or system (418).

FIGS. 5A-B depict example representations of fitting ellipses to a variety of differently shaped openings. Ellipses can be used to represent orifices through which a vehicle will pass because ellipses can be fitted to a variety of differently shaped orifices. For example, FIG. 5A depicts an ellipse being fitted to a rectangular window and FIG. 5B depicts an ellipse being fitted to an arbitrarily shaped window. Referring to FIG. 5A, a rectangular window can be well approximated by an ellipse and the eccentricity of the ellipse can be appropriately adjusted to fit a wide range of rectangular window sizes. A circle can be considered as a special case of an ellipse having zero eccentricity, and it can be used to fit into a square window. For arbitrarily shaped orifices, largest ellipse that fits within the confines of the window can be constructed and then model the problem as one of guiding the robot through this ellipse.

Shapes of aerial robots (e.g., a quadrotor, a fixed-wing vehicle) used for path planning and obstacle avoidance have been approximated by circles/spheres. However, a fixed-wing aircraft, when viewed from the front, is better approximated by an ellipse. A quadrotor viewed from the front has one of its sides longer than the other and, therefore, is also better approximated as an ellipse. Therefore, in the techniques described in this specification, the shape of the front of the vehicle is modeled by an ellipse. FIGS. 6A-D depict examples of a vehicle represented by an ellipse being guided through an elliptical orifice. In each of these examples, the vehicle is represented by an ellipse with an imaginary line AB defining the outer bounds of the ellipse (e.g., line AB representing the widest/longest part of the ellipse) that can be used to guide the ellipse through the orifice. For instance, guidance laws can be applied to an ellipse with its line AB such that the passage of the rod AB through the orifice is equivalent to passage of the vehicle through the orifice. The rod is not guided head-first through the orifice (like a javelin) because that would not be equivalent to guiding the vehicle through the orifice. Instead, as depicted in FIGS. 6A-D, the rod AB is passed through perpendicular to the movement of the vehicle (substantially parallel to the plane of the orifice). However, the absolute and relative orientations of the elliptical orifice and the elliptical vehicle model may be arbitrary so long as the rod AB is able to fit through the orifice, as depicted across the examples in FIGS. 6A-D.

Toward the development of this guidance law, a relative velocity framework is used to define a safe-passage cone through a window or passage. The safe-passage cone is defined as the instantaneous cone of velocities of an object to pass through an orifice. A similar relative velocity framework was used to define collision cones and has been found to be very useful in the collision avoidance literature. However, in these documents, collision avoidance essentially meant trying to avoid having the velocity vector inside the collision cone. The concept in the safe passage cone is quite different in that the velocity vector is driven into the safe-passage cone. For instance, consider a scenario wherein the initial velocity vector of the robot is pointing in a direction opposite to the window that it needs to pass through. Such a scenario is irrelevant in the collision-avoidance problem because the velocity vector lies well outside the collision cone to the window but is relevant in the safe-passage problem because the guidance law will be used to turn the velocity vector around and drive it into the safe-passage cone to the window. This can be achieved through guidance laws that have a state-dependent switching nature, which is absent in the collision-avoidance problem and is an idea that has not been exploited or used in any of the collision-avoidance literature, irrespective of whether they use collision cones or velocity obstacles. The safe-passage cone shares several properties with the collision cone, including that closed-form expressions can be computed even for passages that are not necessarily circular.

The rest of this specification is organized as follows. Section II gives a few preliminary results about moving point-mass objects and basic geometric definitions that are used in this document. Section III discusses the determination of the safe-passage cone between a point and an elliptical orifice as well as several considerations to be taken into account for safe passage using this cone. Section IV describes a guidance law for a rod-shaped object through a stationary elliptical orifice. Section V discusses how the guidance law can be modified when the orifice is moving, whereas Sec. VI discusses how the guidance law is modified to take into account scenarios wherein the elliptical orifice changes in size with time. Section VII discusses several guidance-law considerations. Finally, Sec. VIII presents the conclusions.

II. Preliminary Results

A. Basic Results for Point Objects

This section outlines a few preliminary results governing moving point-mass objects. Referring to FIG. 7, which depicts the geometry of two point objects moving in 3D space, consider two point objects A and C moving with constant velocities $V_A$ and $V_C$. The coordinate axes (i, j, k) represent a nonrotating frame fixed at point A. The relative velocity components of the line of sight (LOS) AC are represented by $V_\theta$, $V_\varphi$, $V_r$, where $V_r$ is the relative velocity component along the LOS, and $V_\theta$ and $V_\varphi$ are the relative velocity components orthogonal to the LOS, with $V_\theta$ being the component parallel to the (i, j) plane. Let $\theta$ and $\varphi$ represent the azimuth and elevation angles of the LOS. Let ($\beta$, $\alpha$) and ($\mu$, $\eta$) represent the azimuth and elevation angle pairs associated with the velocity vectors $V_A$ and $V_C$, respectively. This leads to the following equations:

$$V_\theta = r\dot\theta \cos\varphi = V_C \cos\eta \sin(\mu-\theta) - V_A \cos\alpha \sin(\beta-\theta) \quad (1)$$

$$V_\varphi = r\dot\varphi = V_C\{-\cos\eta \sin\varphi \cos(\mu-\theta) + \sin\eta \cos\varphi\} - V_A\{-\cos\alpha \sin\varphi \cos(\beta-\theta) + \sin\alpha \cos\varphi\} \quad (2)$$

$$V_r = \dot r = V_C\{\cos\eta \cos\varphi \cos(\mu-\theta) + \sin\eta \sin\varphi\} - V_A\{\cos\alpha \cos\varphi \cos(\beta-\theta) + \sin\alpha \sin\varphi\} \quad (3)$$

Differentiating the equations on the extreme right of each of Eqs. (1-3), while retaining the constant velocity assumption and then rearranging them, results in the following equation:

$$\dot V_\theta = -\dot\theta(V_r \cos\varphi - V_\varphi \sin\varphi); \dot V_\varphi = -\dot\varphi V_r - \dot\theta V_\theta \sin\varphi; \dot V_r = \dot\varphi V_\varphi + \dot\theta V_\theta \cos\varphi \quad (4)$$

Since the velocities $V_A$ and $V_C$ are constants, the relative velocity is also constant, that is:

$$V_\theta^2 + V_\phi^2 + V_r^2 = c^2 \quad (5)$$

where $c^2 = V_{\theta 0}^2 + V_{\phi 0}^2 + V_{r0}^2$ is a constant. Multiplying r on both sides of each of the equations in Eq. (4) and using Eqs. (1-3), results in the following equation:

$$r\dot{V}_\theta = -V_\theta V_r + V_\phi V_\theta \tan\phi; r\dot{V}_\phi = -V_\phi V_r - V_\theta^2 \tan\phi; r\dot{V}_r = V_\theta^2 + V_\phi^2 \quad (6)$$

Using the third equation of Eq. (6), Eq. (5) can be written as the following:

$$r\dot{V}_r + V_r^2 = c^2 \Rightarrow r\ddot{r} + \dot{r}^2 = c^2 \quad (7)$$

Since $d/dt(r\dot{r}) = r\ddot{r} + \dot{r}^2$, $\dot{r}$ the preceding equation can be integrated to obtain:

$$r\dot{r} = c^2 t + b \quad (8)$$

where $b = r_0 V_{r0}$ is a constant. Since the right-hand side of the last equation in Eq. (6) is positive, and r>0, it can be inferred that $\dot{V}_r > 0$, that is, the ($V_\theta$, $V_\phi$, $V_r$) trajectory moves along the direction of increasing $V_r$. Thus, when visualized in the ($V_\theta$, $V_\phi$, $V_r$) space, a trajectory originating from the $V_r<0$ region moves into the $V_r>0$ region because $\dot{V}_r>0$ always. At the time instant (say, $t=t_m$) when the trajectory penetrates the $V_r=0$ plane, r is a minimum. Let $r(t_m)=r_m$. Substituting this in Eq. (8), results in the following equation:

$$0 = c^2 t_m + b \Rightarrow t_m = -\frac{b}{c^2} \Rightarrow t_m = -\frac{r_0 V_{r0}}{V_{\theta 0}^2 + V_{\phi 0}^2 + V_{r0}^2} \quad (9)$$

Then, from Eq. (5), it can be inferred that, at $t=t_m$:

$$V_{\theta m}^2 + V_{\phi m}^2 = V_{r0}^2 + V_{\theta 0}^2 + V_{\phi 0}^2 \quad (10)$$

where $V_{\theta m}$ and $V_{\phi m}$ represent $V_\theta t_m$ and $V_\phi t_m$, respectively. Multiplying $V_\theta$ and $V_\phi$ on both sides of the first two equations of Eq. (4), respectively, and adding, results in the following:

$$\frac{V_\theta \dot{V}_\theta + V_\phi \dot{V}_\phi}{V_\theta^2 + V_\phi^2} = -\frac{\dot{r}}{r} \Rightarrow \frac{V_\theta^2 + V_\phi^2}{V_{\theta 0}^2 + V_{\phi 0}^2} = \left(\frac{r_0}{r}\right)^2 \quad (11)$$

Putting $r=r_m$ at $t=t_m$ and substituting from Eq. (10), leads to the following:

$$r_m^2 = r_0^2 \left(\frac{V_{\theta 0}^2 + V_{\phi 0}^2}{V_{\theta 0}^2 + V_{\phi 0}^2 + V_{r0}^2}\right) \quad (12)$$

Finally, from Eqs. (9) and (12), it is possible to obtain r(t) in terms of $r_m$ and $t_m$ as follows:

$$r^2(t) = r_m^2 + (V_\theta^2 + V_\phi^2 + V_r^2)(t-t_m)^2 \quad (13)$$

B. Basic Geometric Definitions

In this subsection, some basic geometric definitions and properties are outlined that will be used in the specification. An ellipse E is described by the locus of points such that the sum of their distances to the two foci is constant. Thus, for any point P on the ellipse, if $r_1$ and $r_2$ represent the distances of P to the two foci, then $r_1+r_2=2a$, where a is the semi-major axis of E. A spheroid S is defined as the surface of revolution formed by rotating E about its major or minor axis. Points on the surface of S also satisfy the condition $r_1+r_2=2a$, where a is the length of the semi-major axis of S. If E is represented by the equation $(x/a)^2+(y/b)^2=1$, then the spheroid S obtained by rotating E about its major axis would be represented by the equation $(x/a)^2+(y/b)^2+(z/b)^2=1$.

The distance between the two foci of S is equal to 2ae, where $e=\sqrt{1-(b/a)^2}$ is the eccentricity, and b is the length of the semi-minor axis of S (and of E). Further, $e \in [0;1)$. In the limiting case when e=0, S becomes a sphere. With increasing values of e, S becomes progressively more elongated along one dimension compared to the other.

III. Safe-Passage Cone

The preceding basic results are now used to determine the safe passage cone. Consider the ellipse in FIG. 5. An imaginary spheroid S is constructed by rotating E about its major axis. The reason for its construction is that its three-dimensional nature enables the determination of guidance laws for three-dimensional maneuvers, using the notion of miss distance. The fact that miss distance is inherently a radial quantity makes the use of a spheroid more convenient, and this convenience is not readily available if the two dimensional ellipse is embedded in 3-D physical space. Note that the construction of the spheroid is solely for analysis purposes and is not required or used for the actual implementation of the guidance laws outlined in this specification. Now, consider a moving object A. The safe passage cone is defined as the instantaneous cone of velocities of A that will cause A to pass through S (which may also be moving). In this section, first, the safe-passage cone is determined, and then several considerations are discussed that may to be taken into account for ensuring safe passage.

A. Safe-Passage Cone Between a Point Object and a Spheroid

FIG. 8 shows an example of a safe-passage geometry between a point and a spheroid. For example, FIG. 8 shows the engagement geometry between a point object A and a spheroid S moving with constant velocities $V_A$ and $V_S$, respectively. Since the spheroid S is an orifice, engagement between the object A and a spheroid S will be passage of the object A through the spheroid S. Here, $C_1$ and $C_2$ are the two foci of the spheroid, and a is its semi-major axis. The distances $AC_1$ and $AC_2$ are denoted by $r_1$ and $r_2$. Further, $V_{\theta 1}$, $V_{\phi 1}$, $V_{r1}$ are the relative velocity components of $C_1$ with respect to A. Here, $V_{r1}$ is the relative velocity component along the LOS $AC_1$, whereas $V_{\theta 1}$ and $V_{\phi 1}$ are the relative velocity components orthogonal to $AC_1$. Referring still to FIG. 8, (i, j, k) represents the same nonrotating frame, fixed at point A, as shown in FIG. 7. The vectors $V_{r1}$ and $V_{r2}$ lie along $AC_1$ and $AC_2$, respectively. The $V_{\theta 1}$ and $V_{\theta 2}$ vectors are both parallel to the (i, j) plane and represent, respectively, the components of the relative velocities of $AC_1$ and $AC_2$ parallel to the (i, j) plane. Further, $\theta_1$ and $\phi_1$ are the azimuth and elevation angles of $AC_1$. The quantities $V_{\theta 2}$, $V_{\phi 2}$, $V_{r2}$, $\theta_2$, and $\phi_2$ are correspondingly defined for $AC_2$. Then, the expressions for the relative velocity components of $AC_i$, i=1, 2, are as follows:

$$V_{\theta i} = r_i \dot{\theta}_i \cos\phi_i = V_S \cos\eta \sin(\mu-\theta_i) - V_A \cos\alpha \sin(\beta-\theta_i) \quad (14)$$

$$V_{\phi i} = r_i \dot{\phi}_i = V_S\{-\cos\eta \sin\phi_i \cos(\mu-\theta_i) + \sin\eta \cos\phi_i\} - V_A\{-\cos\alpha \sin\phi_i \cos(\beta-\theta_i) + \sin\alpha \cos\phi_i\} \quad (15)$$

$$V_{ri} = \dot{r}_i = V_S\{\cos\eta \sin\phi_i \cos(\mu-\theta_i) + \sin\eta \sin\phi_i\} - V_A\{\cos\alpha \cos\phi_i \cos(\beta-\theta_i) + \sin\alpha \sin\phi_i\} \quad (16)$$

where the velocity vectors for $V_A$ and $V_S$ are defined by the angle pairs ($\beta$, $\alpha$) and ($\mu$, $\eta$), respectively, which are the azimuth and elevation angle pairs for these vectors. The miss distance $r_{mi}$ between A and $C_i$ is obtained from Eq. (12) as the following:

$$r_{mi}^2 = r_i^2 \left( \frac{V_{\theta i}^2 + V_{\phi i}^2}{V_{\theta i}^2 + V_{\phi i}^2 + V_{ri}^2} \right); \quad i = 1, 2 \tag{17}$$

Note that $r_{mi}$ represents, at time t, a prediction of what the miss distance would be if the points A and $C_i$ move with constant velocities for all future time. When A and $C_i$ move with constant velocities, then $r_{mi}$ remains a constant, whereas if A and/or $C_i$ move with varying velocities, then $r_{mi}$ varies with time. In general, therefore, $r_{mi}$ represents a predicted miss distance. Associated with this miss-distance prediction is a predicted miss time $t_{mi}$, which is the predicted time at which miss distance $r_{mi}$ would occur, and using Eq. (9), this is given by the following:

$$t_{mi} = -\frac{r_i V_{ri}}{V_{\theta i}^2 + V_{\phi i}^2 + V_{ri}^2}; \quad i = 1, 2 \tag{18}$$

Note that both Eqs. (17) and (18) assume that the initial engagement between A and $C_i$ commences with $V_{ri}<0$. If the initial engagement commences with $V_{ri}>0$, then $t_{mi}$ computed from Eq. (18) is negative and represents the time at which closest approach would occur if the trajectories of both A and $C_i$ are projected backward in time. Using Eq. (13), the distance $r_i(t)$ can be written in terms of $r_{mi}$ and $t_{mi}$ as follows:

$$r_i^2(t) = r_{mi}^2 + (V_{\theta i}^2 + V_{\phi i}^2 + V_{ri}^2)(t - t_{mi})^2; i=1,2 \tag{19}$$

While $r_{m1}$ and $r_{m2}$ represent the predicted miss distances of A to $C_1$ and $C_2$, respectively, the predicted miss distance of A to the spheroid S is given by $r_m \triangleq \min_t(r_1+r_2)$. This quantity is determined by setting $d(r_1+r_2)/dt=0$ and solving for the predicted miss time $t_m$, which is found to be the following:

$$t_m = \frac{-r_1 r_2}{\sqrt{V_{\theta 1}^2 + V_{\phi 1}^2 + V_{r1}^2}\sqrt{V_{\theta 2}^2 + V_{\phi 2}^2 + V_{r2}^2}} \times \tag{20}$$

$$\frac{\left[V_{r2}\sqrt{V_{\theta 1}^2 + V_{\phi 1}^2}\sqrt{V_{\theta 1}^2 + V_{\phi 1}^2 + V_{r1}^2} + V_{r1}\sqrt{V_{\theta 2}^2 + V_{\phi 2}^2}\sqrt{V_{\theta 2}^2 + V_{\phi 2}^2 + V_{r2}^2}\right]}{\left[r_1\sqrt{V_{\theta 1}^2 + V_{\phi 1}^2}\sqrt{V_{\theta 2}^2 + V_{\phi 2}^2 + V_{r2}^2} + r_2\sqrt{V_{\theta 2}^2 + V_{\phi 2}^2}\sqrt{V_{\theta 1}^2 + V_{\phi 1}^2 + V_{r1}^2}\right]}$$

Substituting $t = t_m$ in the expression for $r_1(t) + r_2(t)$, leads to the predicted miss distance $r_m$. If this predicted miss distance is less than 2a, then A will pass through S. Quantity $y_A(t)$, which is essentially a function of the predicted miss distance, is then defined as follows:

$$y_A(t) \triangleq \min_t (r_1 + r_2)^2 - 4a^2 \tag{21}$$
$$= A_1^2(1 + \tau V_1^2) + A_2^2(1 + \tau V_2^2) +$$

-continued
$$2A_1 A_2 \sqrt{1 + \tau(V_1^2 + V_2^2) + \tau^2 V_1^2 V_2^2} - 4a^2$$

where $$U_i = \sqrt{V_{\theta i}^2 + V_{\phi i}^2}; V_i = \sqrt{V_{\theta i}^2 + V_{\phi i}^2 + V_{ri}^2}; A_i = r_i U_i / V_i; i=1,2 \tau = ((r_1 V_{r1}/V_1^2 - r_2 V_{r2}/V_2^2)/(r_1 U_1/V_1 + r_2 U_2/V_2))^2 \tag{22}$$

If A and S move with constant velocities for all future time, then $y_A$ remains a constant, where as if A and/or S move with varying velocities, then $y_A$ varies with time and represents, at time t, a prediction of the miss-distance function. $V_i$ represents the relative velocity of the LOS $AC_i$. Similarly, $U_i$ represents the relative velocity component orthogonal to the LOS $AC_i$. As a footnote, in the limiting case when the two foci of the spheroid S coincide, that is, S is a sphere of radius a, and $U_1=U_2$, $V_1=V_2$, $A_1=A_2$, $r_1=r_2=r$, $\tau=0$, $V_{r1}=V_{r2}=V_r$, $V_{\theta 1}=V_{\theta 2}=V_\theta$, $V_{\phi 1}=V_{\phi 2}=V_\phi$, and Eq. (22) reduces to the following:

$$y_A(t) = \frac{4r^2(V_\theta^2 + V_\phi^2)}{V_r^2 + V_\theta^2 + V_\phi^2} - 4a^2 \tag{23}$$

Note that the expression appearing outside the square brackets in Eq. (20) is always negative. Therefore, $t_m > 0$ can occur only when the expression appearing within the square brackets in the numerator of Eq. (20) is negative, that is, $V_{rA} < 0$, where:

$$V_{rA} = \frac{V_{r2}\sqrt{V_{\theta 1}^2 + V_{\phi 1}^2}\sqrt{V_{\theta 1}^2 + V_{\phi 1}^2 + V_{r1}^2} + V_{r1}\sqrt{V_{\theta 2}^2 + V_{\phi 2}^2}}{\sqrt{V_{\theta 2}^2 + V_{\phi 2}^2 + V_{r2}^2}} \tag{24}$$

The safe-passage cone of A to S can be defined as the set of ($V_{\theta 1}$, $V_{\phi 1}$, $V_{r1}$, $V_{\theta 2}$, $V_{\phi 2}$, $V_{r2}$) that satisfy $y_A(t)<0$ and $V_{rA}(t)<0$. It can also be viewed in physical space as the set of headings of A that will cause it to pass through S (this is schematically represented by X in FIG. 8). FIG. 9 shows a partitioning of the 3-D physical space into several regions based on the signs of $y_A$ and $V_{rA}$. In this figure, the surface defined by $y_A=0$ has been extended into the region where $V_{rA}>0$. The plane $V_{rA}=0$ thus partitions the cone $y_A<0$ as shown. If the relative velocity is such that it lies in the $V_{rA}(t)>0$ region, then at time t, A is moving away from S, whereas if it lies in the $V_{rA}(t)>0$, $y_A(t)<0$ region, then A is moving in the opposite direction of S. If it lies in the $V_{rA}(t)<0$ region, then A is moving toward (but not necessarily through) S, whereas if it lies in the $V_{rA}(t)<0$, $y_A(t)<0$ region, then at time t, A is on a path that will take it through S.

B. Considerations for Safe Passage

This section discusses issues associated with getting a rod AB to pass through the elliptical orifice. To do so, an acceleration may be applied so as to drive the relative velocity vector into the safe-passage cone. This subsection considers the case when the ellipse is stationary. Similar results hold for the moving ellipse as well, with some modifications that will be discussed in Sec. V. Consider first the scenario when AB passes through the orifice in such a manner that point A grazes the top of the safe-passage cone. Referring to FIG. 9, wherein the safe-passage cone for point A is defined as the region $y_A<0$, $V_{rA}<0$. Now, consider any planar section of the safe-passage cone that contains the current relative velocity vector placed at A. Let $\alpha_p$ denote the angle of the relative velocity vector on this planar section. The angle $\alpha_p$ is computed from the dot product of the relative velocity vector and a reference line L, where L is the intersection of the planar section and the (i, j) plane. In the special case when the relative velocity vector and the planar section both lie on the (i, j) plane, then L is the i axis. FIG. 10 includes graphs showing representations of a typical plot of $y_A$ as a function of $\alpha_p$ and of typical plot of $V_{rA}$ as a function of $\alpha_p$. The top graph in FIG. 10 show a typical plot of $y_A$ versus $\alpha_p$. The bottom graph in FIG. 10 a typical plot of $V_{rA}$ vs $\alpha_p$. As seen in these graphs, $y_A$ attains two local minima: one in the $V_{rA}<0$ region, and the other in the $V_{rA}>0$ region, and two local maxima occurring at $V_{rA}=0$. The local minima physically correspond to the scenario when the relative velocity vector is aligned with the angular bisector of this planar conical section, while the local maxima correspond to the scenario when the relative velocity vector lies on the $V_{rA}=0$ plane.

Figure 11A:
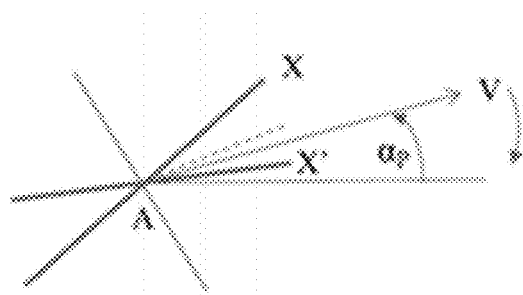
Figure 11B:
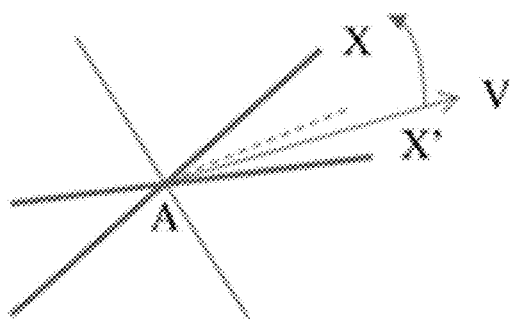
Figure 11C:
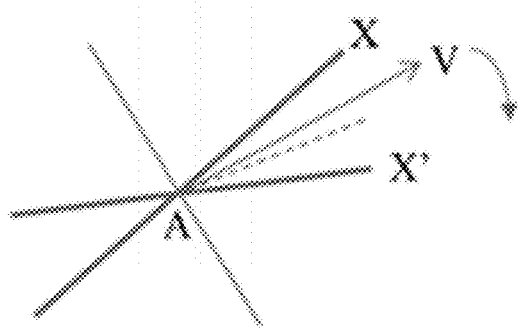
Figure 11D:
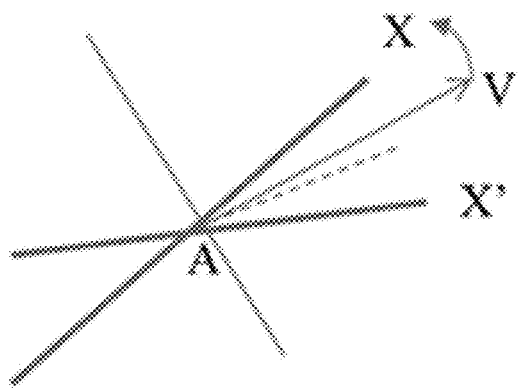
Figure 12A:
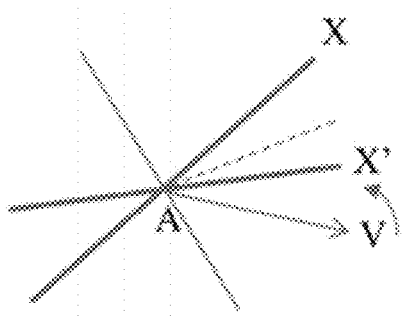
Figure 12B:
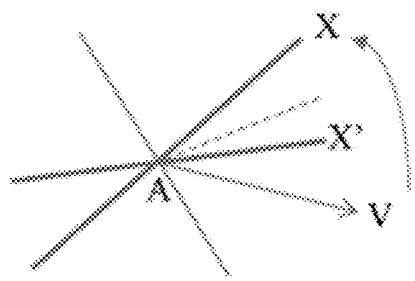
Figure 12C:
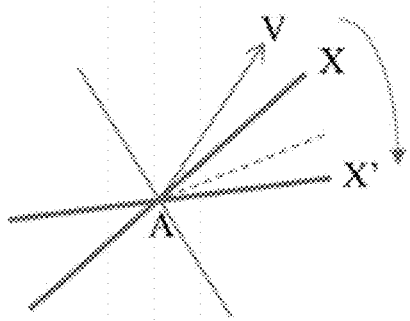
Figure 12D:
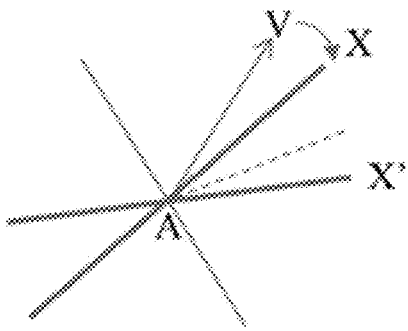
Figure 13A:
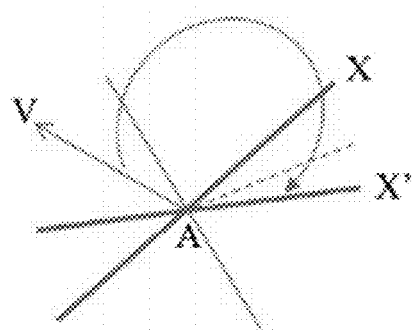
Figure 13B:
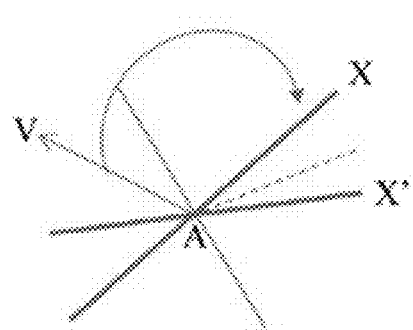
Figure 13C:
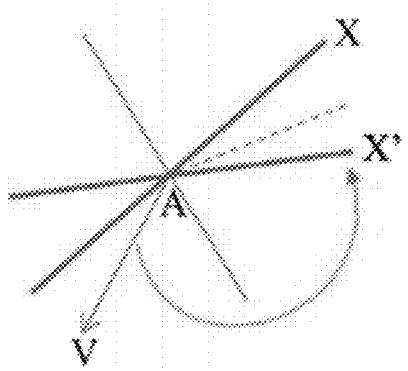
Figure 13D:
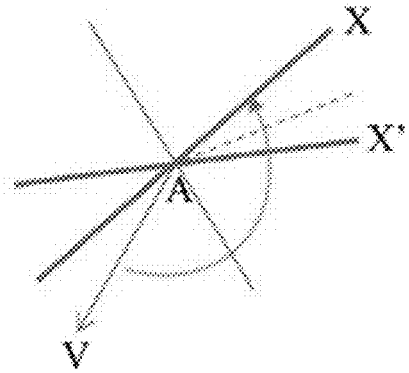
Figure 14A:
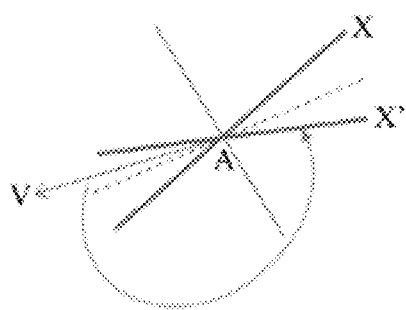
Figure 14B:
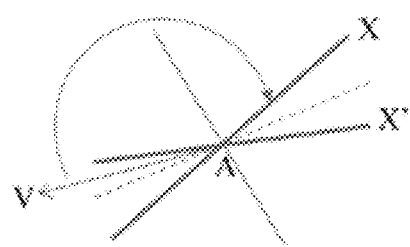
Figure 14C:
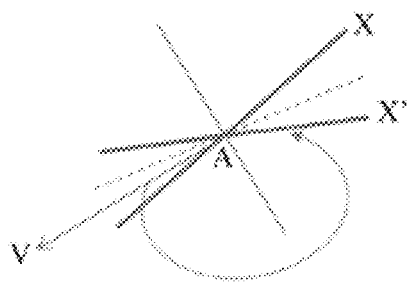
Figure 14D:
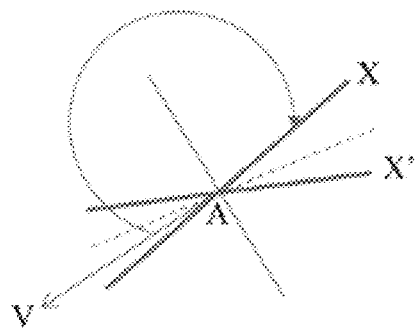

FIGS. 11A-D, 12A-D, 13A-D, and 14A-D show geometries illustrating different scenarios of the relative velocity vector V being located on a planar section of the safe-passage cone XAX'. In FIG. 11A, for example, XAX' represents this planar section of the safe-passage cone, and V represents the relative velocity vector. Because the relative velocity vector lies inside XAX', the following results: $y_A<0$ and $V_{rA}<0$. Note that XAX' comprises two halves: one wherein $\partial y_A/\partial \alpha_p<0$ (that is, an increase in $\alpha_p$ causes a decrease in $y_A$) and another half where $\partial y_A/\partial \alpha_p>0$ (that is, an increase in $\alpha_p$ causes an increase in $y_A$). The dashed line represents the angular bisector that separates these two half-cones, and $y_A$ attains its minimum when V aligns with this dashed line. Defining the "aiming point" as the point through which it is desired that the relative velocity vector passes, the following cases (depicted in FIGS. 11-14), then arise.

Case A: $y_A0<0$, $V_{rA}0<0$.

Figure 15A:
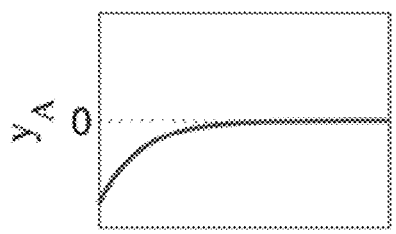

Case A1 (depicted in FIG. 11A): Here, $\partial y_A/\partial \alpha_p{}^t<0$. Assume that the aiming point lies on AX', that is, it is desired to align V with AX, which lies in the same half-cone as V(0). Then, the guidance law needs to be such that it drives $y_A(t)$ to zero monotonically in time, as illustrated in FIG. 15a.

Figure 15B:
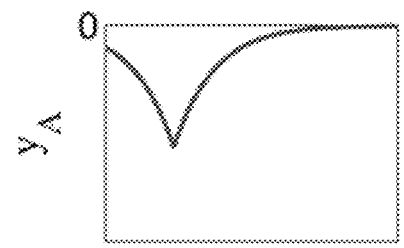

Case A2 (depicted in FIG. 11B): Here, $\partial y_A/\partial \alpha_p j_{t0}<0$. Assume that the aiming point lies on AX, that is, it is desired to align V with AX, which lies in the opposite half-cone. Then, the guidance law needs to be such that it first drives V deeper inside and toward the center of, the safe passage cone, (that is, it decreases $y_A(t)$ until it attains its minimum negative value), and then it subsequently drives $y_A(t)$ to zero. In other words, $y_A(t)$ goes to zero nonmonotonically in time, as illustrated in FIG. 15b.

Cases A3 and A4 (depicted in FIGS. 11C and 11D, respectively): These are counterparts of cases A2 and A1, with aiming points on AX' and AX, respectively, and with the following equation:

$$\left.\frac{\partial y_A}{\partial \alpha_p}\right|_{t=0} > 0$$

The guidance law has a similar effect.

Case B: $y_A0>0$, $V_{rA}0<0$. This corresponds to the situation where V(0) lies outside the safe-passage cone but is otherwise directed toward the wall on which the elliptical window lies.

Figure 15C:
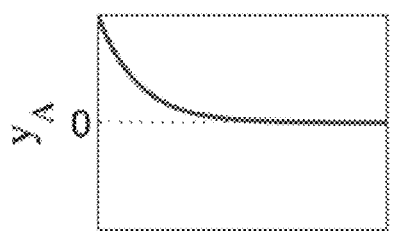

Case B1 (depicted in FIG. 12A): The aiming point lies on AX'. Then, the guidance law needs to be such that it drives $y_A(t)$ to zero monotonically in time, as illustrated in FIG. 15C.

Figure 15D:
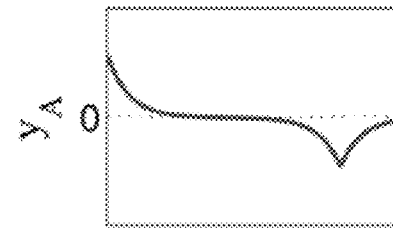

Case B2 (depicted in FIG. 12B): The aiming point lies on AX. The guidance law needs to first drive $y_A(t)$ to zero monotonically so as to align V with AX', after which it needs to drive V deeper into the safe-passage cone, (that is, make $y_A(t)$ more negative), followed by aligning V with AX', (that is, drive $y_A(t)$ to zero). The overall qualitative trajectory of $y_A(t)$ is as illustrated in FIG. 15D.

Cases B3 and B4 (depicted in FIGS. 12C and 12D, respectively): These cases are counterparts of B2 and B1, with aiming points at AX' and AX, respectively.

Case C: $y_A0>0$, $V_{rA}0>0$. This corresponds to the situation wherein V(0) lies outside the safe-passage cone and is directed away from the wall on which the elliptical window lies.

Figure 15E:
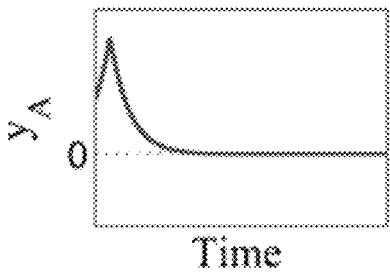
Figure 15F:
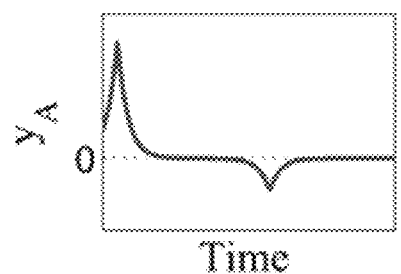
Figure 15G:
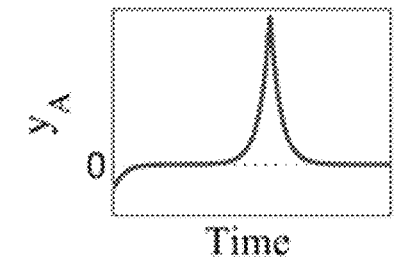

Case C1 (depicted in FIG. 13A): The aiming point lies on AX'. The guidance law needs to be such that it first drives V to the $V_{rA}=0$ plane, (that is, increase $y_A(t)$ to its maximum positive value), and then toward AX and finally to AX', (that is, decrease $y_A(t)$ to its minimum value and eventually to zero), as illustrated in FIG. 15F.

Case C2 (depicted in FIG. 13B): The aiming point lies on AX. The guidance law needs to be such that it first drives $y_A$ toward the $V_{rA}=0$ plane, (that is, increase $y_A(t)$ to its maximum positive value), and then decrease $y_A(t)$ to zero, as illustrated in FIG. 15E.

Cases C3 and C4 (depicted in FIGS. 13D and 13D, respectively): These are counterparts of cases C2 and C1 with aiming points at AX' and AX, respectively.

Case D: $y_A0<0$, $V_{rA}0>0$. This corresponds to the situation wherein V(0) lies outside the safe-passage cone and is directed away from the wall on which the elliptical window lies.

Figure 15H:
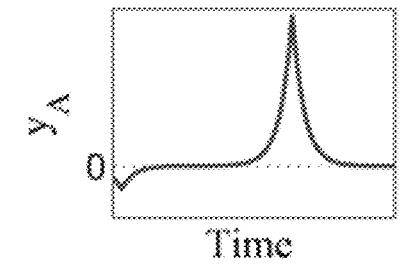

Case D1 (depicted in FIG. 14A): The aiming point lies on AX'. Then, the qualitative nature of $y_A(t)$ is as illustrated in FIG. 15H.

Case D2 (depicted in FIG. 14B): The aiming point lies on AX. Then, the guidance law may be such that it drives $y_A(t)$ to zero, as qualitatively illustrated in FIG. 15G.

Cases D3 and D4 (depicted in FIGS. 10C and 10D, respectively): These are counterparts of cases D2 and D1 with aiming points at AX' and AX, respectively.

Cases D3 and D4 (depicted in FIGS. 14C and 14D, respectively): These are counterparts of cases D2 and D1 with aiming points at AX' and AX, respectively.

IV. Guidance Laws

In this section, guidance laws are discussed that achieve the appropriate qualitative $y_A$ trajectory to pass through an opening depending on the locations of the current relative velocity vector and the aiming point. FIGS. 15A-H show example appropriate qualitative trajectories of $y_A(t)$ to guide a vehicle through an opening. As described above, FIGS. 11-14 show examples of locations of the current relative velocity vector and the aiming point, which can be used to determine the appropriate qualitative trajectories. FIG. 16 shows an example engagement geometry between a rod AB representing an imaginary line drawn on the front of the vehicle, such as quadrotor or fixed-wing vehicle, and an opening. E represents the largest ellipse that can be fit inside the opening, and E' represents any another ellipse corresponding to the rod AB (representing the vehicle) lying inside, and confocal with, E. Also, $C_1$ and $C_2$ represent the foci of E.

Consider the engagement between point A and the ellipse E. Let $r_1 t$ and $r_2 t$ represent the distance of A to the two foci $C_1$ and $C_2$, respectively. If an imaginary spheroid S is constructed that is obtained by rotating E about its major axis, then $y_A$, computed from Eq. (21), represents the miss-distance function of A to S. Note that $y_A$ is, by construction, defined in terms of the distances of A to the foci of S, and because S and E both share the same foci, $y_A$ can also be used as an indicator of the miss-distance function of A to E. When the conditions $y_A < 0$, $V_{rA} < 0$ are satisfied, then A will pass through S, and when the conditions $y_A \leq c < 0$, $V_{rA} < 0$ are satisfied, then A will pass through E. Here, c is a constant quantity used to take care of the fact that E is a subset of S, and details on suitable choice of c that enable AB to pass through E are discussed in Sec. IV.C.

Now, if $y_A(t)$ c is achieved at some t, then this means that, at the instant of closest approach, $(r_1+r_2)^2_{min} - 4a^2 = c$, or equivalently $(r_1+r_2)_{min} = \sqrt{c+4a^2}$. If e represents the eccentricity of the ellipse E, then the distance between the two foci $C_1$ and $C_2$ is 2ae. It follows that, for sqrt($c+4a^2$), that is, for all values of $c > 4a^2(e^2-1)$, the condition $(r_1+r_2)_{min} = \sqrt{c+4a^2}$ would be satisfied by all points that lie on another spheroid S' that is confocal values of c correspond to scenarios wherein S' is larger than S, and with S and has a major axis equal to sqrt($c+4a^2$). Furthermore, positive negative values of c correspond to scenarios wherein S' is smaller than S. FIG. 17 illustrates multiple E' (each corresponding to a different c), and its purpose is to show that, by defining appropriate negative values of c and then applying an acceleration to AB that causes $y_A = c$ to be attained, the point A can be guided through different regions inside the ellipse E, as is demonstrated subsequently. More specifically, FIG. 17 depicts constant values of c that correspond to ellipses E' (spheroids S') confocal with original ellipse E (spheroid S).

A. Determination of Guidance Magnitude Law

The state-space equations governing the kinematics of the four LOSs $AC_1$, $AC_2$, $BC_1$, and $BC_2$ are as follows:

$$\begin{bmatrix} \dot{x}_A \\ \dot{x}_B \end{bmatrix} = \begin{bmatrix} f(x_A) \\ f(x_B) \end{bmatrix} + \begin{bmatrix} h(x_A) \\ h(x_B) \end{bmatrix} a_{AB} \quad (25)$$

where $\dot{x}_A = f(x_A) + h(x_A)\alpha_{AB}$ represents the nonlinear kinematic equations of $AC_1$ and $AC_2$, given by the following:

$$\begin{bmatrix} \dot{r}_1 \\ \dot{\theta}_1 \\ \dot{\phi}_1 \\ \dot{V}_{\theta 1} \\ \dot{V}_{\phi 1} \\ \dot{V}_{r1} \\ \dot{r}_2 \\ \dot{\theta}_2 \\ \dot{\phi}_2 \\ \dot{V}_{\theta 2} \\ \dot{V}_{\phi 2} \\ \dot{V}_{r2} \end{bmatrix} = \begin{bmatrix} V_{r1} \\ V_{\theta 1}/(r_1 \cos\phi_1) \\ V_{\phi 1}/r_1 \\ (-V_{\theta 1} V_{r1} + V_{\theta 1} V_{\phi 1} \tan\phi_1)/r_1 \\ (-V_{\phi 1} V_{r1} - V_{\theta 1}^2 \tan\phi_1)/r_1 \\ (V_{\phi 1}^2 + V_{\theta 1}^2)/r_1 \\ V_{r2} \\ V_{\theta 2}/(r_2 \cos\phi_2) \\ V_{\phi 2}/r_2 \\ (-V_{\theta 2} V_{r2} + V_{\theta 2} V_{\phi 2} \tan\phi_2)/r_2 \\ |(-V_{\phi 2} V_{r2} - V_{\theta 2}^2 \tan\phi_2)/r_2 \\ (V_{\phi 2}^2 + V_{\theta 2}^2)/r_2 \end{bmatrix} + \quad (26)$$

$$\begin{bmatrix} 0 \\ 0 \\ 0 \\ -\cos\gamma \sin(\delta - \theta_1) \\ \cos\gamma \sin\phi_1 \cos(\delta - \theta_1) - \sin\gamma \cos\phi_1 \\ -\cos\gamma \cos\phi_1 \cos(\delta - \theta_1) - \sin\gamma \sin\phi_1 \\ 0 \\ 0 \\ 0 \\ -\cos\gamma \sin(\delta - \theta_2) \\ \cos\gamma \sin\phi_2 \cos(\delta - \theta_2) - \sin\gamma \cos\phi_2 \\ -\cos\gamma \cos\phi_2 \cos(\delta - \theta_2) - \sin\gamma \sin\phi_2 \end{bmatrix} a_{AB}$$

and $\dot{x}_B = f(x_B) + h(x_B)\alpha_{AB}$ is similarly defined with the following equation:

$$x_B = [\bar{r}_1 \bar{\theta}_1 \bar{\phi}_1 \bar{V}_{\theta 1} \bar{V}_{\phi 1} \bar{V}_{r1} \bar{r}_2 \bar{\theta}_2 \bar{\phi}_2 \bar{V}_{\theta 2} \bar{V}_{\phi 2} \bar{V}_{r2}]^T$$

where the elements of $x_B$ represent the states corresponding to $BC_1$ and $BC_2$. In Eq. (26), $a_{AB}$ is a scalar representing the magnitude of the acceleration of AB, and this acceleration is applied at an azimuth angle $\delta$ and elevation angle $\gamma$. In conjunction with the preceding state equations, an output equation is defined as follows:

$$\begin{bmatrix} \hat{y}_A \\ \hat{y}_B \end{bmatrix} = \begin{bmatrix} y_A - c \\ y_B - c \end{bmatrix} \quad (27)$$

where $y_A$ represents the miss-distance function of point A to the ellipse E, and $y_B$ represents the miss-distance function of point B to E. Here, $y_A$ is defined in Eq. (21), and $y_B$ can be similarly defined by replacing $r_1$, $r_2$, $V_{\theta 1}$, $V_{\theta 2}$, $V_{\phi 1}$, $V_{\phi 2}$, $V_{r1}$, $V_{r2}$ with $\bar{r}_1$, $\bar{r}_2$, $\bar{V}_{\theta 1}$, $\bar{V}_{\theta 2}$, $\bar{V}_{\phi 1}$, $\bar{V}_{\phi 2}$, $\bar{V}_{r1}$, $\bar{V}_{r2}$, respectively.

The system [Eqs. (26) and (27)] has three inputs $a_{AB}$, $\delta$, and $\gamma$. The objective is to determine a guidance law that can drive an appropriate choice of either $\hat{y}_A$ or $\hat{y}_B$ to zero, or equivalently, cause $y_A$ (respectively, $y_B$) to approach the reference value of c. A suitable negative value is chosen for c, such that AB passes through the ellipse E, and use dynamic inversion to design the acceleration magnitude law $a_{AB}$ to drive $\hat{y}_A$ to zero. The design of laws governing the evolution of the angles $\delta$ and $\gamma$, which govern the plane on which $a_{AB}$ is applied are discussed later: in Sec. IV. B for stationary orifices, and in Sec. V.A for moving and/or closing orifices. For determining $a_{AB}$, the derivative of $\hat{y}_A$ is taken with respect to time, as follows:

$$\frac{d\hat{y}_A}{dt} = \dot{\hat{y}}_A = \frac{\partial y_A}{\partial x_A}\dot{x}_A = \frac{\partial y_A}{\partial x_A}f(x_A) + \frac{\partial y_A}{\partial x_A}h(x_A)a_{AB} = \frac{\partial y_A}{\partial x_A}f(x_A) + g_A a_{AB} \quad (28)$$

$$\dot{\hat{y}}_A = \left[ \frac{\partial y_A}{\partial r_1} \; \frac{\partial y_A}{\partial \theta_1} \; \frac{\partial y_A}{\partial \phi_1} \; \frac{\partial y_A}{\partial V_{\theta 1}} \; \frac{\partial y_A}{\partial V_{\phi 1}} \; \frac{\partial y_A}{\partial V_{r1}} \; \frac{\partial y_A}{\partial r_2} \; \frac{\partial y_A}{\partial \theta_2} \; \frac{\partial y_A}{\partial \phi_2} \; \frac{\partial y_A}{\partial V_{\theta 2}} \; \frac{\partial y_A}{\partial V_{\phi 2}} \; \frac{\partial y_A}{\partial V_{r2}} \right] \times \quad (29)$$

$$[\dot{r}_1 \; \dot{\theta}_1 \; \dot{\phi}_1 \; \dot{V}_{\theta 1} \; \dot{V}_{\phi 1} \; \dot{V}_{r1} \; \dot{r}_2 \; \dot{\theta}_2 \; \dot{\phi}_2 \; \dot{V}_{\theta 2} \; \dot{V}_{\phi 2} \; \dot{V}_{r2}]^T$$

Define an error signal $e_A(t) = w(t) - \hat{y}_A(t)$, where $w(t)$ is a reference input. Thus, $\dot{\hat{y}}_A = \dot{w} - \dot{e}_A$. Taking $w(t) = 0$ for all $t$ and enforcing the error dynamics to be $\dot{e}_A = Ke_A$, the result is $\dot{\hat{y}}_A = K\hat{y}_A$. Substituting this in Eq. (29), and using Eqs. (25) and (26), results in the following:

$$a_{AB} = -K\hat{y}_A/g_A \quad (3)$$

where $$g_A = \frac{\partial y_A}{\partial x_A}h(x_A) = \left[ -\cos\gamma\left(\frac{\partial y_A}{\partial V_{\theta 1}}\sin(\delta - \theta_1) + \frac{\partial y_A}{\partial V_{\theta 2}}\sin(\delta - \theta_2)\right) + \right.$$
$$\frac{\partial y_A}{\partial V_{\phi 1}}(\cos\gamma\sin\phi_1\cos(\delta - \theta_1) - \sin\gamma\cos\phi_1) +$$
$$\frac{\partial y_A}{\partial V_{\phi 2}}(\cos\gamma\sin\phi_2\cos(\delta - \theta_2) - \sin\gamma\cos\phi_2) -$$
$$\frac{\partial y_A}{\partial V_{r1}}(\cos\gamma\cos\phi_1\cos(\delta - \theta_1) + \sin\gamma\sin\phi_1) -$$
$$\left. \frac{\partial y_A}{\partial V_{r2}}(\cos\gamma\cos\phi_2\cos(\delta - \theta_2) + \sin\gamma\sin\phi_2) \right] \quad (31)$$

Equation (31) contains the partial derivatives of $y_A$, and these can be computed analytically from Eq. (21). Now, if $K > 0$, then the error dynamics $e_A(t)$ will monotonically decay to zero, or equivalently $\hat{y}_A$ will monotonically go to zero. As can be seen later, choosing the appropriate sign of $K$ and switching between these signs in a state dependent fashion can enable the trajectory of A to enter the safe passage cone from different initial conditions and eventually pass through the ellipse.

Case A: $\hat{y}_A 0 < 0$, $V_{rA} 0 < 0$.

Cases A1 and A4: Choose $K > 0$. As mentioned previously, this will cause $\hat{y}_A$ to monotonically decay to zero, as illustrated in FIG. 15A. The time evolution of $\hat{y}_A$ is given by $\hat{y}_A t \hat{y}_A(0)e^{-Kt}$. Because the rod will reach the ellipse at time $t_m$, given by Eq. (20), it is preferable that $\hat{y}_A(t)$ should decay to a negative number of small magnitude E within the time $t_m$. This can be achieved by choosing $K$ such that:

$$K > \frac{1}{t_m}\ell n\left|\frac{\hat{y}_A(0)}{\epsilon}\right| \quad (32)$$

With progressively smaller magnitudes of $\epsilon$, progressively higher levels of precision can be achieved in arriving at the desired aiming point.

Cases A2 and A3: Choose $K = K_0 \; \text{sgn}(\partial y_A/\partial \alpha_p)$, where $K_0 > 0$.

Consider case A2 for purposes of illustration. The initial location of the relative velocity vector is such that $\partial y_A/\partial \alpha_p j_0 < 0$, and this leads to an initially negative sign for $K$, thus causing the error $e_A(t)$ to increase or, equivalently, $\hat{y}_A$ to become more negative as the relative velocity vector is pulled deeper into the safe-passage cone. When the relative velocity vector crosses into the other half of the safe-passage cone, $\partial y_A/\partial \alpha_p > 0$, and the sign of $K$ switches to positive as well. This positive value of $K$ causes the error $e_A(t)$ to decrease or, equivalently, $\hat{y}_A(t)$ to go to zero, as shown in FIG. 15B. A corresponding argument holds for case A3. In this case, $\hat{y}_A t$ evolves as follows:

$$\hat{y}_A(t) = \begin{cases} \hat{y}_A(0)e^{K_0 t}, & 0 \leq t \leq t_1 \\ \hat{y}_{min}e^{-K_0(t_2 - t_1)}, & t_1 \leq t \leq t_2 \end{cases} \quad (33)$$

where $\hat{y}_{min}$ represents the minimum value of $\hat{y}_A$, and $t_1$ represents the time at which this minimum value is attained. As before, it is preferable that $\hat{y}_A(t)$ decay to a small number $\epsilon$ within the time $t_m$. This can be ensured if $K_0$ is chosen such that, for a given $t_1 < t_m$, $$K_0 > \max\left\{\frac{1}{t_1}\ell n\left|\frac{\hat{y}_A(0)}{\hat{y}_{min}}\right|, \frac{1}{t_m - t_1}\ell n\left|\frac{\hat{y}_{min}}{\epsilon}\right|\right\} \quad (34)$$

As a footnote, two different magnitudes of $K_0$ can be chosen, say $K = K_1 \; \text{sgn}(\partial y_A/\partial \alpha_p)$ for $t \leq t_1$ and $K = K_2 \; \text{sgn}(\partial y_A/\partial \alpha_p)$ for $t_1 \leq t \leq t_m$, with $K_1 > 0$, $K_2 > 0$, in which case $K_1$ needs to be larger than the first term within the brackets in Eq. (34), whereas $K_2$ needs to be larger than the second term within brackets.

Case B: $\hat{y}_A 0 > 0$, $V_{rA} 0 < 0$.

Cases B1 and B4: Choose $K > 0$, such that $K$ satisfies Eq. (32). This will cause $\hat{y}_A$ to monotonically decay to $\epsilon$ within time $t_m$, as illustrated in FIG. 15C.

Cases B2 and B3: Choose $K$ such that:

$$K = \begin{cases} K_0, & \text{if } \hat{y}_A(t) > 0 \\ K_0 \text{sgn}\left(\frac{\partial y_A}{\partial \alpha_p}\right) & \text{if } \hat{y}_A(t) < 0 \end{cases} \quad (35)$$

with $K_0 > 0$. Consider case B2 for the purpose of illustration. The initial positive value of $K$ will drive the error $e_A(t)$, and equivalently $\hat{y}_A$, monotonically to zero, driving the velocity vector to align with AX'. When this happens, $\hat{y}_A$ becomes zero, and at that instant, the guidance law [Eq. (30)] generates zero acceleration. During that vanishingly small time duration, an acceleration of arbitrarily small magnitude can be applied, but of the correct sign, to drive the velocity vector just slightly across the $\hat{y}_A = 0$ border and into the safe-passage cone. This small acceleration can be generated either by momentarily using point B of the rod AB as the reference point to generate the acceleration, that is, replace $\hat{y}_A$ and $g_A$ in Eq. (30) by $\hat{y}_B$ and $g_B$, respectively, or alternatively, apply a small acceleration along the unit vector corresponding to V×AX×V.

Once the velocity vector is just inside the safe-passage cone (i.e., $\hat{y}_A(t)<0$, $\partial yA/\partial \alpha p<0$), K switches to a negative value, causing the error $e_A(t)$ to increase and $\hat{y}_A(t)$ to become more negative as the velocity vector is driven deeper inside the safe-passage cone. When $\partial yA/\partial \alpha p$ switches from negative to positive, K switches to positive, and this causes $e_A(t)$ to be driven to zero as also $\hat{y}_A(t)$. The overall trajectory of $\hat{y}_A(t)$ is then as shown in FIG. 15D. A corresponding argument holds for case B3. In this case, $\hat{y}_A(t)$ evolves as $$\hat{y}_A(t) = \begin{cases} \hat{y}(0)e^{-K_0 t}, & 0 \le t \le t_1 \\ \varepsilon_2 e^{K_0(t-t_1)}, & t_1 \le t \le t_2 \\ \hat{y}_{min} e^{-K_0(t-t_1-t_2)}, & t_2 \le t \le t_3 \end{cases} \quad (36)$$

where $t_1$ is the time at which V has aligned with AX, and $t_2$ is the time at which $\hat{y}_A = y_{min}$ occurs. $K_0$ can be chosen such that, for the chosen values of $t_1$, $t_2$ satisfying $t_1 < t_2 < t_m$, the following:

$$K_0 > \max\left\{\frac{1}{t_1}\ell n\left|\frac{\hat{y}_A(0)}{\epsilon}\right|, \frac{1}{t_2-t_1}\ell n\left|\frac{\varepsilon_2}{\hat{y}_{min}}\right|, \frac{1}{t_m-t_2-t_1}\ell n\left|\frac{\hat{y}_{min}}{\epsilon}\right|\right\} \quad (37)$$

Case C: $\hat{y}_A(0)>0$, Choose $V_{rA}(0)K>$such that 0.

Cases C2 and C3: Choose K such that $$K = \begin{cases} -K_0, & \text{if } V_{rA}(t) > 0 \\ K_0, & \text{if } V_{rA}(t) < 0, \hat{y}_A(t) > 0 \end{cases} \quad (38)$$

where $K_0>0$. Consider case C2 for the purpose of illustration. The initial negative value of K will increase the error $e_A(t)$, and equivalently $\hat{y}_A$, as the velocity vector is driven away from $\hat{y}_A=0$, $V_{rA}>0$ line and into the $V_{rA}<0$ region. This causes $\hat{y}_A(t)$ to increase to its maximum value. After entering the $V_{rA}<0$ region, K is made positive, and the velocity vector is driven toward AX, as $\hat{y}_A(t)$ decreases to zero. The overall trajectory of $\hat{y}_A(t)$ is as shown in FIG. 15E. A corresponding argument holds for case C3. In this case, $\hat{y}_A(t)$ evolves according to the following equations:

$$\hat{y}_A(t) = \begin{cases} \hat{y}_A(0)e^{K_0 t}, & 0 \le t \le t_1 \\ \hat{y}_{max} e^{-K_0(t_2-t_1)}, & t_1 \le t \le t_2 \end{cases} \quad (39)$$

where $\hat{y}_{max}$ represents the maximum value of $\hat{y}_A$, and $t_1$ represents the time at which this maximum value is attained. $K_0$ can be chosen such that, for a given $t_1 < t_m$, the following:

$$K_0 > \max\left\{\frac{1}{t_1}\ell n\left|\frac{\hat{y}_A(0)}{y_{max}}\right|, \frac{1}{t_m-t_1}\ell n\left|\frac{\hat{y}_{max}}{\epsilon}\right|\right\} \quad (40)$$

Cases C1 and C4: Choose K such that:

$$K = \begin{cases} -K_0, & \text{if } V_{rA}(t) > 0 \\ K_0, & \text{if } V_{rA}(t) < 0, \hat{y}_A(t) > 0 \\ -K_0 \text{sgn}\left(\frac{\partial y_A}{\partial \alpha_p}\right), & \text{if } \hat{y}_A(t) < 0 \end{cases} \quad (41)$$

where $K_0>0$. Consider case C1 for the purpose of illustration. The discussion for the initial portion of the $\hat{y}_A$ trajectory is identical to that of case C2, until the time when the velocity vector just enters the safe passage cone. Once inside the safe-passage cone, K is negative, causing $\hat{y}_A(t)$ to become more negative and the velocity vector to be driven deeper inside the safe-passage cone, after which K becomes positive again, causing $\hat{y}_A$ to go to zero. The overall trajectory of $\hat{y}_A(t)$ is as shown in FIG. 15F. A corresponding argument holds for case C4. Equations for the time evolution of $\hat{y}_A$ and a lower bound on $K_0$ can be determined in a manner similar to the previous cases.

Case D: $\hat{y}_A 0<0$, $V_{rA}(0)>0$.

Cases D1 and D4: Choose K such that:

$$K = \begin{cases} K_0 \text{sgn}\left(\frac{\partial y_A}{\partial \alpha_p}\right), & \text{if } \hat{y}_A(t) < 0, \ V_{rA}(t) > 0 \\ -K_0, & \text{if } \hat{y}_A(t) > 0, \ V_{rA}(t) > 0 \\ K_0, & \text{if } \hat{y}_A(t) > 0, \ V_{rA}(t) < 0 \end{cases} \quad (42)$$

with $K_0>0$. Consider case D1 for the purpose of illustration. K is initially negative, thus causing $\hat{y}_A(t)$ to become more negative as the velocity vector is driven deeper inside the $\hat{y}_A<0$ region. Because of the change in the sign of $\partial y_A/\partial \alpha_p$, K then becomes positive, causing $\hat{y}_A(t)$ to be driven toward zero, and the velocity vector aligns with thE', $V_{rA}>0$ line. Then K switches to a negative value, causing $\hat{y}_A t$ to become positive, and this continues until the velocity vector $V_{rA}<0$ region, at which time K is made positive again, thereby driving $\hat{y}_A(t)$ to zero and causing the velocity vector to align with the AX' line. The overall trajectory of $\hat{y}_A(t)$ is shown, for example, in FIG. 15H. A corresponding argument holds for case D4.

Cases D2 and D3: Choose K such that:

$$K = \begin{cases} -K_0 \text{sgn}\left(\frac{\partial y_A}{\partial \alpha_p}\right), & \text{if } \hat{y}_A(t) < 0, \ V_{rA}(t) > 0 \\ -K_0, & \text{if } \hat{y}_A(t) > 0, \ V_{rA}(t) > 0 \\ K_0, & \text{if } \hat{y}_A(t) > 0, \ V_{rA}(t) < 0 \end{cases} \quad (43)$$

with $K_0>0$. Consider case D2. Here, K is initially positive, thus driving $\hat{y}_A(t)$ to zero, and the velocity vector aligns with the $\hat{y}_A=0$, $V_{rA}>0$ line. The discussion after that is similar to that of case D1, and the overall trajectory of $\hat{y}_A(t)$ is as shown, for example, in FIG. 15G. A corresponding argument holds for case D3.

The discussion in Eqs. (30-43) assumes that point A on the rod AB is chosen as the reference point for the guidance-law computations. Note, however, that the output equation given in Eq. (27) considers a second output $\hat{y}_B$. This is to indicate that, in lieu of point A, point B can also be chosen on the rod as the reference point for computations and write a set of equations similar to Eqs. (30-43) after replacing $\hat{y}_A$ by $\hat{y}_B$ and $g_A$ by $g_B$, where $g_B$ is defined by replacing $y_A$, $r_1$, $r_2$, $V_{\theta 1}$, $V_{\theta 2}$, $V_{\varphi 1}$, $V_{\varphi 2}$, $V_{r1}$, $V_{r2}$ in Eq. (31) with $y_B$, $\bar{r}_1$, $\bar{r}_2$, $\bar{V}_{\theta 1}$, $\bar{V}_{\theta 2}$, $\bar{V}_{\varphi 1}$, $\bar{V}_{\varphi 2}$, $\bar{V}_{r1}$, $\bar{V}_{r2}$, respectively. Applying the acceleration $a_{AB}$ would then drive B through the designated goal point in the ellipse. Note, however, that regardless of whether point A or point B is chosen as the reference point, the computed acceleration $a_{AB}$ is generally applied to both points A and B (or, in other words, to the entire rod).

B. Determination of Guidance Plane

The discussion thus far has been about the application of the guidance law [Eq. (30)] on a plane chosen in 3-D space. Next, the plane on which this acceleration is applied is determined. Because ($\beta$, $\alpha$) represents the azimuth and elevation angles, respectively, of the velocity vector $V_{AB}$ of the rod and ($\delta$, $\gamma$) represent the azimuth and elevation angles, respectively, of its acceleration vector $a_{AB}$, the unit vectors $\hat{V}_{AB}$ and $\hat{\alpha}_{AB}$ can be defined as the following:

$$\hat{V}_{AB} = \cos\alpha \cos\beta \hat{i} + \cos\alpha \sin\beta \hat{j} + \sin\alpha \hat{k} \quad (44)$$

$$\hat{\alpha}_{AB} = \cos\gamma \cos\delta \hat{i} + \cos\gamma \sin\delta \hat{j} + \sin\gamma \hat{k} \quad (45)$$

Additionally, define the goal point g on the window, through which point A needs to pass, as shown schematically in FIG. 18, which is an illustration of a guidance plane determination. Here, g can lie anywhere in E as long its location is such that it allows enough room for AB to pass through E. For instance, if the length of AB is nearly equal to the major axis of E, then it would make sense to choose g close to the major axis of E. There are two conditions: 1) $\hat{\alpha}_{AB}$ is perpendicular to $\hat{V}_{AB}$, and 2) $\hat{\alpha}_{AB}$ lies on the plane that contains $\hat{V}_{AB}$ and Ag or Bg, depending on whether point A or B of the rod is used as the reference point for computation of the guidance law.

The objective of these conditions is to define the plane on which the acceleration [Eq. (30)] acts such that, on this plane, the acceleration acts orthogonal to the velocity vector. The result of this is that the effect of the applied acceleration is to purely rotate the velocity vector of the vehicle, without changing the vehicle speed. This implies that the vehicle does not have to be brought to rest (or experience any speed change) while performing the maneuver through the orifice.

To satisfy condition 1, $\hat{V}_{AB} \cdot \hat{\alpha}_{AB} = 0$, which simplifies to the following:

$$\cos\alpha \cos\gamma \cos(\beta-\delta) + \sin\alpha \sin\gamma = 0 \quad (46)$$

When $\cos\alpha \neq 0$ and $\cos\gamma \neq 0$, Eq. (46) can be written as the following:

$$\cos(\beta-\delta) + \tan\alpha \tan\gamma = 0 \quad (47)$$

For condition 2, the plane that contains $\hat{V}_{AB}$ and Ag can be defined. The unit normal of this plane can be computed as the following:

$$\hat{n} = \frac{\hat{V}_{AB} \times Ag}{|Ag|}$$

To satisfy condition 2, $\hat{n} \cdot \hat{\alpha}_{AB}$ can be set to zero, which, after some algebraic operations, eventually leads to the following equation:

$$L \cos\gamma \cos\delta + M \cos\gamma \sin\delta + N \sin\gamma = 0 \quad (48)$$

where $L = \cos\alpha \sin\beta [r_1 \sin\varphi_1 - c_z + |ae|] - \sin\alpha[r_1 \sin\theta_1 \cos\varphi_1 - c_y]$ $M = \sin\alpha[r_1 \cos\theta_1 \cos\varphi_1 - c_x] - \cos\alpha \cos\beta[r_1 \sin\varphi_1 - c_z + ae]$ $N = \cos\alpha \cos\beta[r_1 \sin\theta_1 \cos\varphi_1 - c_y] - \cos\alpha \sin\beta[r_1 \cos\theta_1 \cos\varphi_1 - c_x]$ (49)

In the preceding equation, ($c_x$, $c_y$, $c_z$) represent the coordinates of the goal point g measured relative to the center of the ellipse; e is the eccentricity of the ellipse, and it is assumed without loss of generality that the ellipse is oriented with its major axis along the $\hat{k}$ axis. Equation (49) and FIG. 18 assume that A is chosen as the reference point for the guidance-law computations. If B is chosen as the reference point, then L, M, and N can be correspondingly defined by replacing ($r_1$, $\theta_1$, $\varphi_1$) with ($r_1$, $\theta_1$, $\varphi_1$), respectively. When $\cos\gamma \neq 0$, Eq. (48) can be written as the following:

$$L \cos\delta + M \sin\delta + N \tan\gamma = 0 \quad (50)$$

Solving Eqs. (47) and (50) for the two unknowns $\gamma$ and $\delta$, leads to the following:

$$\tan^2\gamma = \frac{1}{\tan^2\alpha + D^2} \quad (51)$$

$$\delta = \beta - \pi + \cos^{-1}[\tan\alpha \tan\gamma] \quad (52)$$

where $$D^2 = \frac{[L\cos\beta \tan\alpha + M\sin\beta \tan\alpha - N]^2}{[L\sin\beta - M\cos\beta]^2} \quad (53)$$

In the special case when D=0, Eqs. (51) and (52) reduce to $\gamma = \pi/2 - \alpha$, $\delta = \beta$. To apply the guidance law to pass the rod AB through the ellipse E, $\gamma$ and $\delta$ are computed using Eqs. (51) and (52) and these angles are used in the guidance law [Eq. (30)].

Finally, on the guidance plane defined previously, the angle of the velocity vector $\alpha_p$ evolves as $\dot{\alpha}_p = a_{AB}/V_{AB}$. Equivalently, the angles $\alpha$ and $\beta$ associated with the direction of the velocity vector in 3-D space evolve as follows:

$\dot{\alpha} = -a_{AB}(\cos\beta \cos\delta \cos\gamma \sin\alpha - \cos\alpha \sin\gamma + \cos\gamma \sin\alpha \sin\beta \sin\delta)/V_{AB}$ (54)

$\dot{\beta} = a_{AB}(\cos\beta \cos\gamma \sin\delta - \cos\delta \cos\gamma \sin\beta)/(V_{AB} \cos|\alpha|)$ (55)

The fact that the guidance law does not cause/require $V_{AB} = 0$ to occur, along with the presence of a saturation limit on $a_{AB}$, ensures that $\alpha_p$ (equivalently, $\dot{\alpha}$ and $\dot{\beta}$) never become unbounded. Thus, the guidance law can never command a vehicle to execute a zero-radius turn that lies beyond the capability of nonholonomic flying vehicles.

C. Choice of Reference Value c

Though the orifice itself lies on a plane (and has an elliptical shape), a spheroidal surface of revolution S is applied to this orifice, to determine the guidance laws [Eq. (30)]. Choosing the reference value as $c \leq 0$ in Eq. (27) ensures that the velocity vector of the rod passes through the spheroid S. To ensure that the rod also passes through the ellipse E, the value of c to be chosen depends on the eccentricity of the ellipse. For highly eccentric ellipses, a negative c of arbitrarily small magnitude is adequate, whereas for smaller values of eccentricity, c needs to be negative and of larger magnitude. FIGS. 19A-C depict representation of ellipse with differing eccentricity and their corresponding spheroids. Each of these figures shows E and S for different eccentricities e. For example, in FIG. 19A, the ellipse E is of high eccentricity, and it is sufficient to choose $c \le \epsilon < 0$ (where $\epsilon$ is a small number) in the guidance law, and the rod will pass through the ellipse. However, in FIG. 19B, the ellipse is of low eccentricity, and if a similar value of c is chosen as in FIG. 19A, point A of the rod will graze the spheroid S but not pass through the ellipse E. Next is discussed determining an appropriate choice of the reference value c, when the ellipse is of low eccentricity.

Consider FIG. 19C, which is a profile view of FIG. 19B and shows the section of the spheroid that is normal to the plane of the elliptical window E. If the rod continues moving at the current relative velocity V, achieved with $c \le \epsilon < 0$ in Eq. (30), then the point A will just graze the spheroid and strike the wall on which E lies. Let $t_m$ represent the miss time to the spheroid and $t_2$ represent the time at which A will touch the wall on which E lies. Then, at time $t_2$, $AC_1$=z−ae and $AC_2$=z+ae. Incorporating these distances into Eq. (19) results in the following:

$$(z-ae)^2 = r_{m1}^2 + V^2(t_2-t_{m1})^2, (z+ae)^2 = r_{m2}^2 + V^2(t_2-t_{m2})^2 \quad (56)$$

where $r_{m1}$ ($r_{m2}$) and $t_{m1}$ ($t_{m2}$) represent, respectively, the miss distance and miss time of A to $C_1$ ($C_2$), and V is the magnitude of the relative velocity. From Eq. (19), at time $t_m$, the following results:

$$r_1^2(t_m) = r_{m1}^2 + V^2(t_m-t_{m1})^2, r_2^2(t_m) = r_{m2}^2 + V^2(t_m-t_{m2})^2 \quad (57)$$

From the relative velocity measurements, $r_{m1}$, $r_{m2}$, $t_{m1}$, $t_{m2}$, and $t_m$, can be computed using Eqs. (17), (18), and (20). Use these quantities in Eq. (56) to solve for the unknowns $t_2$ and z. If z>a, then this indicates that c needs to be made more negative in order for AB to go through E. Determining c is described next. For A to graze the top of the ellipse at $t_2$, at $t_2$, the desired values of distance of A to the two foci are $AC_{1;d}$=a−ae and $AC_{2;d}$=a+ae. Use the $t_2$ computed from Eq. (56) and incorporate it in Eq. (57) to determine the desired values $r_{m1;d}$ and $r_{m2;d}$ as follows:

$$r_{m1,d} = \sqrt{(a-ae)^2 - V^2(t_2-t_{m1})^2},$$
$$r_{m2,d} = \sqrt{(a-ae)^2 - V^2(t_2-t_{m2})^2} \quad (58)$$

Then, substitute Eq. (58) into Eq. (57) to find the desired value of $r_{m;d} \triangleq r_{1;d}(t_m) + r_{2;d}(t_m)$ as:

$$r_{m,d} = \sqrt{a^2(1-e^2) + V^2(t_m-t_2)(t_m+t_2-2t_{m1})} + \sqrt{a^2(1-e^2) + V^2(t_m-t_2)(t_m+t_2-2t_{m2})} \quad (59)$$

Finally, use Eq. (59) to compute the reference as $c = r^2_{m;d} - 4a^2$. In the guidance law, choose K large enough so that $y_A = c$ is achieved in $t \le t_m$.

In the limiting case of a circular window of radius a, the surface of revolution is a sphere, and substituting e=0 in Eq. (59), along with $t_m = t_{m1} = t_{m2}$, the result is $$r_{m,d} = 2\sqrt{a^2 - V^2(t_m-t_2)^2} \quad (60)$$

which, when used in $c = r^2_{m;d} - 4a^2$, represents a lower bound on the reference value, across all possible eccentricities of the ellipse.

Another factor to be taken into consideration is that the rod can approach the orifice over a certain range of approach angles, with this range depending on the relative sizes of the orifice and the vehicle. This is because the rod only serves as a representation for the vehicle (and is not the actual vehicle itself) that needs to pass through the opening. When the vehicle is a fixed-wing MAV, the rod represents the line joining the wing tips, whereas when the vehicle is a quadrotor, the rod represents a line drawn on the face of the quadrotor. Thus, the physical dimensions of the vehicle pose a restriction on the angle of the trajectory of the equivalent rod as it approaches the window. If AB is slanted, then the guidance laws developed can still guide AB through the orifice at a slanted angle.

D. Example

Next is illustrated the application of the designed guidance law by means of an example. Assume that AB is of length 50 cm and has to pass through an ellipse E of major axis 60 cm and minor axis 19.1 cm. Assuming that E is oriented with its major axis vertical (as in FIG. 16), and without loss of generality, the initial orientation of AB is parallel to the major axis of the ellipse (if the initial orientation of AB is different from this, the guidance law would guide AB through the ellipse at a slanted angle). The initial location of AB is 20 m away along the normal to the wall on which E lies and off set to the left of the center of E by 6 m, and the lower end of AB is at the same height as the center of E. For this initial configuration, $r_1$=20.88 m, $r_2$=20.89 m, $\theta_1 = \theta_2$=163.3°, $\phi_1$=−0.7°, $\phi_2$=−2°, $\bar{r}_1 = \bar{r}_2$=20.88 m, $\bar{\theta}_1 = \bar{\theta}_2$=163.3°, $\bar{\phi}_1$=0.63°, and $\bar{\phi}_2$=−0.63°. The initial velocity of AB is 5 m/s, acting at azimuth angle $\beta$=290° and elevation angle $\alpha$=−10°. This leads to initial relative velocity components of $V_{r1}$=2.93 m/s, $V_{r2}$=2.91 m/s, $V_{\theta 1}=V_{\theta 2}$=−3.95 m/s, $V_{\phi 1}$=0.9 m/s, $V_{\phi 2}$=0.7 m/s, $\bar{V}_{r1}$=2.95 m/s, $\bar{V}_{r2}$=2.93 m/s, $\bar{V}_{\phi 1}=\bar{V}_{\phi 2}$=−3.95 m/s, $\bar{V}_{\phi 1}$=0.83 m/s, $\bar{V}_{\phi 2}$=0.9 m/s.

As shown in Eq. (21) that $y_A(0)$=1149.3 m² and $y_B(0)$=1139.8 m², $V_{rA}(0)$=118.5 m³/s³, $V_{rB}(0)$=118.9 m/s. The initial miss times for A and B are determined using Eq. (20) to be $t_{mA}$−2.44 s and $t_{mB}$−2.45 s, respectively. The positive initial values of $V_{rA}$ and $V_{rB}$ (equivalently, the negative initial miss times of $t_{mA}$ and $t_{mB}$) indicate that the initial velocity is taking AB in a direction opposite to E. Assume that B is chosen on the rod as the point about which the guidance law is referenced. The signs of the initial values of $y_B$ and $V_{rB}$ indicate that this corresponds to case C, shown in FIG. 13.

Figure 20A:
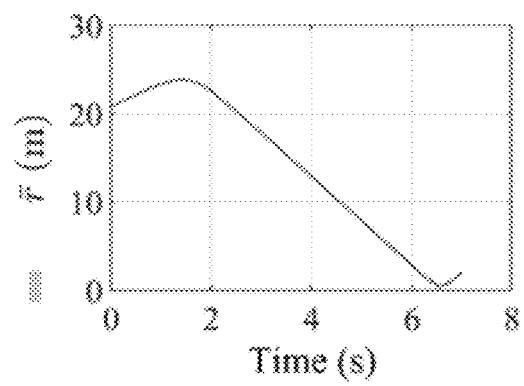
Figure 20B:
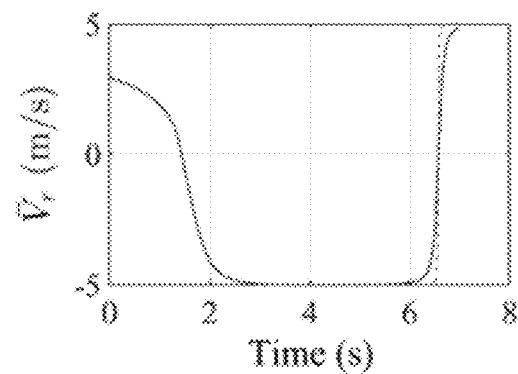
Figure 20C:
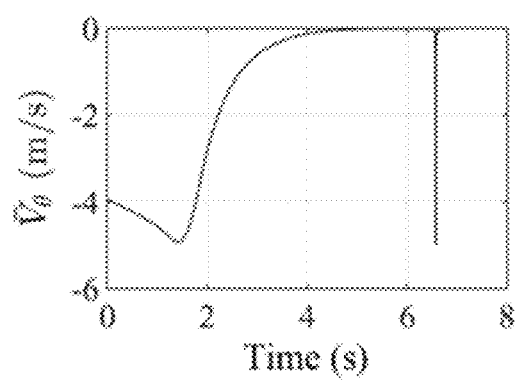
Figure 20D:
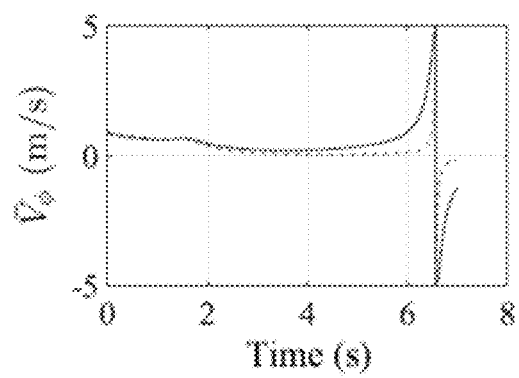

The guidance laws [Eq. (30)] are employed, with an initial negative K=−0.5, followed by a positive K=3.5, with the switching occurring when $V_{rB}$ changes sign from positive to negative. Equations (51) and (52) are used to determine the plane on which this guidance law is applied. The state trajectories associated with point B are depicted, for example, in FIGS. 20A-D, which depicts state responses associated with point B on AB. FIG. 20A shows the time history of the distance of B to the two foci, that is, $r_1 t$ and $r_2 t$, from which it is evident that the closest approach of B to E occurs at t 6.55 s. Initially, $r_1$ and $r_2$ are nearly equal, and the difference between them increases as B gets closer to E. FIG. 21 depicts the difference of distances of point B to the two foci, for example, showing the time history of $r_1 t - r_2 t$. At the instant of closest approach, $r_1 - r_2$ is around 46 cm, which is a significant fraction of the 60 cm major axis of E. FIGS. 20B-D show the time histories of the relative velocity component s associated with the LOSs $BC_1$ and $BC_2$, shown in FIG. 16.

Figure 23A:
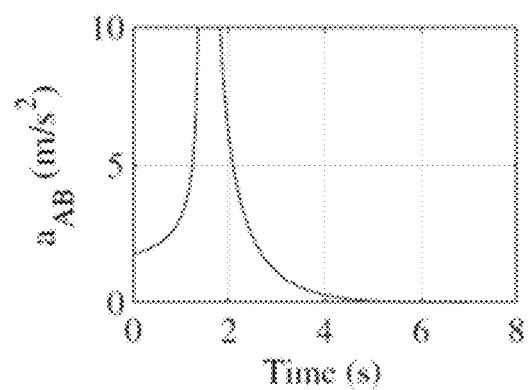
Figure 23B:
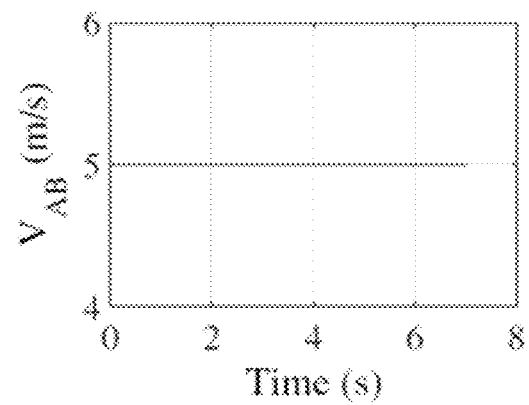
Figure 23C:
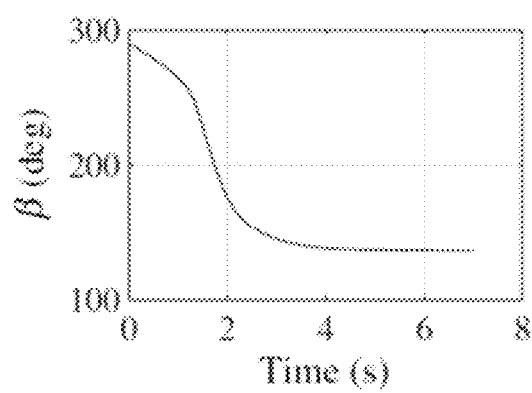
Figure 23D:
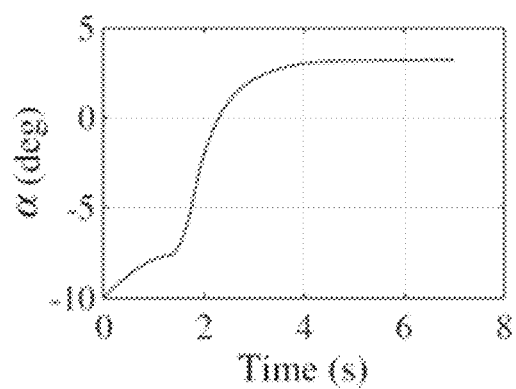

FIG. 22 shows the values of the output quantity $\hat{y}=y_B$, along with $y_A$. Because of the initial negative value of K, $\hat{y}$ increases until the time when $V_{rB}$=0 is attained (around t 1.4 s), at which time K is switched to a positive value, causing $\hat{y}_B$ to subsequently decrease to zero. Note that this change in $\hat{y}_B$ is physically brought about by the changing direction of the velocity vector of AB (as a consequence of the commanded acceleration generated by the guidance law). With increasing time, $\hat{y}_B$ eventually goes to zero, whereas $y_A$ attains a constant negative value. This means that the rod AB passes through E in a manner such that B grazes the inner boundary of E, whereas A passes through the interior of E, with the acceleration and velocity profile shown in FIGS. 23A-D, which depicts representations of example acceleration magnitude $a_{AB}$ of AB (FIG. 23A), speed of AB (FIG. 23B), azimuth angle $\beta$ of velocity vector of AB (FIG. 23C), and elevation angle $\alpha$ of velocity vector AB (FIG. 23D).

FIG. 24 shows the trajectory of AB in (x, y, z) space as AB passes through elliptical orifice E. FIGS. 25A-C show the time histories of the trajectory along the x, y, and z axes. The x-y plane is the horizontal plane, while the z axis is the vertical axis. The rod passes through E at the instant when x=−20, y=6, which corresponds to the location of the center of E relative to the initial position of AB. The initial velocity of AB has an azimuth angle $\beta(0)$ carrying AB away from E, and this is shown by the positive value of x(t) and the negative value of y(t) (FIGS. 25A and 25B) until t=1.5 s and t=1.8 s, respectively. As a consequence of the acceleration generated by the guidance law, the velocity vector is rotated so that AB turns toward E, and this is shown by the change in signs of x(t) and y(t). Similarly, the initial velocity of AB has an elevation angle $\alpha 0$ carrying AB downward (FIG. 25C), and this continues until about t=2.1 s before it changes direction (as a consequence of the guidance law) and begins to move toward and into E. FIG. 23A shows the acceleration magnitude, where it briefly hits the saturation limit of 10 m/s$^2$ because $g_B=0$ occurs around the t=1.5 s mark. (A discussion of scenarios where this can occur is provided later in Sec. VII. A.) FIGS. 23C-D demonstrate the time histories of the azimuth and elevation angles $\beta$ and $\alpha$, respectively. FIG. 23B shows that the speed of the vehicle remains constant throughout, thus demonstrating that the acceleration was applied perpendicular to the velocity vector and used solely to bend the trajectory of the vehicle appropriately to pass it through the elliptical hole. FIGS. 26A-B shows the time histories of the elevation and azimuth angles $\gamma$ and $\delta$, respectively, which define the direction of the acceleration vector $a_{AB}$.

V. Guidance Law for Flying Through a Moving Orifice

Because the guidance law [Eq. (30)] has been derived in a relative velocity framework, it can be applied for moving orifices as well. The only change from the stationary orifice case is the way in which the plane on which the acceleration is applied (equivalently, the angles $\gamma$ and $\delta$) is determined.

A. Determination of the Guidance Plane

The modification required in the moving orifice case is that a computation of the predicted goal point is performed. This is achieved using the predicted miss time $t_m$ from Eq. (20) by simply replacing the terms $c_x$, $c_y$, $c_z$ in Eq. (49) by $c_x(t)$, $c_y(t)$, $c_z(t)$ as follows:

$$c_x(t)=c_x(0)+V_o \cos \alpha_o \cos \beta_o \max(t_m,0)$$

$$c_y(t)=c_y(0)+V_o \cos \alpha_o \cos \beta_o \max(t_m,0)$$

$$c_z(t)=c_z(0)+V_o \sin \alpha_o \max(t_m,0) \qquad (61)$$

where $V_o$ is the speed of the orifice, and $(\beta_o, \alpha_o)$ are the azimuth and elevation angles of the velocity vector of the orifice. The term $\max(t_m, 0)$ ensures that negative miss times are not used in the computation of the guidance plane. Note that the predicted location of the goal point is not necessarily accurate for initial times but converges to the true location of the goal point as t approaches $t_m$. Because of this, the plane on which the guidance law is applied can change with time. The discussion in Sec. III.B therefore needs to be modified in the moving orifice case to the extent that, at initial times, the computed plane may not necessarily contain the relative velocity vector but instead contains only the velocity vector $\hat{V}_{AB}$ of AB. With increasing time, however, and as t approaches $t_m$, the computed plane converges to one that contains the relative velocity vector.

B. Example

Assume the initial location of E to be the same as in the previous example, and E is moving with $V_o=1$ m/s acting at an azimuth angle $\beta_o=90°$ and an elevation angle $\alpha_o=20°$. The initial location and velocity of AB are the same as in the previous example. Thus, $r_1(0)$, $r_2(0)$, $\bar{r}_1(0)$, $\bar{r}_2(0)$, $\theta_1(0)$, $\theta_2(0)$, $\bar{\theta}_1(0)$, $\bar{\theta}_2(0)$, $\phi_1(0)$, $\phi_2(0)$, $\bar{\phi}_1(0)$, and $\bar{\phi}_2(0)$ are the same as in the previous example. However, because E is moving, the initial relative velocity components are now given as $V_{r1}=3.19$ m/s, $V_{r2}=3.16$ m/s, $V_{\theta1}=V_{\theta2}=-4.85$ m/s, $V_{\phi1}=1.25$ m/s, $V_{\phi2}=1.32$ m/s, $\bar{\nabla}_{r1}=3.23$ m/s, $\bar{\nabla}_{r2}=3.19$ m/s, $\bar{\nabla}_{\theta1}=\bar{\nabla}_{\theta2}=-4.85$ m/s, $\bar{\nabla}_{\phi1}=1.17$ m/s, $\bar{\nabla}_{\phi2}=1.25$ m/s. This results in $y_A(0)=1243.9$ m$^2$, $y_B(0)=1233.8$ m$^2$, $V_{rA}(0)=189.67$ m$^3$/s$^3$, and $V_{rB}(0)=190.72$ m/s. The initial miss times for A and B are $t_{mA}-1.88$ s and $t_{mB}-1.9$ s, respectively. Assume that point B of the rod is chosen as a reference to our guidance law. The signs of the initial values of $y_B$ and $V_{rB}$ indicate that this corresponds to case C shown in FIG. 13. The guidance laws are employed [Eq. (30)], with an initial K=−0.5, followed by K=3.5, with the switching occurring when $V_{rB}$ changes sign from positive to negative.

Figure 29A:
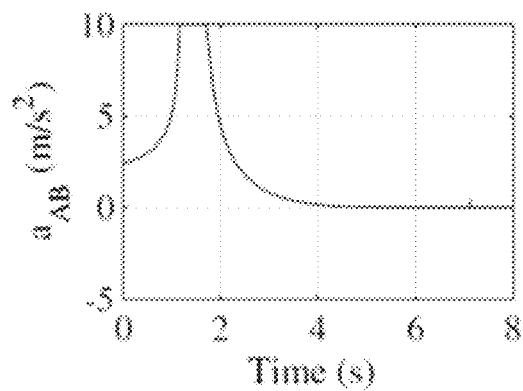
Figure 29B:
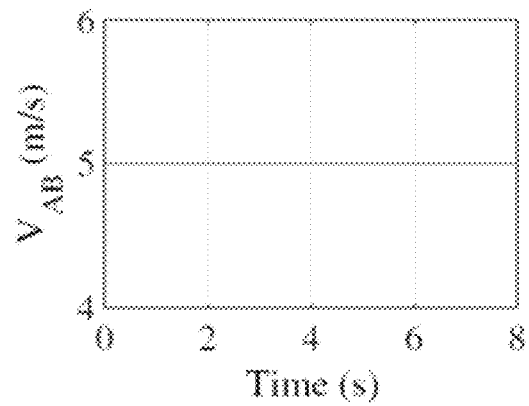
Figure 29C:
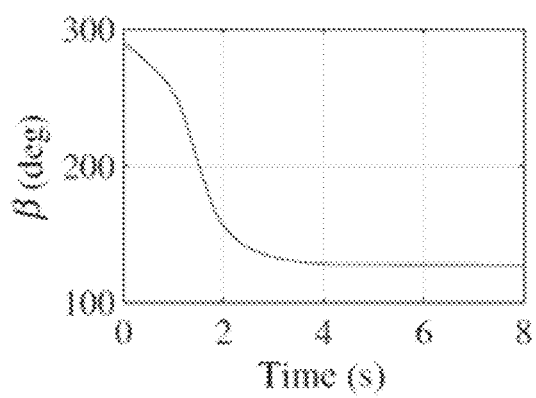
Figure 29D:
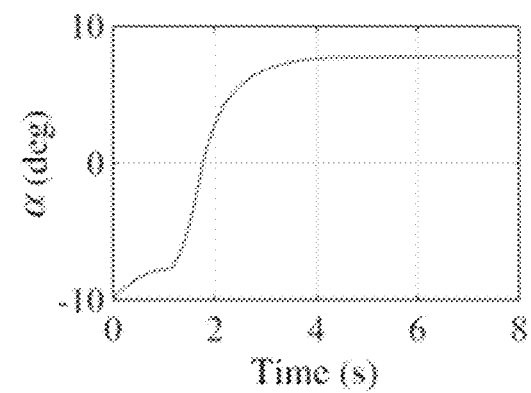

FIG. 27 shows example trajectories of AB and E in (x, y, z) space, and as is evident, AB passes through E, grazing its lower boundary. FIG. 28 shows the values of the output quantity $\hat{y}_B$, along with $y_A$. As in the previous example, $\hat{y}_B$ shows an initial increase until the time when $V_{rB}=0$ is attained (around t 1.3 s), after which it decreases to zero, whereas $y_A$ attains a constant negative value. As before, this means that the rod AB passes through E in a manner such that B grazes the inner boundary of E, whereas A passes through the interior of E. FIGS. 29A-D show the acceleration magnitude (FIG. 29A), the speed (FIG. 29B), the time history of $\beta$ (FIG. 29C), and the time history of $\alpha$ (FIG. 29D). Finally, FIGS. 30A-B shows the time histories of $\gamma$ and $\delta$, respectively. Note that, in this example (and unlike the previous example), the plane on which the acceleration is applied changes with time. When $t_{mB}$ is negative, as shown in FIG. 31, which depicts miss time of point B to the ellipse E, the "predicted" location of the goal point on the ellipse is actually the same as the current goal point. After $t_{mB}$ becomes positive (around t=1.3 s), $t_{mB}$ first increases and then decreases, and this causes the predicted location of the goal point to change accordingly, before converging to the true value. This changing location of the predicted goal point causes the plane on which the acceleration is applied to change from one moment to the next, thereby making the acceleration unit vector trace a curve in 3-D space.

VI. Guidance Law for Flying Through a Moving and Closing Orifice

This section develops guidance laws to guide the rod AB through an elliptical orifice that is decreasing in size. It is assumed that the length of the semimajor axis a(t) of the ellipse E is governed by a dynamic equation $\dot{a}=f_a(\cdot)$, where $f_a(\cdot)$ is an arbitrary nonlinear function that is lower-bounded in the sense that, by the time AB reaches E, the major axis of E is still slightly larger than the length of AB.

A. Determination of Guidance Law

The requisite kinematic state equations are obtained by appending the equation $\dot{a}=f_a(\cdot)$ to those stated in Eq. (25). The output equation remains identical to that given in Eq. (27). In taking the derivative of the output equation, the result is $\dot{y}_A=(\partial y_A/\partial x_A)\dot{x}_A$, and thus:

$$\dot{y}_A = \left[\frac{\partial y_A}{\partial r_1} \frac{\partial y_A}{\partial \theta_1} \frac{\partial y_A}{\partial \phi_1} \frac{\partial y_A}{\partial V_{\theta 1}} \frac{\partial y_A}{\partial V_{\phi 1}} \frac{\partial y_A}{\partial V_{r1}} \frac{\partial y_A}{\partial r_2} \frac{\partial y_A}{\partial \theta_2} \frac{\partial y_A}{\partial \phi_2} \frac{\partial y_A}{\partial V_{\theta 2}} \frac{\partial y_A}{\partial V_{\phi 2}} \frac{\partial y_A}{\partial V_{r2}} \frac{\partial y_A}{\partial a}\right] \times \quad (62)$$

$$\left[\dot{r}_1 \; \dot{\theta}_1 \; \dot{\phi}_1 \; \dot{V}_{\theta 1} \; \dot{V}_{\phi 1} \; \dot{V}_{r1} \; \dot{r}_2 \; \dot{\theta}_2 \; \dot{\phi}_2 \; \dot{V}_{\theta 2} \; \dot{V}_{\phi 2} \; \dot{V}_{r2} \; \dot{a}\right]^T$$

It is noted that Eq. (62) is different from Eq. (29) due to the presence of the $\partial y_A/\partial a$ and $\dot{a}$ terms. From Eq. (21), the result is that $\partial y_A/\partial a = \partial y_B/\partial a = -8a$. As before, define an error signal $e_A(t)=w(t)-\hat{y}_A(t)$, where w(t) is a reference input. Thus, $\dot{\hat{y}}_A=\dot{w}-\dot{e}_A$. Taking w(t=0 for all t and enforcing the error dynamics to be $\dot{e}_A=-Ke_A$, leads $\dot{\hat{y}}=Ke_A=-K\hat{y}_A$. Substitute this in Eq. (62) to eventually obtain the following:

$$a_{AB} = \frac{-K\hat{y}_A + 8a\dot{a}}{g_A} \quad (63)$$

The computation of the plane (that is, the angles γ and δ), on which the acceleration generated by Eq. (63) is applied, as well as the state dependent switching of the sign of K, is identical to the previous cases.

B. Example

The numerical parameters in this example are identical to those of the previous example, except that the size of E is now decreasing. Thus, E is both moving as well as decreasing in size. FIGS. 32A-B show representations of time history of the semimajor axis of an ellipse and the distance of B to the two foci. FIG. 32A shows the time history of the semimajor axis of the ellipse, which is constant at its initial value of a 30 cm from t=0 to t=3 s, after which it decreases to a=26 cm at t=7 s. The equation governing the reduction in major axis is assumed to be the following:

$$\dot{a} + \frac{a}{30} = 0, \quad 3 \le t \le 7s \quad (64)$$

It is assumed that AB is moving with its maximum speed of 5 m/s (same as in the previous examples), so that simply speeding up and attempting to pass through the orifice early while maintaining the exact same trajectory in the (x, y, z) space as in the previous example is not an option. The initial relative location of AB to the ellipse is the same as in the previous example, and AB now employs the guidance law [Eq. (63)] to fly through E. FIG. 32B shows the time history of $r_1$ and $r_2$, which shows that the time of closest approach occurs at around t=7.1 s, at which time a 26 cm. FIG. 33 depicts an example 3D trajectory of AB as it passes through an example moving and closing ellipse E.

FIGS. 34A-C depict example representations of output responses, azimuth angle, and elevation angle. FIG. 34A plots the values of $y_A(t)$ and $y_B(t)$. It is seen that $y_B=0$ and $y_A<0$ at the instant of closest approach (t=7.1 s), thus indicating that AB passes through E. The corresponding values of $y_A(t)$ and $y_B(t)$ for the nonclosing case (of the previous example) are also shown alongside in dashed lines, for purposes of comparison (figures in the bottom row are zoomed-inversions of the rectangular regions shown in the top row). It can be seen that the value of $y_A$ in the final stages is higher for the closing-ellipse scenario, which makes sense because the miss distance of both A and B to the ellipse is obviously less negative when the ellipse is closing. FIGS. 34B-C demonstrate the time histories β(t) and α(t), with the corresponding curve for the nonclosing case also shown alongside in dashed lines. The final value of α in the closing ellipse case is higher than in the nonclosing scenario, thus demonstrating that the guidance law [Eq. (63)] successfully generates the additional component to f acceleration required to bend the trajectory of AB so that it passes through E while grazing its lower boundary.

VII. Guidance-Law Considerations

A. Singular Cases in Guidance Law

This subsection discusses the scenarios where $g_A$ [in Eq. (30)] becomes zero, making the commanded guidance law singular. The objective of Eq. (30) is to achieve $y_A=c$ or, equivalently, to rotate $\hat{V}_{AB}$ so that the aiming point of A lies on the desired c contour. Each c contour corresponds to an ellipse that is confocal with the original ellipse E (see FIG. 14). From Eq. (28), one can infer that when $g_A=0$ at some time $t_1$, it means that, at that instant in time, application of any acceleration $a_{AB}$ (regardless of its magnitude) does not influence $\dot{y}_A$ and is thus not driving $y_A$ toward c. Broadly speaking, this can happen under the following scenarios.

Scenario A: At $t=t_1$, $\hat{a}_{AB}$ becomes parallel to the unit relative velocity vector.

Scenario B: At $t=t_1$, the aiming point of A lies on the line $C_1C_2$ joining the two foci of E.

When scenario A occurs, $a_{AB}$ does not have any component normal to the relative velocity vector, and therefore the relative velocity vector does not rotate. γ, δ is chosen in Eqs. (51) and (52) such that $\hat{a}_{AB}$ is always normal to $\hat{V}_{AB}$. Therefore, for stationary orifices, scenario A can never occur. For moving orifices, scenario A can occur in the specific case when the relative velocity vector $V_R$ lies perpendicular to $\hat{V}_{AB}$. FIGS. 35A-B are illustrations of singular cases, and FIG. 35A is an illustration of this scenario.

Scenario B occurs only if, at any point during the maneuver, the instantaneous aiming point of A is not aiming at a "valid" ellipse. A valid ellipse would be any ellipse that is confocal with E, and one can see that all of the physical space inside and outside E can be thought of as lying on a valid ellipse, except for the line $C_1C_2$. Because the foci of an ellipse always need to lie inside the ellipse, there can therefore be no ellipse that is confocal with E and whose major axis is smaller than $C_1C_2$. Scenario B can occur in the following two ways: at an isolated instant in time, such as when the aiming point sweeps across $C_1C_2$, say from left to right in FIGS. 35A-B (scenario B1), and over a finite time interval, which is when the aiming point sweeps along $C_1C_2$, say from top to bottom in FIG. 35B (scenario B2).

In the cases when scenarios A and B1 occur, $a_{AB}$ is allowed to hit its saturation limit at t $t_1$. The velocity vector thus continues to rotate at t=$t_1$; this drives $g_A$ away from zero, and Eq. (30) returns to generating a finite acceleration. When scenario B2 occurs, an option is to switch to using point B on the rod as the reference point for guidance-law computation. As long as the projected length of the rod on the line $C_1C_2$ is greater than 2ae, at least one of the ends A and B of the rod will have an aiming point that is not on $C_1C_2$, and as a consequence, at least one of $g_A$ and $g_B$ will be nonzero. If the projected length of the rod is smaller than 2ae, then scenario B2 can lead to both $g_A$ and $g_B$ being zero, and the work around then would be to define a new set of foci on the line $C_1C_2$, which are apart by a distance smaller than the length of the rod, and use the same guidance law [Eq. (30)].

VIII. Conclusions

This document uses a safe-passage cone framework to derive analytical nonlinear guidance laws that enable a robot with ideal (double integrator) dynamics to perform a precise maneuver through an orifice in 3-D space. The orifice and the robot are both modeled by elliptical shapes, and their relative sizes are such that the orifice is only slightly larger than the robot. The orifice may be moving, and its size may change with time. The guidance laws are sufficiently general in nature so as to enable their integration with vehicles of different types of dynamics, and the working of the guidance law is illustrated through simulation results.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of autonomously controlling a vehicle through an opening, the method comprising:
   identifying, by a local controller onboard the vehicle, the opening and its position relative to the vehicle;
   determining, by the local controller onboard the vehicle, a safe passage cone defining a target three-dimensional (3D) space for the vehicle to travel through in order to pass through the opening without colliding with structures defining the opening; and
   repeatedly applying, by the local controller onboard the vehicle, a control feedback loop defining a guidance law to guide the vehicle through the safe passage cone and the opening, the control feedback loop iteratively evaluating and adjusting movement of the vehicle relative to the safe passage cone and the opening until the vehicle has passed through the safe passage cone and the opening, wherein each iteration of the control feedback loop comprises:
   identifying, using one or more local sensors onboard the vehicle, (i) a relative velocity vector of the vehicle with regard to the safe passage cone and the opening and (ii) an orientation for the vehicle;
   determining, by the local controller, an acceleration vector that will direct the vehicle through the safe passage cone and the opening based on the relative velocity vector of the vehicle and the orientation of the vehicle, and
   controlling, by the local controller, one or more kinematic devices that are part of the vehicle according to the determined acceleration for the vehicle.

2. The method of claim 1, wherein:
   the local controller is programmed to guide the vehicle along a predetermined path so that the vehicle passes through the safe passage cone and the opening, and
   the acceleration vector is determined so that the magnitude of the velocity vector of the vehicle is kept constant while the vehicle travels along the predetermined path.

3. The method of claim 2, wherein:
   the opening changes position during application of the control feedback loop,
   each iteration of the control feedback loop further comprises:
   identifying, by the controller, the current position of the safe passage cone and the opening relative to the vehicle, wherein the relative velocity vector and the acceleration vector are determined based, at least in part, on the current position of the safe passage cone and the opening.

4. The method of claim 2, wherein:
   the opening changes size during application of the control feedback loop,
   each iteration of the control feedback loop further comprises:
   identifying, by the controller, the current size of the safe passage cone and the opening relative to the vehicle, wherein the relative velocity vector and the acceleration vector are determined based, at least in part, on the current size of the safe passage cone and the opening.

5. The method of claim 1, wherein at least a portion of the predetermined path has a curvature.

6. The method of claim 1, wherein the acceleration vector is determined using the following equations:

$a_{AB} = -K\hat{y}_A/g_A;$ $\hat{V}_{AB} = \cos\alpha\cos\beta\hat{i} + \cos\alpha\sin\beta\hat{j} + \sin\alpha\hat{k};$ and $\hat{\alpha}_{AB} = \cos\gamma\cos\delta\hat{i} + \cos\gamma\sin\delta\hat{j} + \sin\gamma\hat{k},$ wherein $a_{AB}$ defines the acceleration vector, and $\hat{V}_{AB}$ and $\hat{\alpha}_{AB}$ define unit vectors of the acceleration vector.

7. The method of claim 1, wherein:
the vehicle comprises an autonomous aerial vehicle, and
the autonomous aerial vehicle is controlled in three-dimensional space through the safe passage cone and the opening.

8. The method of claim 7, wherein the one or more kinematic devices include one or more of the following: elevator control device, aileron control device, rudder control device, and rotor thrust control device.

9. A vehicle that is capable of autonomously moving through an opening, comprising:
one or more onboard environment sensors that provide environmental information related to the current environment of the vehicle,
an onboard vehicle state sensor that provides information indicating a velocity vector of the vehicle and an orientation for the vehicle,
one or more onboard kinematic devices that control the movement of the vehicle,
an onboard controller that is programmed to repeatedly apply a control feedback loop to guide the vehicle through (i) an opening having a relative position provided by the one or more onboard environment sensors and (ii) a safe passage cone determined by the onboard controller and defining a 3D space for the vehicle to travel through in order to pass through the opening without colliding with structures defining the opening, the control feedback loop iteratively evaluating and adjusting movement of the vehicle relative to the safe passage cone and the opening until the vehicle has passed through the opening, wherein each iteration of the control feedback loop comprises:
identifying, using the one or more state sensors onboard the vehicle, (i) a relative velocity vector of the vehicle with regard to the safe passage cone and the opening and (ii) an orientation for the vehicle;
determining, by the local controller, an acceleration vector that will direct the vehicle through the safe passage cone and the opening based on the relative velocity vector of the vehicle and the orientation of the vehicle, and
controlling, by the local controller, the one or more kinematic devices that are part of the vehicle according to the determined acceleration for the vehicle.

10. The vehicle of claim 9, wherein:
the local controller is programmed to guide the vehicle along a predetermined path so that the vehicle passes through the safe passage cone and the opening, and
the acceleration vector is determined so that the magnitude of the velocity vector of the vehicle is kept constant while the vehicle travels along the predetermined path.

11. The vehicle of claim 10, wherein at least a portion of the predetermined path has a curvature.

12. The vehicle of claim 9, wherein the controller is programmed to determine the acceleration vector using the following equations:

$a_{AB} = -K\hat{y}_A/g_A;$ $\hat{V}_{AB} = \cos\alpha\cos\beta\hat{i} + \cos\alpha\sin\beta\hat{j} + \sin\alpha\hat{k};$ and $\hat{\alpha}_{AB} = \cos\gamma\cos\delta\hat{i} + \cos\gamma\sin\delta\hat{j} + \sin\gamma\hat{k},$ wherein $a_{AB}$ defines the acceleration vector, and $\hat{V}_{AB}$ and $\hat{\alpha}_{AB}$ define unit vectors of the acceleration vector.

13. The vehicle of claim 9, wherein:
the vehicle comprises an autonomous aerial vehicle, and
the controller is programmed to control the vehicle in three-dimensional space through the safe passage cone and the opening.

14. The vehicle of claim 13, wherein the one or more kinematic devices include one or more of the following: elevator control device, aileron control device, rudder control device, and rotor thrust control device.

15. The vehicle of claim 9, wherein:
the controller is programmed to guide the vehicle through an opening that changes position during application of the control feedback loop,
each iteration of the control feedback loop further comprises:
identifying, by the controller, the current position of the safe passage cone and the opening relative to the vehicle, wherein the relative velocity vector and the acceleration vector are determined based, at least in part, on the current position of the safe passage cone and the opening.

16. The vehicle of claim 9, wherein:
the controller is programmed to guide the vehicle through an opening that changes size during application of the control feedback loop,
each iteration of the control feedback loop further comprises:
identifying, by the controller, the current size of the safe passage cone and the opening relative to the vehicle, wherein the relative velocity vector and the acceleration vector are determined based, at least in part, on the current size of the safe passage cone and the opening.

17. A system for directing a vehicle through an opening, comprising:
one or more environment sensors that provide environmental information related to the current environment of the vehicle,
a vehicle state sensor that provides information indicating a velocity vector of the vehicle and an orientation for the vehicle,
one or more onboard kinematic devices that control the movement of the vehicle,
a controller that is programmed to repeatedly apply a control feedback loop to guide the vehicle through (i) an opening having a relative position provided by the one or more environment sensors and (ii) a safe passage cone determined by the controller and defining a 3D space for the vehicle to travel through in order to pass through the opening without colliding with structures defining the opening, the control feedback loop iteratively evaluating and adjusting movement of the vehicle relative to the safe passage cone and the opening until the vehicle has passed through the opening, wherein each iteration of the control feedback loop comprises:
identifying, using the one or more state sensors, (i) a relative velocity vector of the vehicle with regard to the safe passage cone and the opening and (ii) an orientation for the vehicle;
determining, by the controller, an acceleration vector that will direct the vehicle through the safe passage cone and the opening based on the relative velocity vector of the vehicle and the orientation of the vehicle, and
controlling, by the controller, the one or more kinematic devices that are part of the vehicle according to the determined acceleration for the vehicle.

18. The system of claim 17 wherein one of the one or more environment sensors is remote from the vehicle.

19. The system of claim 17 wherein the controller is remote from the vehicle.

20. The system of claim 17 wherein the controller is local to the vehicle, and is programmed to receive signals from a controller that is remote from the vehicle, the local controller being programmed to switch between:
controlling the one or more kinematic devices that are part of the vehicle according to the local controller's determined acceleration for the vehicle based on the application of the control feedback loop, and
controlling the one or more kinematic devices that are part of the vehicle according to the signals received from the controller that is remote from the vehicle.

21. The system of claim 17, wherein:
the controller is programmed to guide the vehicle along a predetermined path so that the vehicle passes through the safe passage cone and the opening, and
the acceleration vector is determined so that the magnitude of the velocity vector of the vehicle is kept constant while the vehicle travels along the predetermined path.

22. The system of claim 21, wherein at least a portion of the predetermined path has a curvature.

23. The system of claim 17, wherein the controller is programmed to determine the acceleration vector using the following equations:

$$a_{AB} = -K\hat{y}_A/g_A;$$

$$\hat{V}_{AB} = \cos \alpha \cos \beta \hat{i} + \cos \alpha \sin \beta \hat{j} + \sin \alpha \hat{k}; \text{ and}$$

$$\hat{\alpha}_{AB} = \cos \gamma \cos \delta \hat{i} + \cos \gamma \sin \delta \hat{j} + \sin \gamma \hat{k},$$

wherein $a_{AB}$ defines the acceleration vector, and $\hat{V}_{AB}$ and $\hat{\alpha}_{AB}$ define unit vectors of the acceleration vector.

24. The system of claim 17, wherein:
the controller is programmed to guide the vehicle through an opening that changes position during application of the control feedback loop,
each iteration of the control feedback loop further comprises:
identifying, by the controller, the current position of the safe passage cone and the opening relative to the vehicle, wherein the relative velocity vector and the acceleration vector are determined based, at least in part, on the current position of the safe passage cone and the opening.

25. The system of claim 17, wherein:
the controller is programmed to guide the vehicle through an opening that changes size during application of the control feedback loop,
each iteration of the control feedback loop further comprises:
identifying, by the controller, the current size of the safe passage cone and the opening relative to the vehicle, wherein the relative velocity vector and the acceleration vector are determined based, at least in part, on the current size of the safe passage cone and the opening.

* * * * *